United States Patent [19]

Hatano et al.

[11] Patent Number: 5,467,204
[45] Date of Patent: Nov. 14, 1995

[54] LIQUID CRYSTAL LIGHT VALVE WITH DUAL FUNCTION AS BOTH OPTICAL-TO-ELECTRICAL AND OPTICAL-TO-OPTICAL TRANSDUCER

[75] Inventors: Akitsugu Hatano, Nara; Tsuyoshi Okazaki, Tenri; Yukihiro Sumida, Nara; Takashi Nojima, Gose; Hidehiko Yamashita, Tenri, all of Japan

[73] Assignee: Sharp Kabushiki Kaisha, Osaka, Japan

[21] Appl. No.: 988,040

[22] Filed: Dec. 9, 1992

[30] Foreign Application Priority Data

| Dec. 9, 1991 | [JP] | Japan | 3-324142 |
| Feb. 27, 1992 | [JP] | Japan | 4-041108 |
| Mar. 6, 1992 | [JP] | Japan | 4-049603 |
| Mar. 27, 1992 | [JP] | Japan | 4-071498 |
| Mar. 27, 1992 | [JP] | Japan | 4-071499 |

[51] Int. Cl.⁶ ............ H04N 1/028; G02F 1/1335; G02F 1/135
[52] U.S. Cl. ............ 358/482; 358/484; 348/294; 348/359; 359/42; 359/72
[58] Field of Search ............ 358/482, 484, 358/471; 359/42, 72, 82, 48; 348/294, 340, 359

[56] References Cited

U.S. PATENT DOCUMENTS

| 3,838,908 | 10/1974 | Channin | 359/42 |
| 3,980,395 | 9/1976 | Giallorenzi et al. | |
| 4,094,606 | 6/1978 | Camphausen | |
| 5,307,186 | 4/1994 | Izumi et al. | 359/42 |

FOREIGN PATENT DOCUMENTS

| 63049892 | 3/1988 | European Pat. Off. |
| 1013238 | 1/1989 | European Pat. Off. |
| 2134617 | 5/1990 | European Pat. Off. |
| 2067812 | 12/1979 | United Kingdom |

OTHER PUBLICATIONS

Rodney D. Sterling et al., "Video–Rate Liquid–Crystal Light–Valve Using An Amorphous Silicon Photoconductor", SID 90 Digest (1990), pp. 327–329.

Masanori Ozaki et al., "Fast Optical Switching In Polymer Waveguide Using Ferroelectric Liquid Crystal", Japanese Journal of Applied Physics 29, [5] May 1990, pp. L843–L845.

*Primary Examiner*—Scott A. Rogers
*Attorney, Agent, or Firm*—David G. Conlin; Peter F. Corless; Milton Oliver

[57] ABSTRACT

A liquid crystal light valve and a various information processors is provided. The processors have the liquid crystal light valve in which information formed in a liquid crystal layer and corresponding to address light can be read as an optical signal and can be directly read as an electric signal.

A liquid crystal light valve has a glass substrate, an antireflection film, a transparent electrode, an opposite electrode, an optical waveguide, a photoconductive layer, a light interrupting layer, an orientational film, a spacer and a liquid crystal layer. The optical waveguide is composed of a lower clad layer, a core layer and a clad layer. A light source and a photodetector are connected to both ends of the optical waveguide. For example, the light source is constructed by a laser, a light emitting diode (LED), etc. The light source is connected to the optical waveguide such that a polarized wave can be guided to the optical waveguide. For example, the photodetector is constructed by an a-Si:H diode, an a-SiGe:H diode, etc. in accordance with a wavelength of the light source. The photodetector is connected to the optical waveguide so as to receive light therefrom.

15 Claims, 28 Drawing Sheets

LIQUID CRYSTAL LIGHT VALVE WITH DUAL FUNCTION AS BOTH OPTICAL-TO-ELECTRICAL AND OPTICAL-TO-OPTICAL TRANSDUCER

BACKGROUND OF THE INVENTION

1. Field of the Invention

The present invention relates to a liquid crystal light valve. More particularly, the present invention relates to a liquid crystal light valve of a light address type usable for an image sensor, a projecting type display, image processing, etc. and relates to an information processor, e.g. image copying machine, facsimile telegraph, image scanner and bar code reader, provided with this liquid crystal light valve.

2. Description of the Related Art

Conventional liquid crystal light valves are provided as follows.

(1) In literature 1 (R. D. Sterling, R.D. Te Kolste, J. M. Haggerty, T. C. Borah, W. P. Bleha: SID Digest (1990) p. 327), an element is manufactured by using a photoconductive layer (amorphous silicon hydride), a light interrupting layer (cadmium telluride (CdTe)) and a dielectric mirror and using a vertical orientational mode in a liquid crystal layer. This element is applied to a projecting type display.

(2) In literature 2 (G. Moddel, K. M. Johnson, W. Li, R. A. Rice, L. A. Pagano-Stauffer, M. A. Handschy: Applied Physics Letter Vol. 55, No. 6 (1989), p. 537), an element is manufactured by using a photoconductive layer (p-i-n amorphous silicon hydride) and a ferroelectric liquid crystal.

(3) In literature 3 (S. T Wu, U. Eflon, T. Y. Hsu: Optical Letter Vol. 13, No. 1 (1988), p: 13), an element is manufactured by using a metallic oxide film semiconductor (MOS) structure of monocrystal silicon in a photoconductive layer and using a nematic liquid crystal in a liquid crystal layer. This element is applied to a near infrared-visible image converting element.

(4) In literature 4 (a pre-manuscript (1990) p. 745 written by Fukushima and Kurokawa in an associative lecture meeting relative to 37-th Applied Physics), an element is manufactured by using a photoconductive layer (amorphous silicon hydride), a dielectric mirror and a ferroelectric liquid crystal. This element is applied to parallel optical processing.

FIG. 32 is a cross-sectional view showing the construction of a conventional general liquid crystal light valve of a light address type.

As shown in FIG. 32, in a liquid crystal light valve 200, transparent electrodes 202a and 202b are composed of transparent conductive films of silicon dioxide ($SnO_2$) and are respectively formed on glass substrates 201a and 201b. An amorphous silicon hydride (a-Si:H) film is next formed as a photoconductive layer 203 on the transparent electrode 202b. Raw materials of the amorphous silicon hydride (a-Si:H) film constituting the photoconductive layer 203 are constructed by silane and hydrogen gases. This a-Si:H film is formed by using a plasma CVD (chemical evaporation) method.

Next, a multiple layer film composed of silicon and silicon oxide is formed as a dielectric mirror 204 on the photoconductive layer 203 by a sputtering method.

Next, polyimide films are respectively formed by spin coating as orientational films 205a and 205b on the transparent electrode 202a and the dielectric mirror 204. Thereafter, molecular orientational processing is performed by rubbing surfaces of the orientational films 205a and 205b.

The glass substrates 201a and 201b respectively having the above-mentioned layers and films thereon are stuck to each other through a spacer 206. A mixing nematic liquid crystal is provided by adding a chiral material as a liquid crystal layer 207 to this nematic liquid crystal and is injected and sealed between these glass substrates, thereby constructing the liquid crystal light valve 200.

Display modes used in the liquid crystal light valve 200 are constructed by a twisted nematic (TN) mode, a hybrid electric field effect (HFE) mode, a guest host (GH) mode, a phase transition mode, etc.

A voltage is applied by an alternating current source 208 between the transparent electrodes 202a and 202b of the liquid crystal light valve 200 constructed above.

When address light 209 is incident to the liquid crystal light valve 200 from a side of the glass substrate 201b, impedance of the photoconductive layer 203 is reduced in a lightening region (in a light state) so that the voltage applied by the alternating current source 208 is applied to the liquid crystal layer 207. In contrast to this, no impedance of the photoconductive layer 203 is changed in an unlightening region (in a dark state). In this dark state, no voltage is applied to the liquid crystal layer 207.

Information corresponding to the address light 209 is formed in the liquid crystal layer 207 by this difference between the light and dark states. This information is applied to a projecting type display, parallel optical processing, etc.

An element for switching light transmitted through an optical waveguide by a liquid crystal is proposed as a device combining the optical waveguide with the liquid crystal and is shown in literature 5 (M. Ozaki, Y. Sadohara, T. Hatai, K. Yoshino:Japanese Journal Applied Physics Vol. 29, No. 5 (1990), L843).

In such a conventional liquid crystal light valve of a light address type, light is used to read information formed in the liquid crystal layer and corresponding to the address light. Therefore, it is necessary to dispose a reading optical system.

When this liquid crystal light valve is applied to various kinds of devices, it is necessary to dispose a mechanism for converting an optical signal to an electric signal in comparison with a device (e.g., a projecting type display) for using a reading signal as an optical signal as it is when the liquid crystal light valve is applied to a device (e.g., an image sensor) for using the reading signal as an electric signal. Therefore, the structure of an apparatus using this converting mechanism is complicated and large-sized.

Further, various information processors, such as an image copying machine, a facsimile telegraph, an image scanner, a bar code reader, etc., have been reacently spread in offices, schools, etc Conventional information processors are provided as follows.

The construction of a conventional image copying machine will next be explained.

FIG. 33 is a view showing the schematic construction of an image reading section in a conventional image copying machine.

As shown in FIG. 33, the image reading section of this conventional image copying machine has a scanning optical system 210. This scanning optical system 210 is constructed by a light source 213 composed of a fluorescent lamp, a halogen lamp, etc., a first mirror 214, a second mirror 215, a third mirror 216, a lens 217 and a fourth mirror 218.

The light source 213, the first mirror 214, the second mirror 215 and the third mirror 216 are constructed such that the light source 213 and these mirrors can be moved in parallel with each other by an unillustrated driving device along a face of an original 212 (in a bi-directional direction of arrows in FIG. 33).

The scanning optical system 210 is constructed such that light reflected on the original 212 is guided to a photosensitive drum 211 when light from the light source 213 is irradiated onto the original 212.

In such a construction, light from the light source 213 is irradiated onto the original 212. Light 219 reflected on the original 212 is guided to the photosensitive drum 211 through the first mirror 214, the second mirror 215, the third mirror 216, the lens 217 and the fourth mirror 218 along one-dotted chain line shown in FIG. 33. Thus, an electrostatic latent image is formed on a surface of the photosensitive drum 211. This electrostatic latent image is visibly developed by toner as a toner image. Thereafter, this developed image is transferred onto a sheet of paper so that a copied image is formed.

In another image copying machine, light reflected on the original is converted to an electric signal and this electric signal is processed by an image processing circuit. Thereafter, for example, a photosensitive body is exposed by a laser output so that an electrostatic latent image is formed on the photosensitive body.

FIG. 34 is a block diagram showing the construction of a circuit for converting light reflected on an original to an electric signal and transmitting this electric signal to an image processing circuit in the conventional image copying machine.

As shown in FIG. 34, light 220 reflected on the original is guided to a photoelectric converting section 221 composed of a solid-state image sensor such as a CCD (a charge coupled device) by a scanning optical system having a construction similar to that of the scanning optical system 210 shown in FIG. 33, thereby forming an image. The photoelectric converting section 221 outputs an analog electric signal to an analog/digital (A/D) converter 222. The A/D converter 222 converts the analog electric signal to a digital signal. The converted digital signal is stored to an image memory 223. Thereafter, the digital signal is read out of the image memory 223 by the image processing circuit 224 to perform processings required to copy an image.

In the image copying machine shown in FIG. 33 in such conventional image copying machines, reflected light corresponding to an original image is formed as an image on the photosensitive drum, thereby forming a copied image. Accordingly, it is necessary to dispose an optical system for scanning the original so that the entire copying machine is complicated and large-sized.

In the image copying machine shown in FIG. 34, light reflected on the original is converted to an electric signal and this electric signal is processed by the image processing circuit. Thereafter, a photosensitive body is exposed by a laser output to form an electrostatic latent image on the photosensitive body. In such an image copying machine, when the reflected light corresponding to an original image is converted to a digital image signal, it is necessary to once convert an optical signal to an electric signal and then reconvert this electric signal to an optical signal. Accordingly, it is necessary to dispose a mechanism for conversion and reconversion so that the image copying machine is complicated and large-sized.

The construction of a conventional facsimile telegraph will next be explained.

FIG. 35 is a view showing the construction of an image reading section in the conventional facsimile telegraph or image scanner.

As shown in FIG. 35, the image reading section in the conventional facsimile telegraph or image scanner has a light emitting diode (LED) array 232, a lens 233 and a photoelectric converting element (CCD) array 234 or a line sensor 114 composed of a CCD.

In such a construction, when light from the LED array 232 is irradiated to an original 231 having image information to be read, light reflected on the original 231 is incident to the CCD array or line sensor 234 through the lens 233 and is converted to an electric signal by the CCD array or line sensor 234.

FIG. 36 is a cross-sectional view showing a construction of the CCD array 234 included in the facsimile telegraph shown in FIG.

As shown in FIG. 36, a light interrupting layer 242 is disposed on a glass substrate 241. An insulating layer 243 is disposed on the light interrupting layer 242 and a transparent electrode 244 is disposed on this insulating layer 243.

A photoconductive layer 245 is composed of amorphous silicon hydride (a-Si:H) and is disposed on the transparent electrode 244. A metallic electrode 246 is disposed on the glass substrate 241 and the photoconductive layer 245. A protecting film 247 is disposed on the metallic electrode 246 and the photoconductive layer 245.

An IC chip 248 is disposed on the glass substrate 241, the metallic electrode 246 and the protecting film 247. This IC chip 248 is connected to the metallic electrode 246 through a bonding wire 249, thereby constructing the CCD array 234.

When an original image is read, signal light 240 is irradiated to the CCD array 234 from a side of the glass substrate 241.

In such a conventional facsimile telegraph, a manufacturing process of the CCD array disposed in the image reading section is complicated so that the facsimile telegraph is expensive. Further, a systematic construction of the image reading section including a driving section of the CCD array is complicated.

The construction of a conventional image scanners will next be explained.

There are two kinds of conventional image scanners which are independently used and are used by connecting an image scanner to an electronic filing system such as a word processor.

In these image scanners, image data can be read by scanning a line sensor composed of a photoelectric converting element such as a CCD in a constant direction.

In such a conventional image scanner, the line sensor is used in the image reading section. Accordingly, no original having a relatively large size such as A4 or B4 can be read by one scanning operation. Further, since the above lens is used, a systematic construction of the image reading section is complicated.

The construction of a conventional bar code reader will next be explained.

An integrated management control system called a so-called POS system has been spread to minutely manage diversified goods and information required for chain stores and save men, time and cost in a supermarket store, a convenience store, etc. as information is advanced. An automatic information reader is provided as one of information inputting means. In this automatic information reader, information required for price tags of goods is coded and is printed as a bar code. This bar code is scanned by a laser beam and an amount of reflected light from the bar code is converted to an electric signal to automatically read the displayed information.

FIG. 37 shows a schematic construction of such an optical reader as one example. An operational principle of this optical reader will next be explained. A laser beam from a laser beam oscillator 251 is converged by a convergent lens system 252. A scanning operation using this laser beam is performed by using a polygon mirror 258 with respect to a bar code portion 255. Light reflected on the bar code portion 255 is received by a condenser lens system 258 such that this light is incident to a photodetector 257 arranged in a focal point position of this light. Light and darkness of the reflected laser beam are changed in accordance with white and black bars of the bar code portion. The photodetector 257 converts this reflected laser beam to an electric signal and transmits this electric signal to a bar code decoder 258. The bar code decoder 258 decodes this electric signal to numeric values to read bar code information.

A different bar code portion is scanned several times by using a galvanomirror 254, etc. to prevent the bar code from being read in error by a partial dirty portion, etc., thereby obtaining accurate information.

However, in the above-mentioned method, the polygon mirror 258 and the galvanomirror 254 must be mechanically moved to perform the scanning operation of the laser so that the bar code reader is large-sized. Further, the bar code reader tends to be broken in a portion for mechanically moving the polygon mirror and the galvanomirror. Further, when a face of the polygon mirror 258 is inclined by an error in manufacture thereof or by the rotational movement of an axis of the polygon mirror, irregularities of scanning lines are caused with respect to an image so that a high accuracy in manufacture of the polygon mirror is required. A correction lens must be further disposed to optically correct the irregularities of scanning lines so that the bar code reader is large-sized and complicated.

SUMMARY OF THE INVENTION

It is therefore an object of the present invention to provide a liquid crystal light valve of a light address type and an information processor having this liquid crystal light valve in which information formed in a liquid crystal layer and corresponding to address light is read as an optical signal and can be directly read as an electric signal.

Another object of the present invention to provide a compact image copying machine having a high function in which an image reading function and an image display function are combined and fulfilled in an image reading section.

A further object of the present invention to provide a facsimile telegraph having a simplified structure which can be made compact and cheaply manufactured.

Still further object of the present invention to provide an image scanner for easily performing an image reading operation.

Still further object of the present invention to provide a bar code reader in which there is nomechanical driving portion and the bar code reader is made compact and has a simplified structure and improved durability with high reading accuracy.

According to the present invention, the aforementioned object is accomplished by a liquid crystal light valve and a various information processors as follows.

A liquid crystal light valve in the present invention comprises a liquid crystal layer disposed between two substrates respectively having electrodes; a photoconductive layer disposed between the liquid crystal layer and one of the two substrates and having an impedance changed by incident light including information; an optical waveguide disposed on a side of one of the two substrates; a light source for guiding light to the optical waveguide; and light receiving means for receiving light from the light source transmitted through the optical waveguide and converting this light to an electric signal.

An information processor in the present invention has a liquid crystal light valve including a liquid crystal layer disposed between two substrates respectively having electrodes; a photoconductive layer disposed between the liquid crystal layer and one of the two substrates and having an impedance changed by incident light including information; an optical waveguide disposed on a side of one of the two substrates; a light source for guiding light to the optical waveguide; and light receiving means for receiving light from the light source transmitted through the optical waveguide and converting this light to an electric signal; and the information processor further having a mechanism for converting the light including the information to an electric signal and connected to the liquid crystal light valve.

When there is no address light (in a dark state) and a voltage is applied between the electrodes disposed in the two substrates of the liquid crystal light valve, the impedance of the photoconductive layer is greater than that of the liquid crystal layer. Accordingly, no voltage is almost applied to a liquid crystal of the liquid crystal layer so that no orientational state of the liquid crystal is changed. In this state, a refractive index of the liquid crystal is set to be smaller than that of the optical waveguide seen from a polarizing direction of light transmitted through the optical waveguide. Accordingly, the light from the light source can be transmitted through the optical waveguide so that an optical signal can be received by the light receiving means. Next, when the voltage is sequentially applied between the electrodes disposed in the two substrates in a light state in which the address light is incident to the liquid crystal light valve, the impedance of the photoconductive layer is reduced and the voltage is applied to the liquid crystal of the liquid crystal layer so that the orientational state of the liquid crystal is changed. In contrast to this, in the dark state, no impedance of the photoconductive layer is changed so that no orientational state of the liquid crystal is changed. At this time, in an orientational changing portion of the liquid crystal close to the optical waveguide, the refractive index of the liquid crystal is greater than that of the optical waveguide seen from the polarizing direction of light transmitted through the optical waveguide. Accordingly, the light from the light source is leaked in a liquid crystal direction in the orientational changing portion of the liquid crystal while this light is transmitted through the optical waveguide. Thus, the intensity of an optical signal received by the light receiving means is changed. Accordingly, information corresponding to the address light can be electrically obtained by synchronizing a scanning operation of the electrodes with the input of an electric signal outputted from the light receiving means. Thus, the information formed in the liquid crystal layer and corresponding to the address light can be read as an optical signal and can be directly read as an electric signal.

When no voltage is applied to the liquid crystal, the refractive index of the liquid crystal can be set to be greater than that of the optical waveguide seen from the polarizing direction of light transmitted through the optical waveguide. In contrast to this, when the voltage is applied to the liquid crystal, the refractive index of the liquid crystal can be set to be smaller than that of the optical waveguide seen from the polarizing direction of light transmitted through the optical waveguide. Further, the refractive index of the liquid crystal seen from the polarizing direction of light transmitted through the optical waveguide becomes great or small by an increase in applied voltage. Accordingly, gradational data can be outputted as an electric signal.

When a voltage is simultaneously applied to all scanning electrodes in a state in which the address light is incident to the liquid crystal light valve, an orientational state of the liquid crystal is changed in accordance with the light or dark state. At this time, when reading light is irradiated to the liquid crystal, this light is modulated by electrooptic effects of the liquid crystal in accordance with the light or dark state so that information can be taken out as an optical signal.

Further, in an information processor in the present invention, an electric signal can be taken out of the liquid crystal light valve together with an optical signal so that information can be processed with high function by the compact information processor.

In the present invention, an image copying machine has an image reading section for reading the image of an original and an image forming section for forming a copied image based on image data of the original read by the image reading section. The image reading section includes a liquid crystal light valve comprising aforementioned construction.

When there is no address light (in a dark state) and a voltage is applied between the electrodes disposed in the two substrates of the liquid crystal light valve, the impedance of the photoconductive layer is greater than that of the liquid crystal layer. Accordingly, no voltage is almost applied to a liquid crystal of the liquid crystal layer so that no orientational state of the liquid crystal is changed. In this state, a refractive index of the liquid crystal is set to be smaller than that of the optical waveguide seen from a polarizing direction of light transmitted through the optical waveguide. Accordingly, the light from the light source can be transmitted through the optical waveguide so that an optical signal can be received by the light receiving means. Next, when the voltage is sequentially applied between the electrodes disposed in the two substrates in a light state in which the address light is incident to the liquid crystal light valve, the impedance of the photoconductive layer is reduced and the voltage is applied to the liquid crystal of the liquid crystal layer so that the orientational state of the liquid crystal is changed. In contrast to this, in the dark state, no impedance of the photoconductive layer is changed so that no orientational state of the liquid crystal is changed. At this time, in an orientational changing portion of the liquid crystal close to the optical waveguide, the refractive index of the liquid crystal is greater than that of the optical waveguide seen from the polarizing direction of light transmitted through the optical waveguide. Accordingly, the light from the light source is leaked in a liquid crystal direction in the orientational changing portion of the liquid crystal while this light is transmitted through the optical waveguide. Thus, the intensity of an optical signal received by the light receiving means is changed. Accordingly, information corresponding to the address light can be electrically obtained by synchronizing a scanning operation of the electrodes with the input of an electric signal outputted from the light receiving means. Thus, the information formed in the liquid crystal layer and corresponding to the address light can be read as an optical signal and can be directly read as an electric signal.

In the image copying machine in the present invention, such a liquid crystal light valve is used as the image reading section so that it is not necessary to dispose an optical system for scanning an original. Accordingly, it is possible to realize a compact image copying machine having a high function in which an image reading function and an image display function are combined with each other in the image reading section.

In the present invention, a facsimile telegraph for recording and transmitting an image comprises a liquid crystal light valve comprising aforementioned construction. The facsimile telegraph further comprises an applying mechanism connected to the liquid crystal light valve for applying a voltage to the electrodes disposed in the two substrates so as to obtain an electric signal corresponding to the incident light.

One of the two substrates having the photoconductive layer is formed by a fiber plate.

When light including image information is incident to the liquid crystal light valve, the impedance of the photoconductive layer is reduced by this light. A voltage applied to the electrodes disposed in the two substrates of the liquid crystal light valve is applied to the liquid crystal layer by the voltage applying mechanism. As a result, the orientational state of a liquid crystal molecule in the liquid crystal layer is changed so that a refractive index of the liquid crystal layer is changed. Light transmitted through the optical waveguide from the light source is partially leaked to the liquid crystal layer so that the intensity of light reaching the light receiving means is reduced. Therefore, an electric signal having a magnitude according to the intensity of incident light including image information is obtained by the light receiving means. A manufacturing process of such a liquid crystal light valve is simplified in comparison with a CCD array, etc. used in the conventional facsimile telegraph. Further, the liquid crystal light valve is cheaply manufactured. Accordingly, it is possible to realize a facsimile telegraph which is cheaply manufactured.

One of the two substrates having the photoconductive layer is formed by a fiber plate. Accordingly, light including image in formation reflected from an original is directly incident to the liquid crystal light valve so that no lens system is required. Therefore, it is possible to realize a facsimile telegraph which is cheaply manufactured and made compact.

In the present invention, an image scanner has an image reading section for reading the image of an original. This image reading section includes a liquid crystal light valve comprising aforesaid construction.

When there is no light including information (in a dark state) and a voltage is applied between the electrodes disposed in the two substrates of the liquid crystal light valve, the impedance of the photoconductive layer is greater than that of the liquid crystal layer. Accordingly, no voltage is almost applied to a liquid crystal of the liquid crystal layer so that no orientational state of the liquid crystal is changed. In this state, a refractive index of the liquid crystal is set to be smaller than that of the optical waveguide seen from a polarizing direction of light transmitted through the optical waveguide. Accordingly, the light from the light source can be transmitted through the optical waveguide so that an optical signal can be received by the light receiving means. Next, when the voltage is sequentially applied between the electrodes disposed in the two substrates in a light state in which the light including information is incident to the liquid crystal light valve, the impedance of the photoconductive layer is reduced and the voltage is applied to the liquid crystal of the liquid crystal layer so that the orientational state of the liquid crystal is changed. In contrast to this, in the dark state, no impedance of the photoconductive layer is changed so that no orientational state of the liquid crystal is changed. At this time, in an orientational changing portion of the liquid crystal close to the optical waveguide, the refractive index of the liquid crystal is greater than that of the optical waveguide seen from the polarizing direction of light transmitted through the optical waveguide. Accordingly, the light from the light source is leaked in a liquid crystal direction in the orientational changing portion of the liquid crystal while this light is transmitted through the optical waveguide. Thus, the intensity of an optical signal received by the light receiving means is changed. Accordingly, information corresponding to the light including information can be electrically obtained by synchronizing a scanning operation of the electrodes with the input of an electric signal outputted from the light receiving means. Thus, the information formed in the liquid crystal layer and corresponding to the light including information can be read as an optical signal and can be directly read as an electric signal.

In the image scanner in the present invention, the reading operation of image information can be easily performed since such a liquid crystal light valve is used in the image reading section.

Further, one of the two substrates of the liquid crystal light valve located on a side of the photoconductive layer is formed by a fiber plate. Accordingly, light including image information and reflected on the original is directly incident to the liquid crystal light valve so that no lens system is required. Accordingly, it is possible to realize an image scanner having a simplified structure which can be made compact.

The present invention is characterized in that a bar code reader for optically reading a bar code comprises a first light source for irradiating an entire bar code face at one time; a liquid crystal light valve having a substrate provided with an electrode for scanning formed in the shape of plural stripes parallel to bars of the bar code; the liquid crystal light valve having a liquid crystal sealed between this substrate and a substrate provided with an optical waveguide formed in the shape of a stripe in a direction perpendicular to the electrode for scanning; an orientational state of the liquid crystal being changed in accordance with optical information from the bar code; a second light source for guiding light to the optical waveguide; and a photodetector for detecting light from the second light source transmitted through the optical wave guide.

A fiber plate is effectively used as at least one of the substrates of the liquid crystal light valve.

In the liquid crystal light valve used in the present invention, the orientational state of a liquid crystal layer for locating a selected scanning electrode parallel to bars of the bar code is changed in accordance with optical information such as reflected light from the bar code. The intensity of light transmitted through the optical waveguide perpendicular to the scanning electrode is changed in accordance with this change in orientational state. This change in light intensity is detected by the photodetector to obtain information from the bar code.

In accordance with the present invention, it is not necessary to dispose a mechanical driving portion such as a polygon mirror and a galvanomirror in the conventional bar code reader by using the light source for irradiating an entire bar code face at one time and the above liquid crystal light valve in a reading section of the bar code. Accordingly, the bar code reader can be made compact and durability of the bar code reader can be improved. Further, a systematic structure of the bar code reader is simplified since it is not necessary to dispose a correction lens for optically correcting scanning irregularities. Further, it is not necessary to dispose a condenser lens system used in the conventional bar code reader by constructing at least one of the substrates of the liquid crystal light valve by a fiber plate. Accordingly, the systematic structure of the bar code reader is further simplified.

Further objects and advantages of the present invention will be apparent from the following description of the preferred embodiments of the invention as illustrated in the accompanying drawings.

BRIEF DESCRIPTION OF THE DRAWINGS

FIGS. 18A and 1 6B are schematic views showing the orientational state of a liquid crystal molecule in a ferroelectric liquid crystal when light in TE mode is transmitted through an optical waveguide.

FIG. 18 is a view showing the systematic construction of an image copying machine in accordance with one embodiment of the present invention.

FIG. 82 is a cross-sectional view showing the construction of a conventional general liquid crystal light valve of a light address type.

FIG. 88 is a view showing the schematic construction of an image reading section in a conventional image copying machine.

FIG. 84 is a block diagram showing the construction of a circuit included in the conventional image copying machine and converting light reflected on an original to an electric signal and transmitting this electric signal to an image processing circuit.

DESCRIPTION OF THE PREFERRED EMBODIMENTS (EMBODIMENT)

The embodiments of the present invention will next be described with reference to the accompanying drawings.

Figure 2:
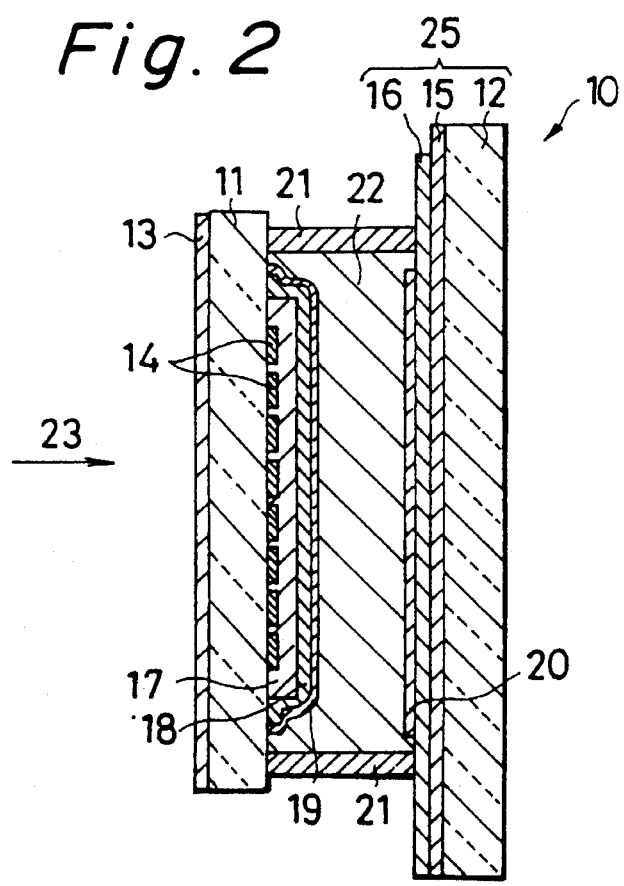
FIG. 2 is a cross-sectional view showing the construction of a liquid crystal light valve in accordance with a first embodiment of the present invention.

FIG. 2 is a cross-sectional view showing the construction of a liquid crystal light valve in accordance with a first embodiment of the present invention.

As shown in FIG. 2, a liquid crystal light valve 10 in this embodiment has glass substrates 11, 12, an antireflection film 18, a transparent electrode 14, an opposite electrode 15, an optical waveguide 18, a photoconductive layer 17, a light interrupting layer 18, orientational films 19, 20, spacer 21 and a liquid crystal layer This liquid crystal light valve 10 is manufactured as follows.

First, a transparent conductive film of silicon dioxide ($SnO_2$) is evaporated on the glass substrate 11 as a light transmitting substrate by using a sputtering method. This transparent conductive film is patterned in the shape of a stripe through a photolitho process so that a transparent electrode 14 for scanning is formed.

An amorphous silicon hydride (a-Si:H) film is next formed as a photoconductive layer 17 on the transparent electrode 14. Raw materials of the amorphous silicon hydride (a-Si:H) film constituting the photoconductive layer 17 are constructed by silane ($SiH_4$) and hydrogen ($H_2$) gases. This a-Si:H film is formed by using a plasma CVD (chemical evaporation) method. This amorphous silicon hydride (a-Si:H) film has a thickness about 6 μm.

The thickness of the a-Si:H film is desirably set in a range from 3 μm to 6 μm.

Acrylic resin of a carbon dispersion type is next formed on the photoconductive layer 17 by spin coating and preferably rubbing processing as a light interrupting layer 18 for interrupting light incident to the photoconductive layer 17 from the side of a liquid crystal layer described later.

An antireflection film 13 is formed on an incident side of writing light 23 corresponding to an image signal with respect to the glass substrate 11 and prevents this light from being reflected on a surface of this glass substrate 11.

A fiber plate can be used as the above light transmitting substrate instead of the glass substrate.

A transparent conductive film composed of indium oxide (ITO) having doped tin is evaporated on the glass substrate 12 opposed to the glass substrate 11 by using a sputtering method, thereby forming an opposite electrode 15.

An optical waveguide 16 is next formed in the shape of a stripe on the opposite electrode 15 by selective photo polymerization using a thin high polymer film.

Next, a polyimide film is formed by spin coating as each of orientational films 19 and 20 on the light interrupting layer 18 and the optical waveguide 16, respectively. Thereafter, molecular orientational processing is performed by rubbing surfaces of the orientational films 19 and 20.

The glass substrates 11 and 12 having the above layers and films thereon are stuck to each other through a spacer 21. A nematic liquid crystal having a positive dielectric constant is injected and sealed in vacuum as a liquid crystal layer 22 between the glass substrates 11 and 12, thereby constructing a liquid crystal light valve 10.

The orientational direction of a liquid crystal molecule is set such that the refractive index of a liquid crystal is larger than that of the optical waveguide seen from a polarizing direction of light transmitted through the optical waveguide 18 when a voltage is applied to the liquid crystal. This orientational direction is also set such that the refractive index of the liquid crystal is smaller than that of the optical waveguide seen from the polarizing direction of the light transmitted through the optical waveguide 16 when no voltage is applied to the liquid crystal.

An angle of torsion of the liquid crystal is set to 0° to 60° and is preferably set to 45°. A tilting angle of the liquid crystal is preferably set to 0.05° to 30°.

For example, a material of the liquid crystal included in the liquid crystal layer 22 is constructed by using ZLI-4389 manufactured by MERK CORP. and having refractive index $n_e$=1.66 in an axial direction of the liquid crystal molecule and refractive index $n_o$=1.50 in a direction perpendicular to an axis of the liquid crystal molecule. The liquid crystal layer 22 has a thickness about 4 μm. A cholesteric liquid crystal is slightly added to this liquid crystal in accordance with necessity.

No orientational film 20 may be disposed in accordance with necessity since liquid crystal molecules are also oriented on the optical waveguide 16 by the rubbing processing.

For brevity, a photodetector 29 and a light source 30 described later are omitted in FIG. 2.

The construction of an opposite substrate 25 composed of the glass substrate 12, the opposite electrode 15, the optical waveguide 16 and the orientational film 20 shown in FIG. 2 will next be explained.

Figure 1:
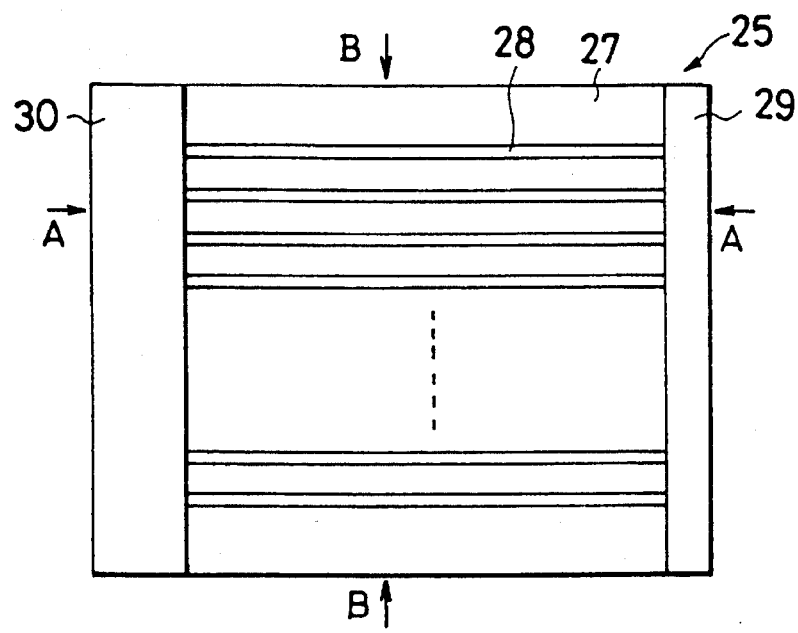
FIG. 1 is a plan view showing the construction of an opposite substrate included in a liquid crystal light valve in the present invention.
Figure 3A:
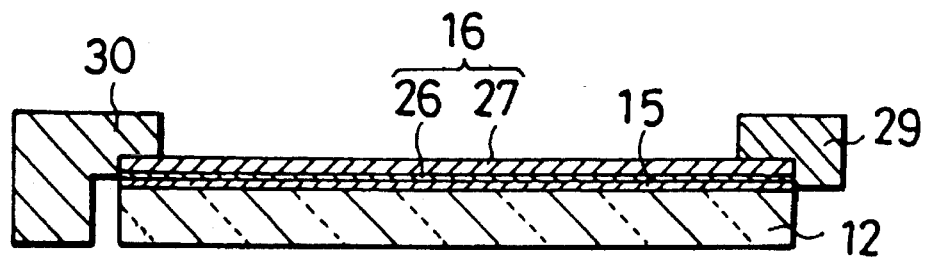
FIGS. 3A and 3B are cross-sectional views of the opposite substrate shown in FIG. 1.
Figure 3B:
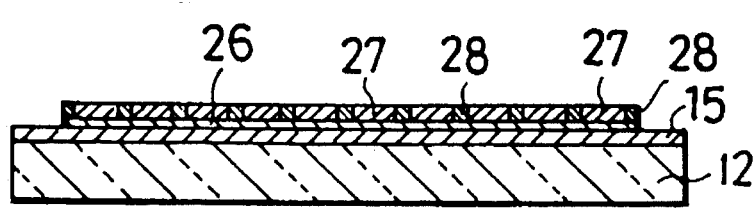

FIG. 1 is a plan view showing the construction of the opposite substrate 25 included in the liquid crystal light valve in the present invention. FIGS. 3A and 3B are cross-sectional views of the opposite substrate 25 shown in FIG. 1 and are respectively taken along lines A—A and B—B of FIG. 1. In these FIGS. 3A and 3B, the orientational film 20 is omitted.

As shown in these figures, the opposite substrate 25 has the glass substrate 12, the opposite electrode 15, the optical waveguide 16, a photodetector 29 and a light source 30. The optical waveguide 16 is composed of a lower clad layer 26, a core layer 27 and a clad layer 28.

The opposite substrate 25 is manufactured as follows.

First, a transparent conductive film composed of ITO is formed on an entire surface of the glass substrate 12, thereby constructing an opposite electrode 15.

Next, epoxy resin is formed as a lower clad layer 26 of the optical waveguide 16 by spin coating. A bisphenol-Z-polycarbonate (PCZ) film including photo polymerized monomer (acrylate such as methyl acrylate) is formed on the lower clad layer 26 by spin coating. An ultraviolet ray is irradiated onto this PCZ film through a photo mask formed in the shape of a stripe, thereby selectively polymerizing this PCZ film. Thus, a PCZ layer is formed as a core layer 27 in the shape of a stripe. Further, a mixing material of PCZ and polyacrylate having a refractive index smaller than that of PCZ is formed in the shape of a stripe as a clad layer 28. In this embodiment, refractive index n of the core layer 27 is set to 1.59 and refractive index n of the clad layer 28 is set to 1.56.

The optical waveguide 18 is composed of the lower clad layer 26, the core layer 27 and the clad layer 28 as mentioned above. The light source 30 and the photodetector 29 are respectively connected to both ends of this optical waveguide 16.

For example, the light source 30 is constructed by a laser, a light emitting diode (LED), etc. The light source 30 is connected to the optical waveguide 16 such that a polarized wave can be guided to the optical waveguide 16 (in TE or T M mode).

For example, the photodetector 29 is constructed by a-Si:H and a-SiGe:H diodes, etc. in accordance with a wavelength of the light source 30. The photodetector 29 is connected to the optical waveguide 16 so as to receive light from the optical waveguide 16.

Figure 4:
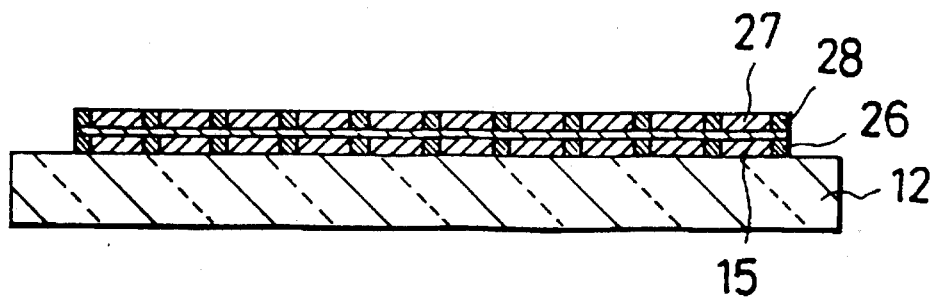
FIG. 4 is a cross-sectional view taken along line B—B of FIG. 1 to explain another construction of the opposite substrate.

FIG. 4 is a cross-sectional view taken along line B—B of FIG. 1 to explain another construction of the opposite substrate 25.

In the above embodiment shown in FIG. 3A and 3B, the opposite electrode 15 is formed on the entire surface of the glass substrate 12. However, as shown in FIG. 4, the opposite electrode 15 may be formed on the glass substrate 12 in the shape of a stripe, and the optical waveguide composed of the lower clad layer 26, the core layer 27 and the clad layer 28 may be formed on the opposite electrode 15 in the shape of a stripe. In this case, the opposite electrode and a scanning electrode are arranged such that these electrodes are perpendicular to each other.

The opposite substrate is constructed by a transparent substrate, but can be also constructed by a monocrystal silicon substrate, or a monocrystal gallium arsenide (GaAs) substrate. When each of these monocrystal substrates is used, the light source and the photodetector can be formed on each of these monocrystal substrates.

The glass substrates 11 and 12 are one embodiment of two substrates of the liquid crystal light valve in the present invention. The optical waveguide 16 is one embodiment of an optical waveguide of the liquid crystal light valve in the present invention. The photoconductive layer 17 is one embodiment of a photoconductive layer of the liquid crystal light valve in the present invention. The photodetector 29 is one embodiment of a light receiving means of the liquid crystal light valve in the present invention. The light source 30 is one embodiment of a light source of the liquid crystal light valve in the present invention.

An operation of the liquid crystal light valve 10 constructed above will next be explained.

Figure 5:
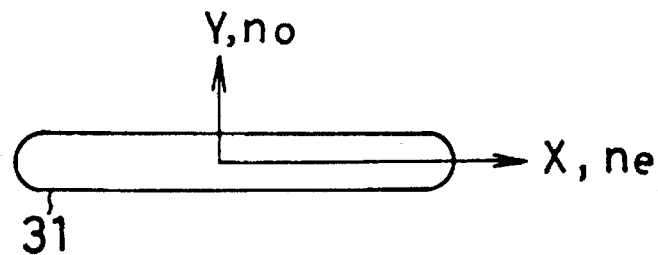
FIG. 5 is a view showing the concept of a liquid crystal molecule to explain a refractive index thereof.

FIG. 5 is a view showing the concept of a liquid crystal molecule to explain a refractive index thereof.

As shown in FIG. 5, a liquid crystal molecule 31 is anisotropic with respect to a refractive index $n_e$ of this liquid crystal molecule in an axial direction X thereof and a refractive index $n_o$ in a direction Y perpendicular to this molecular axial direction X. The relation $n_e > n_o$ is formed. A refractive index $n_w$ of the core layer in the optical waveguide and the refractive indices $n_e$ and $n_o$ of the liquid crystal molecule are set to satisfy the relation $n_e > n_w > n_o$.

In such a set relation, the intensity of light transmitted through the optical waveguide is changed in accordance with an orientational state of the liquid crystal molecule. Namely, when $n_w > n_o$, no light transmitted through the optical waveguide is leaked to the liquid crystal layer so that this light can be transmitted without attenuation. In contrast to this, when $n_e > n_w$, the light transmitted through the optical waveguide is leaked to the liquid crystal layer so that this light is attenuated.

Figure 6A:
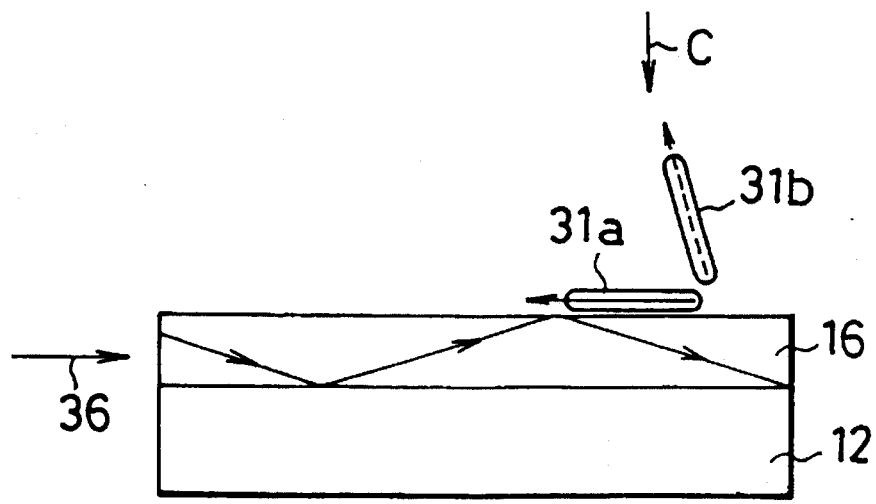
FIGS. 6A and 6B are schematic views showing an orientational state of the liquid crystal molecule when light in TM mode is transmitted through an optical waveguide.
Figure 6B:
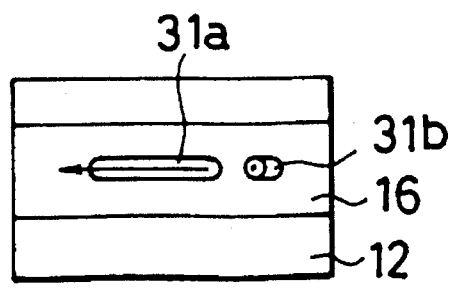

FIGS. 6A and 6B are schematic views showing the orientational state of a liquid crystal molecule when light is transmitted through the optical waveguide 16 in TM mode. FIG. 6A shows cross section of a main portion of the liquid crystal light valve 10. FIG. 6B shows the liquid crystal light valve 10 in FIG. 6A seen from above (the direction of an arrow C).

FIGS. 6A and 6B schematically show the glass substrate 12 and the optical waveguide 16. The opposite electrode 15, etc. are omitted in these figures.

As shown in these figures, the refractive index of a liquid crystal molecule 31*a* is approximately equal to $n_o$ when no voltage is applied to the liquid crystal molecule with respect to light 36 in TM mode from the light source 30 shown in FIGS. 1 and 3A. In contrast to this, when the voltage is applied to the liquid crystal molecule, the refractive index of a liquid crystal molecule 31*b* can be considered to be approximately equal to $n_e$.

Figure 7A:
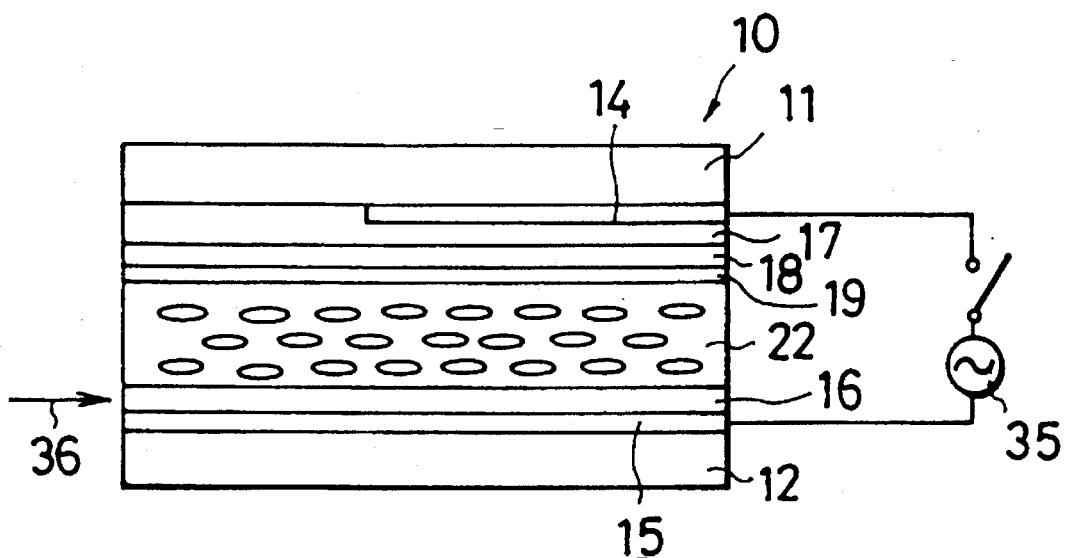
FIGS. 7 A and 7B are schematic views showing an operating state of the liquid crystal light valve in a state in which no driving voltage is applied to the liquid crystal light valve.
Figure 7B:
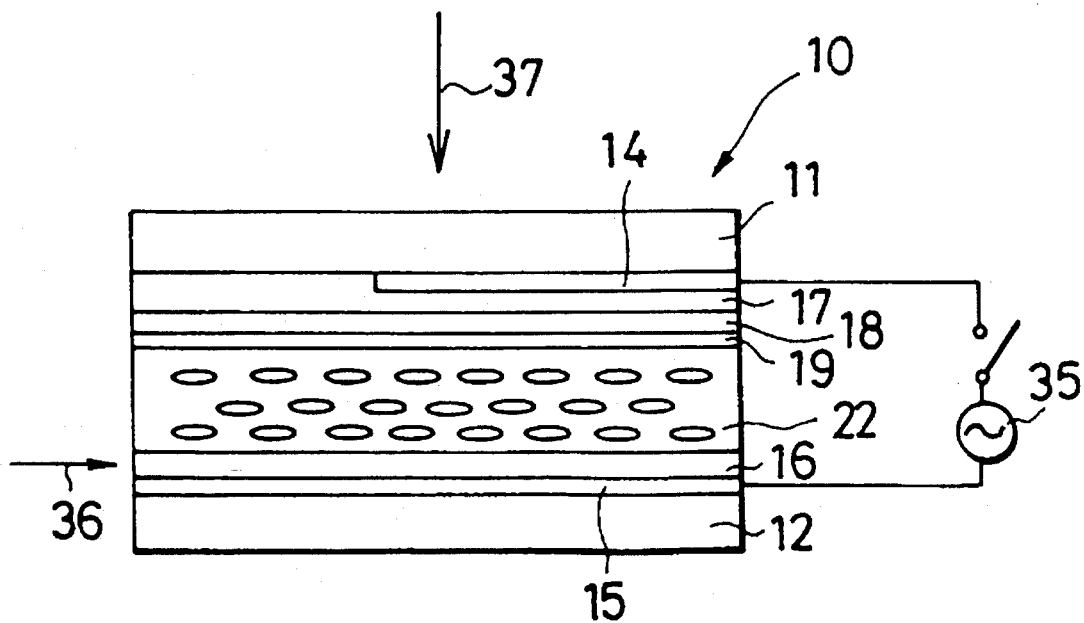

FIGS. 7A and 7B are schematic views showing operating states of the liquid crystal light valve 10 when no driving voltage is applied to the liquid crystal light valve. FIG. 7A shows an operating state of the liquid crystal light valve 10 when no address light is incident to the liquid crystal light valve 10 (in a dark state). FIG. 7B shows an operating state of the liquid crystal light valve 10 when the address light is incident to the liquid crystal light valve 10 (in a light state).

In FIGS. 7A and 7B, the same constructional elements as the liquid crystal light valve 10 shown in FIG. 2 are designated by the same reference numerals as FIG. 2. For example, the antireflection film 13, etc. shown in FIG. 2 are omitted and a shape of the transparent electrode 14 is simplified since no explanation of the liquid crystal light valve is influenced by these members.

As shown in FIGS. 7A and 7B, when no driving voltage is applied by an alternating current power source 35 between an opposite electrode 15 and the transparent electrode 14 of the liquid crystal light valve 10, the refractive index of a liquid crystal layer 22 is approximately equal to $n_o$ with respect to light 36 in TM mode irrespective of the incidence or non-incidence of address light 37, i.e., the light and dark states when the light 36 in TM mode is transmitted to an optical waveguide 16 from the light source 30 shown in FIGS. 1 and 3A. Accordingly, the transmitted light is transmitted through the optical waveguide 16 without attenuation.

Figure 8A:
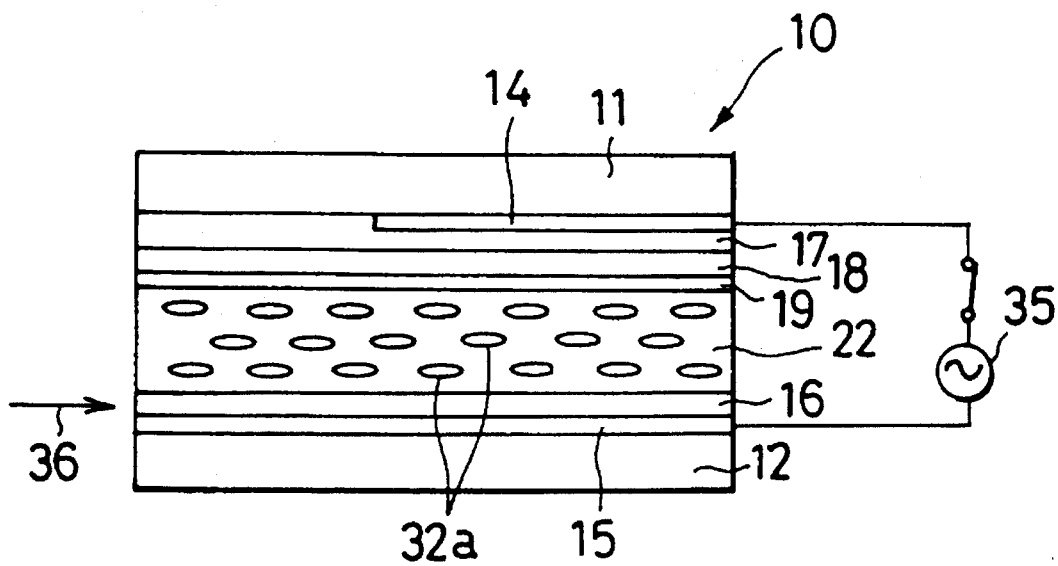
FIGS. 8A and 8B are schematic views showing an operating state of the liquid crystal light valve in a state in which the driving voltage is applied to the liquid crystal light valve.
Figure 8B:
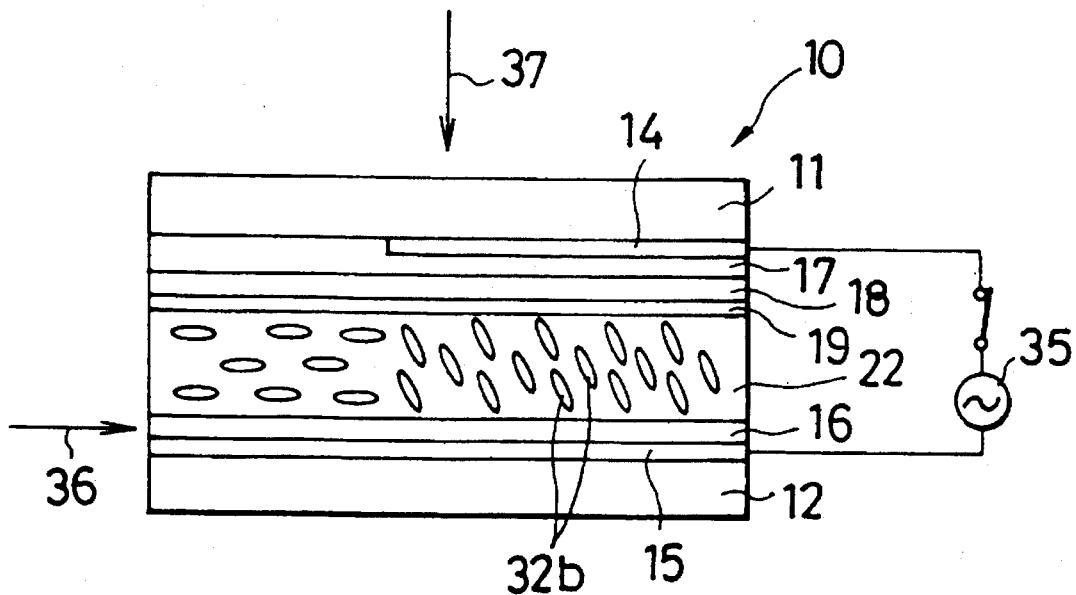

FIGS. 8A and 8B are schematic views showing operating states of the liquid crystal light valve 10 when the driving voltage is applied to the liquid crystal light valve. FIG. 8A shows an operating state of the liquid crystal light valve 10 when no address light is incident to the liquid crystal light valve 10 (in a dark state). FIG. 8B shows an operating state of the liquid crystal light valve 10 when the address light is incident to the liquid crystal light valve 10 (in a light state).

In FIGS. 8A and 8B, the same constructional elements as the liquid crystal light valve 10 shown in FIG. 2 are designated by the same reference numerals as FIG. 2. For example, the antireflection film 13, etc. shown in FIG. 2 are omitted and a shape of the transparent electrode 14 is simplified since no explanation of the liquid crystal light valve is influenced by these members.

As shown in FIGS. 8A and 8B, when a driving voltage is applied by an alternating current power source 35 between an opposite electrode 15 and the transparent electrode 14 of the liquid crystal light valve 10 and light 36 in TM mode is transmitted to an optical waveguide 16, the impedance of a photoconductive layer 17 is high in a dark state in which no address light 37 is incident to the liquid crystal light valve 10. Accordingly, no voltage is almost applied to a liquid crystal layer 22 so that no orientational state of a liquid crystal molecule 32*a* is changed. In this case, when the light 36 in the TM mode is transmitted through the optical waveguide 16, a refractive index of the liquid crystal layer 22 is approximately equal to $n_o$ with respect to the light 36 in the TM mode. Therefore, this light is transmitted through the optical waveguide 16 without attenuation.

In contrast to this, when the address light 37 is incident to the liquid crystal light valve 10 in a light state, the impedance of the photoconductive layer 17 is reduced so that a voltage is applied to the liquid crystal layer 22 and the orientational state of a liquid crystal molecule 32*b* is changed. In this case, the refractive index of the liquid crystal layer 22 is approximately equal to $n_e$ with respect to the light 36 in the TM mode when the light 36 in the TM mode is transmitted to the optical waveguide 16 from the light source 30 shown in FIGS. 1 and 3A. Accordingly, the transmitted light is attenuated in a region in which the voltage is applied to the liquid crystal layer, (i.e., in a region in which the transparent electrode 14 is extended). Therefore, intensity of the light transmitted through the optical waveguide 16 is reduced.

As a result, an electric signal corresponding to the orientational state of a liquid crystal is obtained when this light intensity is detected by the photodetector 29 shown in FIGS. 1 and 3 at a terminal end of the optical waveguide 16. Further, gradational data can be outputted as an electric signal since a refractive index of the liquid crystal seen from a polarizing direction of the light transmitted through the optical waveguide 16 is increased by an increase in applied voltage.

Conversely, the refractive index of the liquid crystal can be set to be greater than that of the optical waveguide 16 seen from the polarizing direction of the light transmitted through the optical waveguide 16 when no voltage is applied to the liquid crystal. Further, the refractive index of the liquid crystal can be set to be smaller than that of the optical waveguide 16 seen from the polarizing direction of the light transmitted through the optical waveguide 16 when the voltage is applied to the liquid crystal. In this case, it is preferable to use a nematic liquid crystal having a negative dielectric constant and set a tilting angle to 60° to 90°.

In the orientational state of the above liquid crystal molecule, the refractive index of the liquid crystal layer 22 is equal to $n_o$ irrespective of the application or unapplication of the driving voltage when light 36 in TE mode is transmitted through the optical waveguide 16. Accordingly, this light is transmitted through the optical waveguide 16. In this case, the orientational state of the liquid crystal molecule is changed.

Figure 9A:
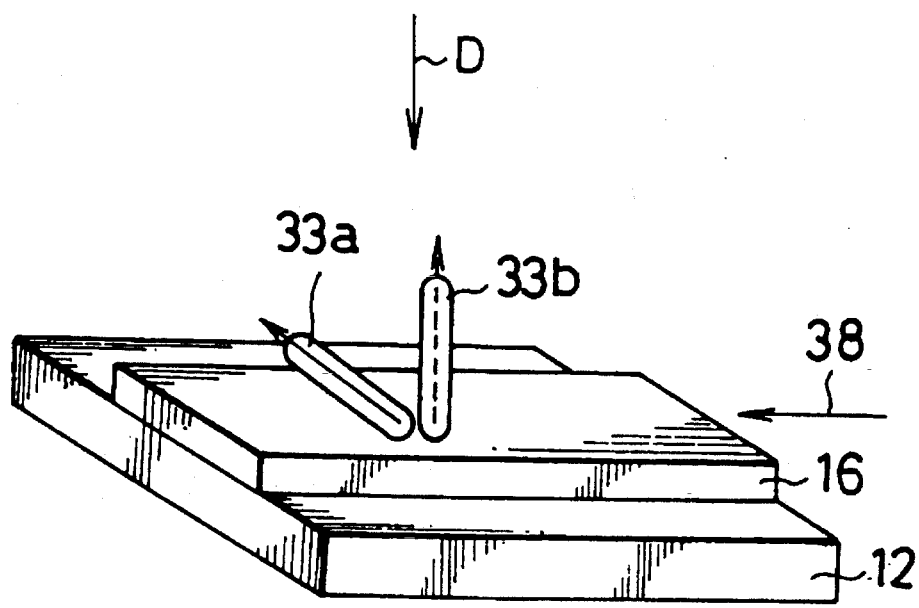
FIGS. 9A and 9B are schematic views showing an orientational state of the liquid crystal molecule when light in TE mode is transmitted through the optical waveguide.
Figure 9B:
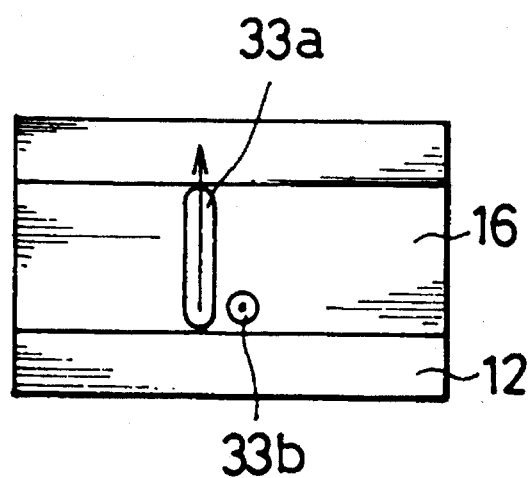

FIGS. 9A and 9B are schematic views showing the orientational state of a liquid crystal molecule when light in TE mode is transmitted through an optical waveguide 16. FIG. 9A shows a main portion of a liquid crystal light valve 10. FIG. 9B is a schematic view of the liquid crystal light valve 10 in FIG. 9A seen from above (the direction of an arrow D).

FIGS. 9A and 9B schematically show a glass substrate 12 and the optical waveguide 16. An opposite electrode 15, etc. are omitted in these figures.

As shown in these figures, the refractive index of a liquid crystal molecule 33a is approximately equal to $n_e$ when no voltage is applied to the liquid crystal molecule with respect to light 38 in TE mode from the light source 30 shown in FIGS. 1 and 3A. In contrast to this, when the voltage is applied to the liquid crystal molecule, the refractive index of a liquid crystal molecule 33b can be considered to be approximately equal to $n_o$.

As mentioned above, it is necessary to set the orientational state of the liquid crystal molecule in accordance with a transmitting mode of light transmitted through the optical waveguide 16.

Accordingly, in accordance with the liquid crystal light valve in the above-mentioned embodiment, information formed in the liquid crystal layer and corresponding to address light can be read as an optical signal and directly read as an electric signal.

An information processor including a mechanism for converting optical information to an electric signal will next be explained.

Figure 10:
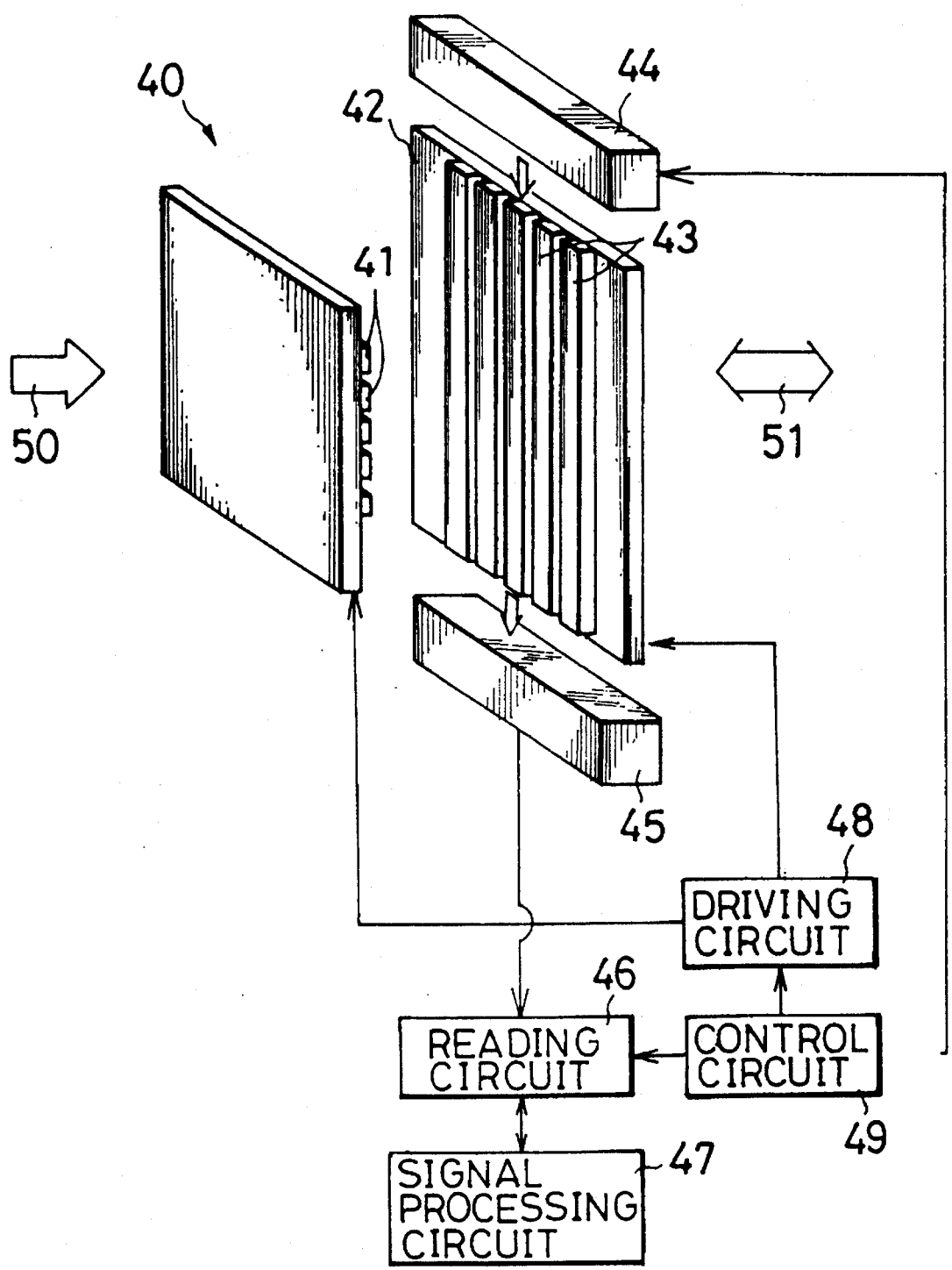
FIG. 10 is a view showing the construction of an information processor including a mechanism for converting optical information to an electric signal in accordance with one embodiment of the present invention.

FIG. 10 is a view showing the construction of an information processor including a mechanism for converting optical information to an electric signal in accordance with one embodiment of the present invention.

As shown in FIG. 10, the information processor in this embodiment has a liquid crystal light valve 40 and a mechanism for converting optical information to an electric signal. The liquid crystal light valve 40 includes a scanning electrode 41, an opposite electrode 42, an optical waveguide 43, a light source 44 and a photodetector 45. The converting mechanism includes a reading circuit 46, a signal processing circuit 47, a driving circuit 48 and a control circuit 49.

Figure 19:
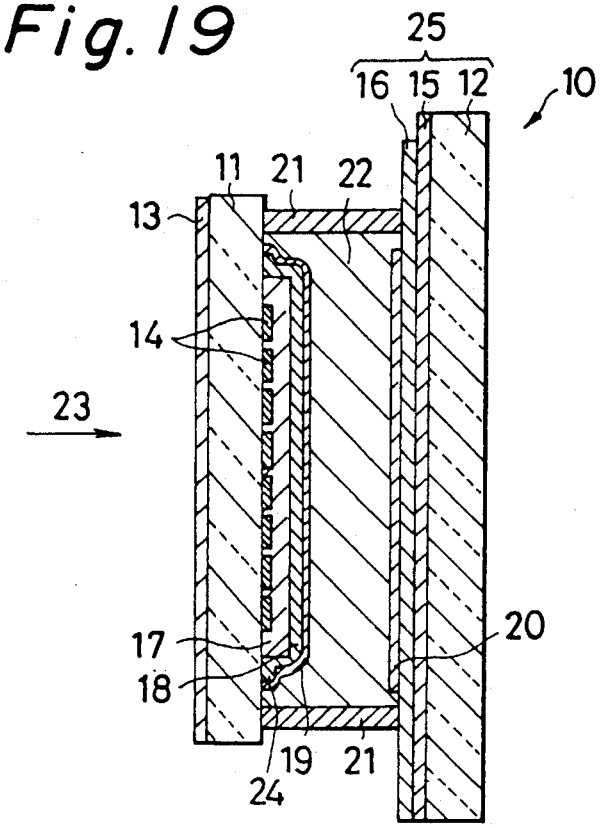
FIG. 19 is a cross-sectional view showing the construction of a liquid crystal light valve as a first embodiment constituting an image reading section of the image copying machine in the present invention.

The liquid crystal light valve 40 corresponds to the liquid crystal light valve 10 shown in FIG. 2 or FIG. 19. The scanning electrode 41, the opposite electrode 42 and the optical waveguide 43 respectively correspond to the transparent electrode 14, the opposite electrode 15 and the optical waveguide 16 shown in FIG. 2 or FIG. 19. Further, the light source 44 and the photodetector 45 respectively correspond to the light source 30 and the photodetector 29 shown in FIGS. 1 and 3.

The control circuit 49 is connected to the light source 44, the reading circuit 46 and the driving circuit 48. The driving circuit 48 is connected to the scanning electrode 41 and the opposite electrode 42. The reading circuit 46 is connected to the photodetector 45 and the signal processing circuit 47.

The mechanism for converting optical information to an electric signal and including the reading circuit 46, the signal processing circuit 47, the driving circuit 48 and the control circuit 49 is shown as one embodiment of a mechanism for converting light including information to an electric signal in the information processor having the liquid crystal light valve in the present invention.

An operation of this information processor will next be explained.

Polarized light is guided to the optical waveguide 43 from the light source 44 at any time. The information processor is set in a state in which light transmitted through the optical waveguide 43 can be converted to an electric signal by using the photodetector 45. When light 50 including information is incident to the liquid crystal light valve 40, a voltage is applied between the opposite electrode 42 and the scanning electrode 41 through the driving circuit 48.

The information processor is operated as follows by the application of this voltage.

When the voltage is applied to the scanning electrode 41 on only one line, the orientational state of a liquid crystal molecule corresponding to a position of the scanning electrode 41 is changed in accordance with a light or dark state of light. Thus, the intensity of light transmitted through each of optical waveguides 43 is modulated. When an output of the photodetector 45 is read by the reading circuit 46 in synchronization with this modulation, an electric signal of optical information corresponding to the scanning electrode 41 is obtained. When such an operation of the scanning electrode 41 is sequentially performed with respect to an entire picture, an electric signal corresponding to two-dimensional optical information is obtained.

The optical information is converted to an optical signal as follows.

Light of the light source 44 is interrupted and a voltage is applied between the opposite electrode 42 and the scanning electrode 41 through the driving circuit 48. When light 50 including information is incident to the liquid crystal light valve in this state, the impedance of a photoconductive layer is changed in accordance with a light or dark state of this light so that the orientational state of a liquid crystal is changed. An optical signal corresponding to the optical information can be obtained by making reading light 51 incident to a liquid crystal layer and monitoring reflected light modulated by the liquid crystal layer.

Accordingly, in accordance with this embodiment, an electric signal can be taken out of the liquid crystal light valve 40 together with the optical signal. Therefore, it is possible to realize a compact information processor for reading information with high function.

Figure 11:
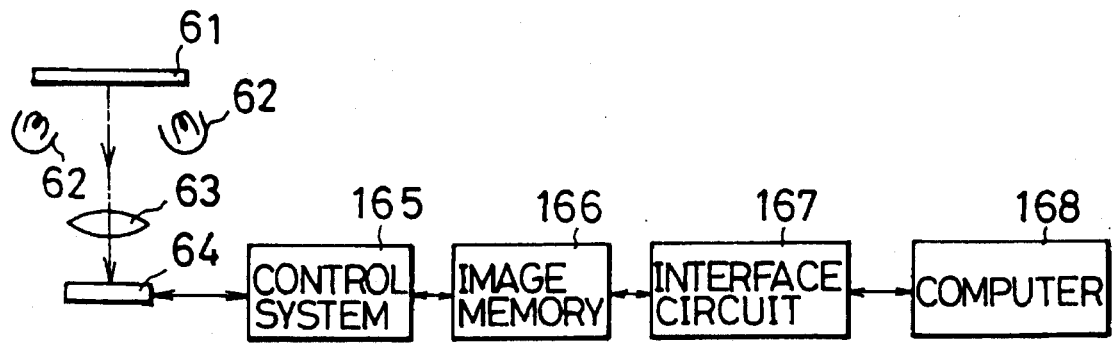
FIG. 11 is a view showing the systematic construction of an image scanner using the liquid crystal light valve 10 shown in FIG. 1 as an image pickup element.

FIG. 11 is a view showing the systematic construction of an image scanner using the liquid crystal light valve 10 shown in FIG. 2 as an image reading element.

As shown in FIG. 11, the image scanner in this embodiment has a light source 62, a lens 63, a liquid crystal light valve 64, a control system 165, an image memory 166, an interface circuit 167 and a computer 168.

The liquid crystal light valve 64 corresponds to the liquid crystal light valve 10 shown in FIG. 2.

Light is irradiated to an original 61 from the light source 62. Light reflected on the original 61 is incident to the liquid crystal light valve 64 through the lens 63 so that an image is focused and formed on the liquid crystal light valve 64.

At this time, an electric signal corresponding to the image is obtained when a scanning electrode of the liquid crystal light valve 64 (as an electrode corresponding to the transparent electrode 14 shown in FIG. 2) is sequentially operated by the control system 165. Image information data corresponding to this electric signal are stored to the image memory 166.

The image information data stored to the image memory 166 can be read through the interface circuit 167 from the computer 168 in accordance with necessity.

Since the image can be read by the liquid crystal light valve 64, it is possible to form a large-sized image reading element with high resolution by increasing a panel size and finely dividing an optical waveguide.

A liquid crystal light valve in accordance with a second embodiment of the present invention will next be explained.

Figure 12:
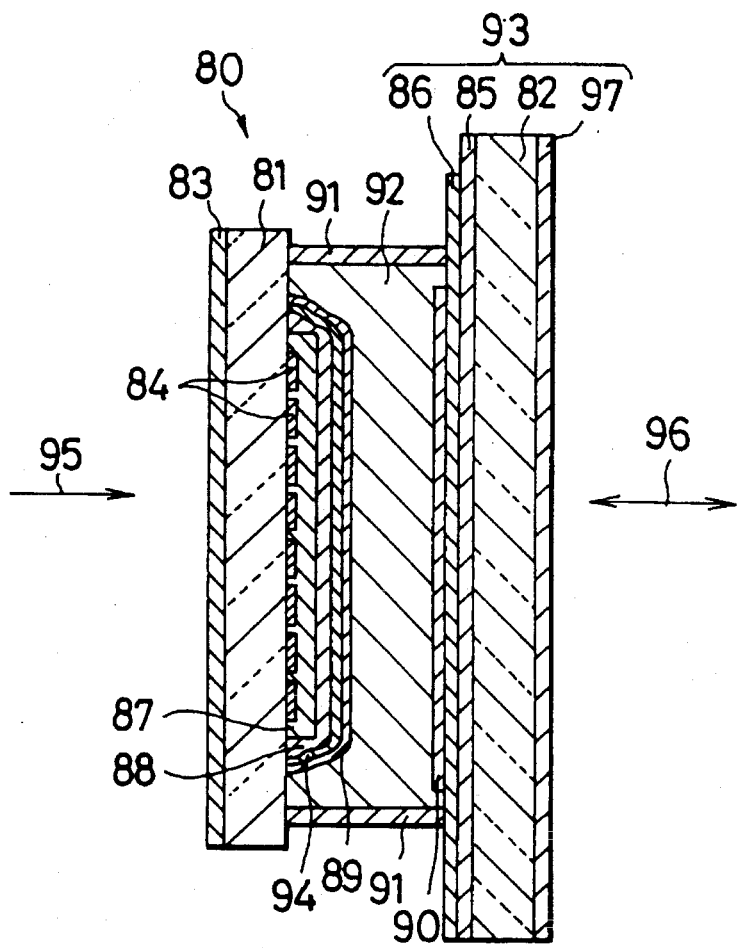
FIG. 12 is a cross-sectional view showing the construction of a liquid crystal light valve in accordance with a second embodiment of the present invention.

FIG. 12 is a cross-sectional view showing the construction of a liquid crystal light valve in the second embodiment of the present invention.

As shown in FIG. 12, the liquid crystal light valve 80 in this embodiment has glass substrates 81, 82, antireflection films 83, 94, a transparent electrode 84, an opposite electrode 85, an optical waveguide 86, a photoconductive layer 87, a light interrupting layer 88, orientational films 89, 90, a spacer 91, a liquid crystal layer 92 and a dielectric mirror 94.

This liquid crystal light valve 80 is manufactured as follows.

First, a transparent conductive film composed of laminated layers of ITO and $SnO_2$ is evaporated on the glass substrate 81 as a light transmitting substrate by using a sputtering method. A transparent electrode 84 for scanning is formed by patterning the evaporated transparent conductive film in the shape of a stripe by reactive ion etching.

An amorphous silicon hydride (a-Si:H) film is next formed as a photoconductive layer 87 on the transparent electrode 84. The amorphous silicon hydride (a-Si:H) film constituting the photoconductive layer 87 is constructed by using silane ($SiH_4$) and argon (Ar) gases and is formed by using an ECR plasma CVD method. This amorphous silicon hydride (a-Si:H) film has a thickness about 7 μm.

Next, acrylic resin of a carbon dispersion type is formed on the photoconductive layer 87 by spin coating as a light interrupting layer 88 for interrupting light incident to the photoconductive layer 87 from the side of a liquid crystal layer described later. Thereafter, a multiple layer film composed of titanium and silicon oxides is formed on the light interrupting layer 88 by an electronic beam (EB) evaporation method as a dielectric mirror 94 for reflecting light incident to the photoconductive layer 87 from the liquid crystal layer side.

An antireflection film 83 is formed on an incident side of writing light 95 with respect to the glass substrate 81 and prevents this light from being reflected on a surface of this glass substrate.

A fiber plate can be used as a light transmitting substrate instead of the above glass substrate.

A transparent conductive film composed of ITO is evaporated on a glass substrate 82 opposed to the glass substrate 81 by using a sputtering method, thereby forming an opposite electrode 85.

An optical waveguide 86 is next formed in the shape of a stripe on the opposite electrode 85 by selective photo polymerization using a thin high polymer film.

An antireflection film 97 is formed on an incident side of reading light 96 with respect to the glass substrate 82 and prevents this light from being reflected on a surface of this glass substrate.

Next, a polyimide film is formed by spin coating as each of orientational films 89 and 90 on the dielectric mirror 94 and the optical waveguide 86, respectively. Thereafter, molecular orientational processing is performed by rubbing surfaces of the orientational films 89 and 90.

The glass substrates 81 and 82 having the above layers and films thereon are stuck to each other through a spacer 91. A nematic liquid crystal having a positive dielectric constant is injected and sealed in vacuum as a liquid crystal layer 92 between the glass substrates 81 and 82, thereby constructing a liquid crystal light valve 80.

The orientational direction of a liquid crystal molecule coming in contact with the optical waveguide 86 is set such that the refractive index of a liquid crystal is larger than that of the optical waveguide seen from a polarizing direction of light transmitted through the optical waveguide 86 when a voltage is applied to the liquid crystal. This orientational direction is also set such that the refractive index of the liquid crystal is smaller than that of the optical waveguide seen from the polarizing direction of the light transmitted through the optical waveguide 86 when no voltage is applied to the liquid crystal.

A hybrid electric field effect (HFE) mode is used as a liquid crystal display mode. An angle of torsion of the liquid crystal is set to 30° to 60°. A tilting angle of the liquid crystal is preferably set to 0.05° to 10°. The liquid crystal layer 92 preferably has a thickness about 5 μm.

No orientational film 90 may be disposed in accordance with necessity since liquid crystal molecules are also oriented on the optical waveguide 86 by the rubbing processing.

An opposite substrate 93 is composed of the glass substrate 82, the opposite electrode 85, the optical waveguide 86, the orientational film 90 and the antireflection film 97 in the liquid crystal light valve 80 in this second embodiment. This opposite substrate 93 has unillustrated photodetector and light source respectively corresponding to the photodetector 29 and the light source 30 shown in FIGS. 1 and 3A. An operation of the liquid crystal light valve 80 is similar to the above-mentioned operation explained with reference to FIGS. 6A to 9B.

The glass substrates 81 and 82 are one embodiment of two substrates of the liquid crystal light valve in the present invention. The optical waveguide 86 is one embodiment of an optical waveguide of the liquid crystal light valve in the present invention. The photoconductive layer 87 is one embodiment of a photoconductive layer of the liquid crystal light valve in the present invention. The photodetector 29 shown in FIGS. 1 and 3A is one embodiment of a light receiving means of the liquid crystal light valve in the present invention. The light source 30 shown in FIGS. 1 and 3A is one embodiment of a light source of the liquid crystal light valve in the present invention.

Accordingly, in accordance with the liquid crystal light valve in the above-mentioned embodiment, information formed in the liquid crystal layer and corresponding to address light can be read as an optical signal and directly read as an electric signal.

A projecting type display device using the liquid crystal light valve 80 as an optical modulating element will next be explained.

Figure 13:
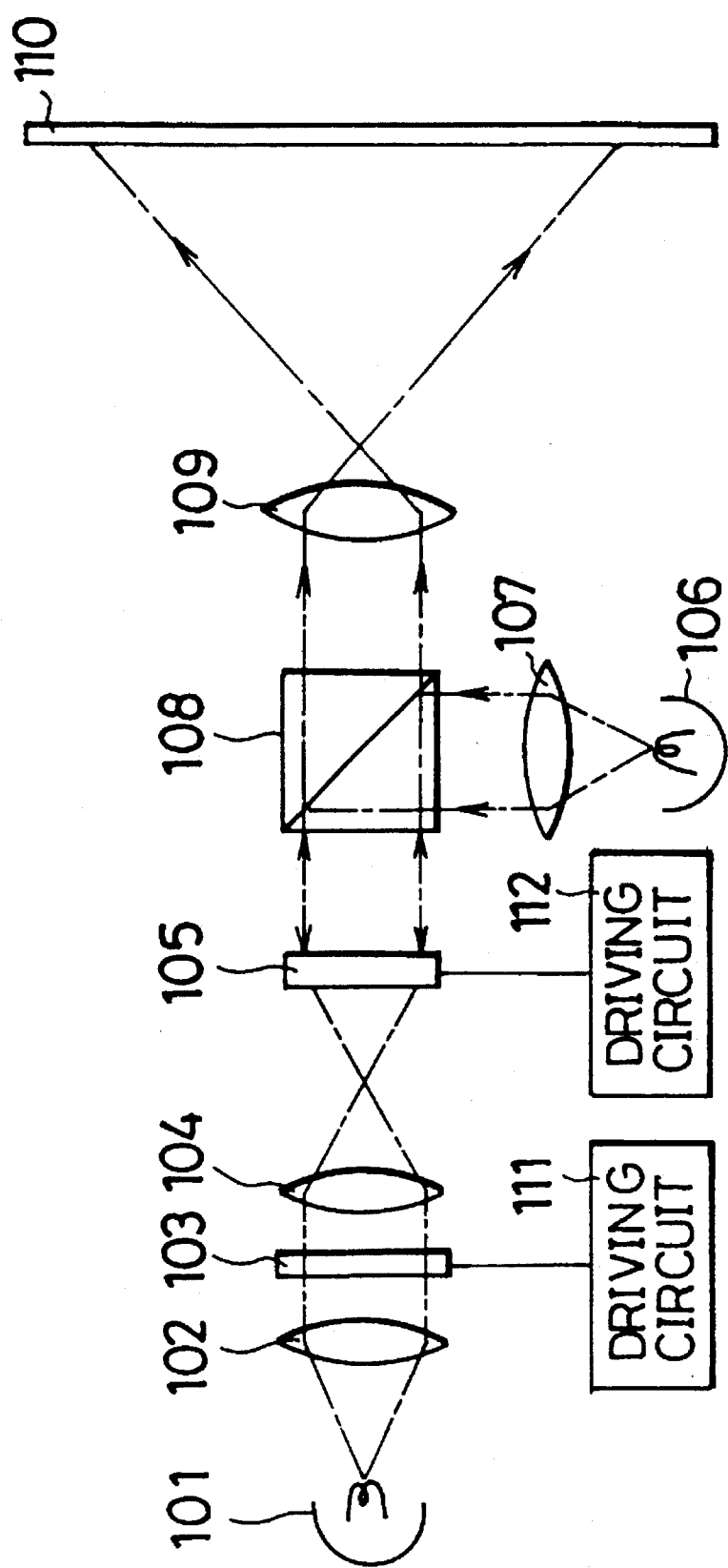

FIG. 13 is a view showing the systematic construction of a projecting type display device using the liquid crystal light valve 80 shown in FIG. 12 as an optical modulating element.

As shown in FIG. 13, the projecting type display device in this embodiment has lamps 101, 106, lenses 102, 104, 107, 109, a transmission type liquid crystal panel 103, a liquid crystal light valve 105, a polarizing beam splitter 108, a screen 110, and driving circuits 111, 112.

The liquid crystal light valve 105 corresponds to the liquid crystal light valve 80 shown in FIG. 12.

The driving circuits 111 and 112 are respectively connected to the transmission type liquid crystal panel 103 and the liquid crystal light valve 105.

Light from the lamp 101 is incident to the transmission type liquid crystal panel 103 through the lens 102. This light is formed as an image on the transmission type liquid crystal panel 103. This image is focused and formed as an image on the liquid crystal light valve 105 through the lens 104.

Light from the lamp 106 is incident to the liquid crystal light valve 105 having the formed image through the lens 107 and the polarizing beam splitter 108. This incident light is reflected on a dielectric mirror (corresponding to the dielectric mirror 93 shown in FIG. 12) included in the liquid crystal light valve 105. The reflected light is partially transmitted through a portion of a liquid crystal layer in which an orientational state of the liquid crystal layer is changed. A polarizing direction of this partial reflected light is changed by electrooptic effects so that this light can be transmitted through the polarizing beam splitter 108. This reflected light is enlarged by the lens 109 so that an image formed on the liquid crystal light valve 105 is projected on the screen 110.

An embodiment of a combinational apparatus of a copying machine and a printer using the liquid crystal light valve 80 in the second embodiment shown in FIG. 12 will next be explained.

Figure 14:
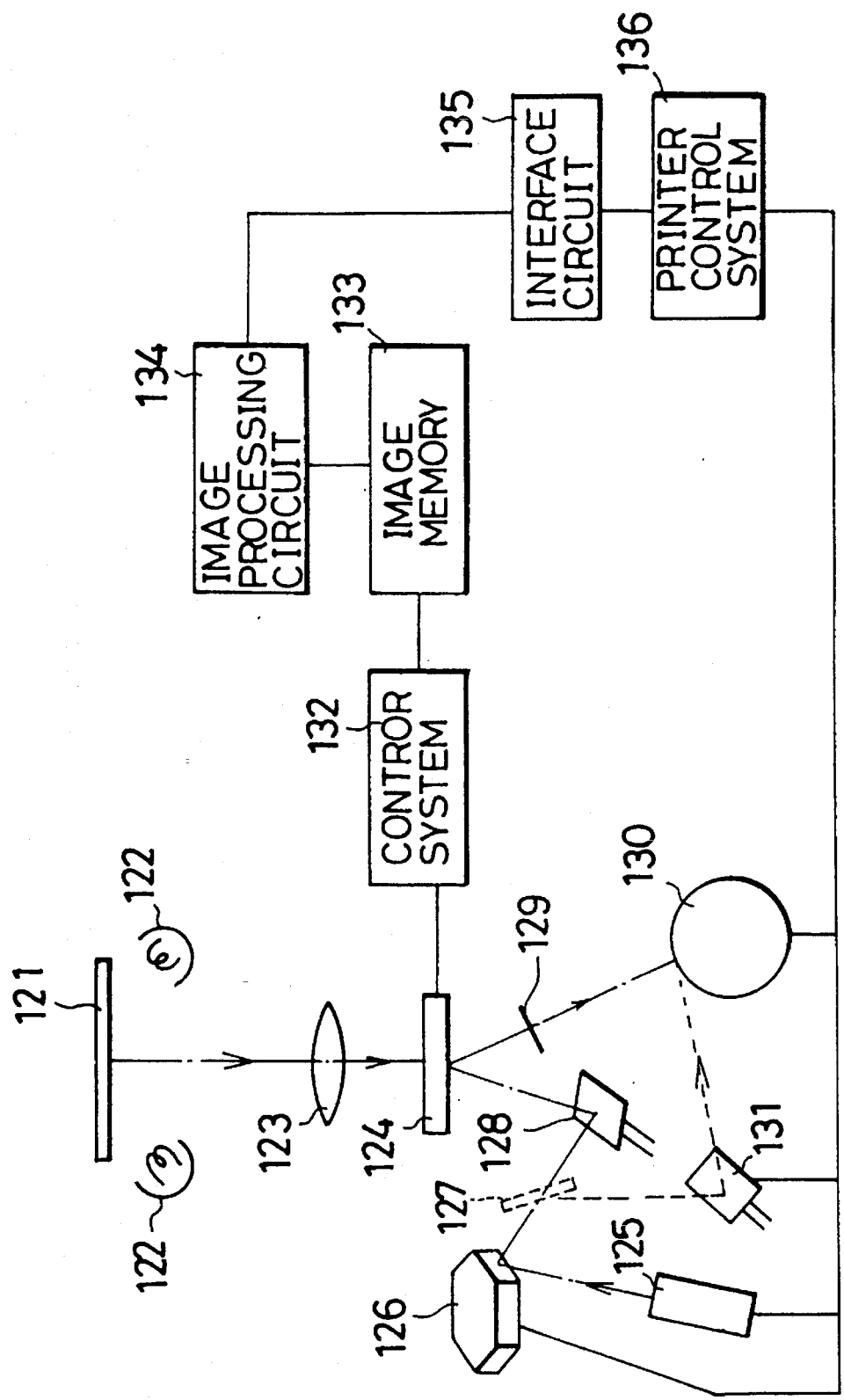
FIG. 14 is a view showing the systematic construction of an apparatus combining a copying machine with a printer by using the liquid crystal light valve shown in FIG. 12.

FIG. 14 is a view showing the systematic construction of a combinational apparatus of a copying machine and a printer using the liquid crystal light valve 80 shown in FIG. 12.

As shown in FIG. 14, the combinational apparatus of the copying machine and the printer in this embodiment has a light source 122, a lens 123, a liquid crystal light valve 124, a laser light emitting device 125, a polygon mirror 126, a mirror 127, galvanomirrors 128, 131, a polarizing plate 129, a photosensitive drum 130, a control system 132, an image memory 133, an image processing circuit 134, an interface circuit 135 and a printer control system 136.

The liquid crystal light valve 124 corresponds to the liquid crystal light valve 80 shown in FIG. 12 and is connected to the control system 132.

The laser light emitting device 125, the polygon mirror 126, the galvanomirror 131 and the photosensitive drum 130 are connected to the printer control system 136.

Each of the control system 132, the image memory 133, the image processing circuit 134, the interface circuit 135 and the printer control system 136 is one embodiment of a mechanism for converting light including information to an electric signal in the information processor having the liquid crystal light valve in the present invention.

In this combinational apparatus, an image is read as follows.

Light is irradiated from the light source 122 to an original 121. Light reflected on the original 121 is focused and formed as an image on the liquid crystal light valve 124 through the lens 123.

At this time, an electric signal corresponding to the image is obtained when a scanning electrode of the liquid crystal light valve 124 (as an electrode corresponding to the transparent electrode 84 shown in FIG. 12) is sequentially operated by the control system 132. Image information data corresponding to this electric signal are stored to the image memory 133 and can be treated as a digital signal.

The original 121 is copied by a laser scanning system. Namely, a voltage is applied between an opposite electrode of the liquid crystal light valve 124 and the scanning electrode of the liquid crystal light valve 124. This opposite electrode and this scanning electrode respectively correspond to the opposite electrode 85 and the transparent electrode 84 shown in FIG. 12. Thus, the liquid crystal light valve 124 is operated to write the image. At this time, the orientational state of a liquid crystal in the liquid crystal light valve 124 is changed in accordance with the image.

An entire surface of the liquid crystal light valve 124 is scanned through the galvanomirror 128 and the polygon mirror 126 controlled by an operation of the printer control system 136 by using a polarized laser beam from the laser light emitting device 125.

The laser beam incident to the liquid crystal light valve 124 is reflected on a dielectric mirror (corresponding to the dielectric mirror 93 shown in FIG. 12). The reflected light is partially transmitted through a portion of a liquid crystal layer in which an orientational state of the liquid crystal layer is changed. A polarizing direction of this partial reflected light is modulated by electrooptic effects of the liquid crystal so that this light can be transmitted through the polarizing plate 129.

The reflected light transmitted through the polarizing plate 129 is written to the photosensitive drum 130. An image is copied by transmitting image data recorded onto the photosensitive drum 130 through a printing process.

The image of the original 121 is digitally processed and printed by the image processing circuit 134 and the laser scanning system. Namely, the above image data stored to the image memory 133 are read therefrom and are processed by the image processing circuit 134 and are transferred to the printer control system 136 through the interface circuit 135.

The laser scanning system is operated in accordance with the image data. Namely, the laser light emitting device 125 scans the polygon mirror 126, the mirror 127 and the galvanomirror 131 while the laser light emitting device 125 emits the laser beam or stops the emission of the laser beam in accordance with the image data. Thus, the image data are written onto the photosensitive drum 130. The image data recorded to the photosensitive drum 130 are printed through a printing process.

The mirror 127 of the laser scanning system is inserted onto an optical path when the image data are printed. The mirror 127 of the laser scanning system is moved outside this optical path when a copy is made. Thus, the laser scanning system is constructed such that the optical path is switched in accordance with purposes.

Accordingly, it is possible to manufacture an information processor having many functions by using the liquid crystal light valve in the present invention.

Figure 15:
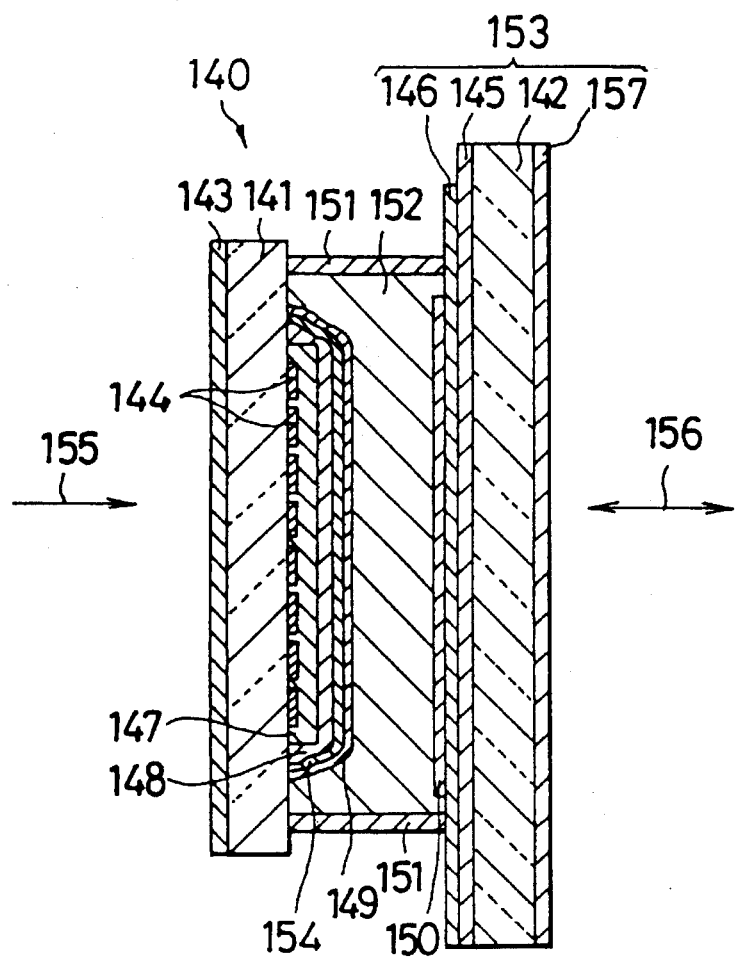
FIG. 15 is a cross-sectional view showing the construction of a liquid crystal light valve in accordance with a third embodiment of the present invention.

FIG. 15 is a cross-sectional view showing the construction of a liquid crystal light valve in accordance with a third embodiment of the present invention.

As shown in FIG. 15, the liquid crystal light valve 140 in this embodiment has glass substrates 141, 142, antireflection films 143, 154, a transparent electrode 144, an opposite electrode 145, an optical waveguide 146, a photoconductive layer 147, a light interrupting layer 148, orientational films 149, 150, a spacer 151, a liquid crystal layer 152 and a dielectric mirror 154.

This liquid crystal light valve 140 is manufactured as follows.

First, a transparent conductive film composed of laminated layers of ITO and $SnO_2$ is evaporated on the glass substrate 141 as a light transmitting substrate by using a sputtering method. A transparent electrode 144 for scanning is formed by patterning the evaporated transparent conductive film in the shape of a stripe by reactive ion etching.

An amorphous silicon carbide hydride (a-SiC:H) film is next formed as a photoconductive layer 147 on the transparent electrode 144. The amorphous silicon carbide hydride (a-SiC:H) film constituting the photoconductive layer 147 is constructed by using silane ($SiH_4$), ethylene($C_2H_4$) and hydrogen ($H_2$) gases and is formed by using a plasma CVD method. This amorphous silicon carbide hydride (a-SiC:H) film has a thickness about 6 µm.

Next, acrylic resin of a carbon dispersion type is formed on the photoconductive layer 147 by spin coating as a light interrupting layer 148 for interrupting light incident to the photoconductive layer 147 from the side of a liquid crystal layer described later. Thereafter, a multiple layer film composed of tantalum and silicon oxides is formed on the light interrupting layer 148 by an electronic beam evaporation method as a dielectric mirror 154 for reflecting light incident to the photoconductive layer 147 from the liquid crystal layer side.

An antireflection film 143 is formed on an incident side of writing light 155 with respect to the glass substrate 141 and prevents this light from being reflected on a surface of this glass substrate.

A fiber plate can be used as a light transmitting substrate instead of the above glass substrate.

A transparent conductive film composed of ITO is evaporated on a glass substrate 142 opposed to the glass substrate 141 by using a sputtering method, thereby forming an opposite electrode 145.

An optical waveguide 146 is next formed in the shape of a stripe in the same pattern on the opposite electrode 145 by selective photo polymerization using a thin high polymer film.

An antireflection film 157 is formed on an incident side of reading light 156 with respect to the glass substrate 142 and prevents this light from being reflected on a surface of this glass substrate.

Next, a polyimide film is formed by spin coating as each of orientational films 149 and 150 on the dielectric mirror 158 and the optical waveguide 148, respectively. Thereafter, molecular orientational processing is performed by rubbing surfaces of the orientational films 149 and 150.

The orientational films 149 and 150 can be formed by rhombic evaporation of an inorganic film of silicon oxide, etc.

The glass substrates 141 and 142 having the above layers and films thereon are stuck to each other through a spacer 151. A ferroelectric liquid crystal is injected and sealed in vacuum as a liquid crystal layer 152 between the glass substrates 141 and 142, thereby constructing a liquid crystal light valve 140.

The orientational direction of a liquid crystal molecule coming in contact with the optical waveguide 146 is set such that the refractive index of a liquid crystal is larger than that of the optical waveguide seen from a polarizing direction of light transmitted through the optical waveguide 146 when a voltage is applied to the liquid crystal. This orientational direction is also set such that the refractive index of the liquid crystal is smaller than that of the optical waveguide seen from the polarizing direction of the light transmitted through the optical waveguide 146 when no voltage is applied to the liquid crystal.

A surface stabilized ferroelectric liquid crystal (SSFLC) mode is used as a liquid crystal display mode. For example, a material of the liquid crystal is constructed by using SCE12 manufactured by BDH CORP. and having refractive index $n_e=1.65$ in an axial direction of the liquid crystal molecule and refractive index $n_o=1.49$ in a direction perpendicular to an axis of the liquid crystal molecule. The liquid crystal layer 152 has a thickness about 2 μm.

No orientational film 150 may be disposed in accordance with necessity since liquid crystal molecules are also oriented on the optical waveguide 146 by the rubbing processing.

An opposite substrate 154 is composed of the glass substrate 142, the opposite electrode 145, the optical waveguide 148, the orientational film 150 and the antireflection film 157 in the liquid crystal light valve 140 in this third embodiment. This opposite substrate 154 has unillustrated photodetector and light source respectively corresponding to the photodetector 29 and the light source 30 shown in FIGS. 1 and 3A. An operation of the liquid crystal light valve 140 is similar to the above-mentioned operation explained with reference to FIGS. 6A to 9B.

The glass substrates 141 and 142 are one embodiment of two substrates of the liquid crystal light valve in the present invention. The optical waveguide 146 is one embodiment of an optical waveguide of the liquid crystal light valve in the present invention. The photoconductive layer 147 is one embodiment of a photoconductive layer of the liquid crystal light valve in the present invention. The photodetector 29 shown in FIGS. 1 and 3A is one embodiment of a light receiving means of the liquid crystal light valve in the present invention. The light source 30 shown in FIGS. 1 and 3A is one embodiment of a light source of the liquid crystal light valve in the present invention.

Accordingly, in accordance with the liquid crystal light valve in the above-mentioned embodiment, information formed in the liquid crystal layer and corresponding to address light can be read as an optical signal and directly read as an electric signal.

Figure 16A:
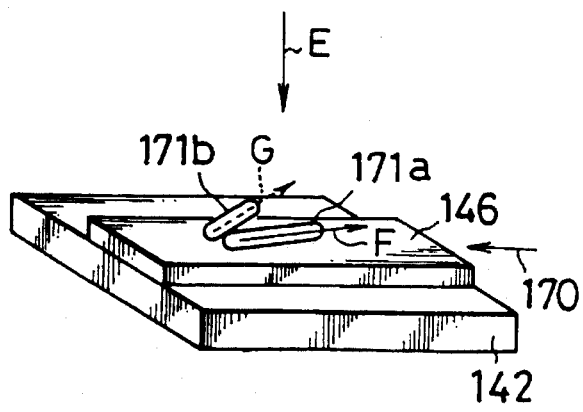
Figure 16B:
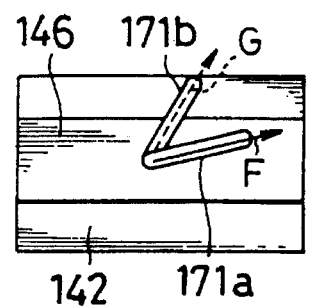

FIGS. 16A and 16B are schematic views showing the orientational state of a ferroelectric liquid crystal molecule when light in TE mode is transmitted through the optical waveguide 146. FIG. 16A shows a main portion of the liquid crystal light valve 140. FIG. 16B is a schematic view of the liquid crystal light valve 140 in FIG. 16A seen from above (the direction of an arrow E). FIGS. 16A and 16B schematically show a glass substrate 142 and the optical waveguide 146. An opposite electrode 145, etc. are omitted in these figures.

As shown in these figures, a liquid crystal molecule 171a is oriented in the direction of an arrow F shown in FIG. 16A in a state in which no voltage is applied to a liquid crystal layer with respect to light 170 in TE mode from an unillustrated light source corresponding to the light source 30 shown in FIGS. 1 and 3A. In this state, the refractive index of a liquid crystal is smaller than that of the optical waveguide. Accordingly, the light 170 in the TE mode is transmitted through the optical waveguide 146 without attenuation.

In contrast to this, a liquid crystal molecule 171b is oriented in the direction of an arrow G shown in FIG. 16 in a state in which the voltage is applied to the liquid crystal layer. At this time, the refractive index of the liquid crystal is greater than that of the optical waveguide. Accordingly, the light 170 in the TE mode from the light source is attenuated since this light is leaked to the liquid crystal layer. Thus, the ferroelectric liquid crystal can be also utilized in the liquid crystal light valve in the present invention.

Figure 17:
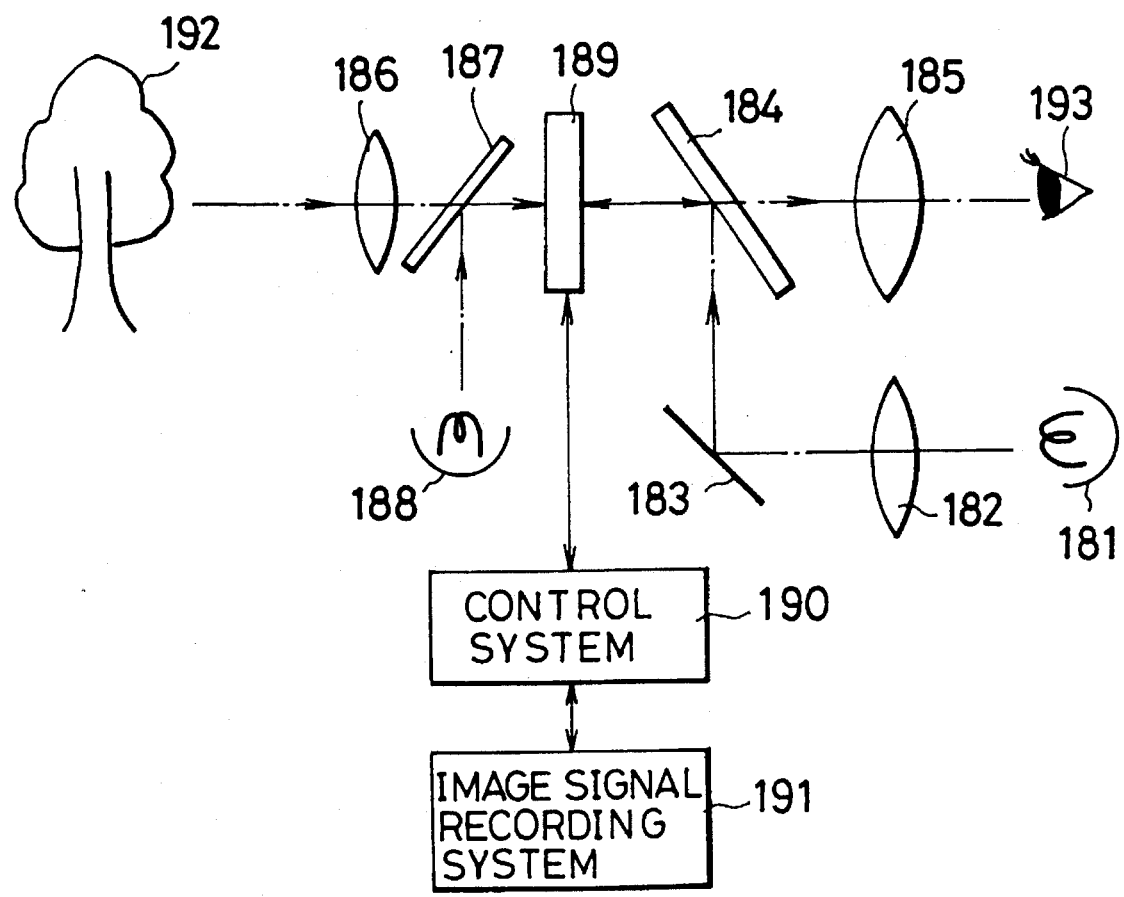
FIG. 17 is a view showing the systematic construction of an image photographing device using the liquid crystal light valve shown in FIG. 15 as an image pickup element and a view finder.

FIG. 17 is a view showing the systematic construction of an image photographing device using the liquid crystal light valve 140 shown in FIG. 15 as an image pickup element and a view finder.

As shown in FIG. 17, the image photographing device in this embodiment has lamps 181, 188, lenses 182, 185, 186, a mirror 183, a polarizing beam splitter 184, a half mirror 187, a liquid crystal light valve 189, a control system 190 and an image signal recording system 191.

The liquid crystal light valve 189 corresponds to the liquid crystal light valve 140 shown in FIG. 15 and is connected to the control system 190.

The control system 190 and the image signal recording system 191 are one embodiment of a mechanism for converting light including information to an electric signal in the information processor having the liquid crystal light valve in the present invention.

When the liquid crystal light valve is used as a view finder, a voltage is applied between scanning and opposite electrodes of the liquid crystal light valve 189. The scanning and opposite electrodes respectively correspond to the scanning electrode 144 and the opposite electrode 145 shown in FIG. 15. When the image of an object 192 is formed as an image on the liquid crystal light valve 189 through the lens 186, the impedance of a photoconductive layer of the liquid crystal light valve 189 (corresponding to the photoconductive layer 147 shown in FIG. 15) is changed in accordance with a light or dark state of the image. Accordingly, the orientational state of a liquid crystal is changed so that the image is formed on a liquid crystal layer.

When light from the lamp 181 is incident to this liquid crystal light valve 189 through the lens 182, the mirror 183 and the polarizing beam splitter 184, this incident light is reflected on a dielectric mirror of the liquid crystal light valve 189 (corresponding to the dielectric mirror 153 shown in FIG. 15).

The reflected light is partially transmitted through a portion of the liquid crystal layer in which the orientational state of the liquid crystal layer is changed. A polarizing direction of this partial reflected light is changed by electrooptic effects of the liquid crystal so that this light can be transmitted through the polarizing beam splitter 184. This transmitted light is focused and formed by the lens 185 as an image in the position of an eye 193, thereby seeing a photographed image.

When the liquid crystal light valve is used as an image pickup element, an image of the object 192 is formed as an image on the liquid crystal light valve 189 through the lens 186. At this time, an electric signal corresponding to the image can be obtained when a scanning electrode of the liquid crystal light valve 189 (corresponding to the scanning electrode 144 shown in FIG. 15) is sequentially operated by the control system 190. This electric signal is recorded by the image signal recording system 191.

Light in a near infrared region may be used as light from an unillustrated light source arranged in the optical waveguide to obtain the electric signal. This unillustrated light source corresponds to the light source 30 shown in FIG. 1. Thus, this light source cannot be seen when the liquid crystal light valve 189 is seen by the eye 193 from a reading side thereof.

When the image pickup element and the view finder are apparently operated simultaneously, it is sufficient to sequentially fulfill both functions of the image pickup element and the view finder within a time equal to or greater than that set from a frequency such as about 30 Hz at which no flicker is caused. When a ferroelectric liquid crystal is used, a response speed of the liquid crystal is high so that such an operation can be sufficiently performed.

When an image signal recorded to the image signal recording system 191 is reproduced, the lamp 188 is turned on and light from this lamp 188 is irradiated to the liquid crystal light valve 189 through the half mirror 187.

When an entire surface of the liquid crystal light valve 189 on a side of writing light is irradiated by the above light, the same operation as a liquid crystal panel of an XY matrix type can be normally performed. Accordingly, an image can be reproduced when the scanning electrode and the opposite electrode (as a data electrode in this case) are sequentially operated in accordance with the image signal.

It is possible to construct an image projecting apparatus of a wavelength converting type if the material of a photoconductive layer in the liquid crystal light valve 189 is changed and constructed by using a photosensitive material sensitive to an ultraviolet or infrared ray.

As mentioned above, in the liquid crystal light valve in this embodiment, the functions of conventional individual elements can be fulfilled by a single element. Accordingly, it is possible to realize a compact apparatus with high function in which an image reading function and an image display function are combined with each other.

The photoconductive layer of the liquid crystal light valve in each of the first, second and third embodiments shown in FIGS. 2, 12 and 15 is constructed by a-Si:H, but can be also constructed by amorphous silicon carbide hydride (a-Si$_{1-x}$C$_x$:H), amorphous silicon nitride hydride (a-Si$_{1-x}$N$_x$:H), amorphous silicon oxide hydride (a-Si$_{1-x}$O$_x$:H), amorphous silicon germanium hydride (a-Si$_{1-x}$Ge$_x$:H), cadmium sulfide (CdS), Bi$_{12}$SiO$_{20}$, etc. Further, the photoconductive layer may have a Schottky structure, a diode structure, a back-to-back diode structure, etc.

The light interrupting layer is constructed by acrylic resin of a carbon dispersion type, but can be also constructed by a thin organic film of a pigment dispersion type, a thin film formed by electroless plating of aluminum oxide (Al$_2$O$_3$) with a metal such as Ag, a thin cermet film, CdTe, etc.

The optical waveguide is constructed by an optical waveguide using an organic material, but can be also constructed by an optical waveguide using an inorganic material formed by mixing a-SiO$_x$N$_y$:H, (SiO$_2$)$_x$—(Ta$_2$O$_5$)$_y$, etc.

When a nematic liquid crystal is used, a liquid crystal operating mode can be constructed by a guest host mode, etc. instead of the hybrid electric field effect mode shown in the above embodiments. When a smectic liquid crystal is used, the guest host mode, etc. can be used. FIG. 19 is a cross-sectional view showing the construction of a liquid crystal light valve constituting an image reading section in an image copying machine in accordance with a first embodiment of the present invention.

As shown in FIG. 19, a liquid crystal light valve 10 in this embodiment has glass substrates 11, 12, an antireflection film 13, a transparent electrode 14, an opposite electrode 15, an optical waveguide 16, a photoconductive layer 17, a light interrupting layer 18, orientational films 19, 20, a spacer 21, a liquid crystal layer 22 and a dielectric mirror 24.

This liquid crystal light valve 10 is manufactured as follows.

First, a transparent conductive film of silicon dioxide (SnO$_2$) is evaporated on the glass substrate 11 as a light transmitting substrate by using a sputtering method. This transparent conductive film is patterned in the shape of a stripe through a photolitho process so that a transparent electrode 14 for scanning is formed.

An amorphous silicon hydride (a-Si:H) film is next formed as a photoconductive layer 17 on the transparent electrode 14. Raw materials of the amorphous silicon hydride (a-Si:H) film constituting the photoconductive layer 17 are constructed by silane (SiH$_4$) and hydrogen (H$_2$) gases. This a-Si:H film is formed by using a plasma CVD (chemical gaseous phase growing) method. This amorphous silicon hydride (a-Si:H) film has a thickness about 6 μm.

Acrylic resin of a carbon dispersion type is next formed on the photoconductive layer 17 by spin coating as a light interrupting layer 18 for interrupting light incident to the photoconductive layer 17 from the side of a liquid crystal layer described later. Thereafter, a multiple layer film composed of titanium oxide (TiO$_2$) and silicon oxide (SiO$_2$) is formed by an electronic beam (EB) evaporation method on the light interrupting layer 18 as a dielectric mirror 24 for reflecting light incident to the photoconductive layer 17 from the liquid crystal layer side.

An antireflection film 13 is formed on an incident side of writing light 23 with respect to the glass substrate 11 and prevents this light from being reflected on a surface of this glass substrate 11.

A fiber plate can be used as the above light transmitting substrate instead of the glass substrate.

A transparent conductive film composed of indium oxide (ITO) having doped tin is evaporated on the glass substrate 12 opposed to the glass substrate 11 by using a sputtering method, thereby forming an opposite electrode 15.

An optical waveguide 16 is next formed in the shape of a stripe on the opposite electrode 15 by selective photo polymerization using a thin high polymer film.

Next, a polyimide film is formed by spin coating as each of orientational films 19 and 20 on the light interrupting layer 18 and the optical waveguide 16, respectively. Thereafter, molecular orientational processing is performed by rubbing surfaces of the orientational films 19 and 20.

The glass substrates 11 and 12 having the above layers and films thereon are stuck to each other through a spacer 21 which also functions as a sealant. A nematic liquid crystal having a positive dielectric constant is injected and sealed in vacuum as a liquid crystal layer 22 between the glass substrates 11 and 12, thereby constructing a liquid crystal light valve 10.

The orientational direction of a liquid crystal molecule is set such that the refractive index of a liquid crystal is larger than that of the optical waveguide seen from a polarizing direction of light transmitted through the optical waveguide 16 when a voltage is applied to the liquid crystal. This orientations direction is also set such that the refractive index of the liquid crystal is smaller than that of the optical waveguide seen from the polarizing direction of the light transmitted through the optical waveguide 16 when no voltage is applied to the liquid crystal.

An angle of torsion of the liquid crystal is set to 0° to 60° and is preferably set to 45°. A tilting angle of the liquid crystal is preferably set to 0.05° to 30°.

For example, a material of the liquid crystal included in the liquid crystal layer 22 is constructed by using ZLI-4389 manufactured by MERK CORP. and having refractive index $n_e$=1.66 in an axial direction of the liquid crystal molecule and refractive index $n_o$=1.50 in a direction perpendicular to an axis of the liquid crystal molecule. The liquid crystal layer 22 has a thickness about 4 μm. A cholesteric liquid crystal is slightly added to this liquid crystal in accordance with necessity.

No orientational film 20 may be disposed in accordance with necessity since liquid crystal molecules are also oriented on the optical waveguide 16 by the rubbing processing.

For brevity, a photodetector and a light source described later are omitted in FIG. 19.

The construction of an opposite substrate 25 composed of the glass substrate 12, the opposite electrode 15, the optical waveguide 16 and the orientational film 20 shown in FIG. 19 will next be explained.

An embodiment of an image copying machine using the liquid crystal light valve 10 shown in FIG. 19 as an image reading section will next be explained.

Figure 18:
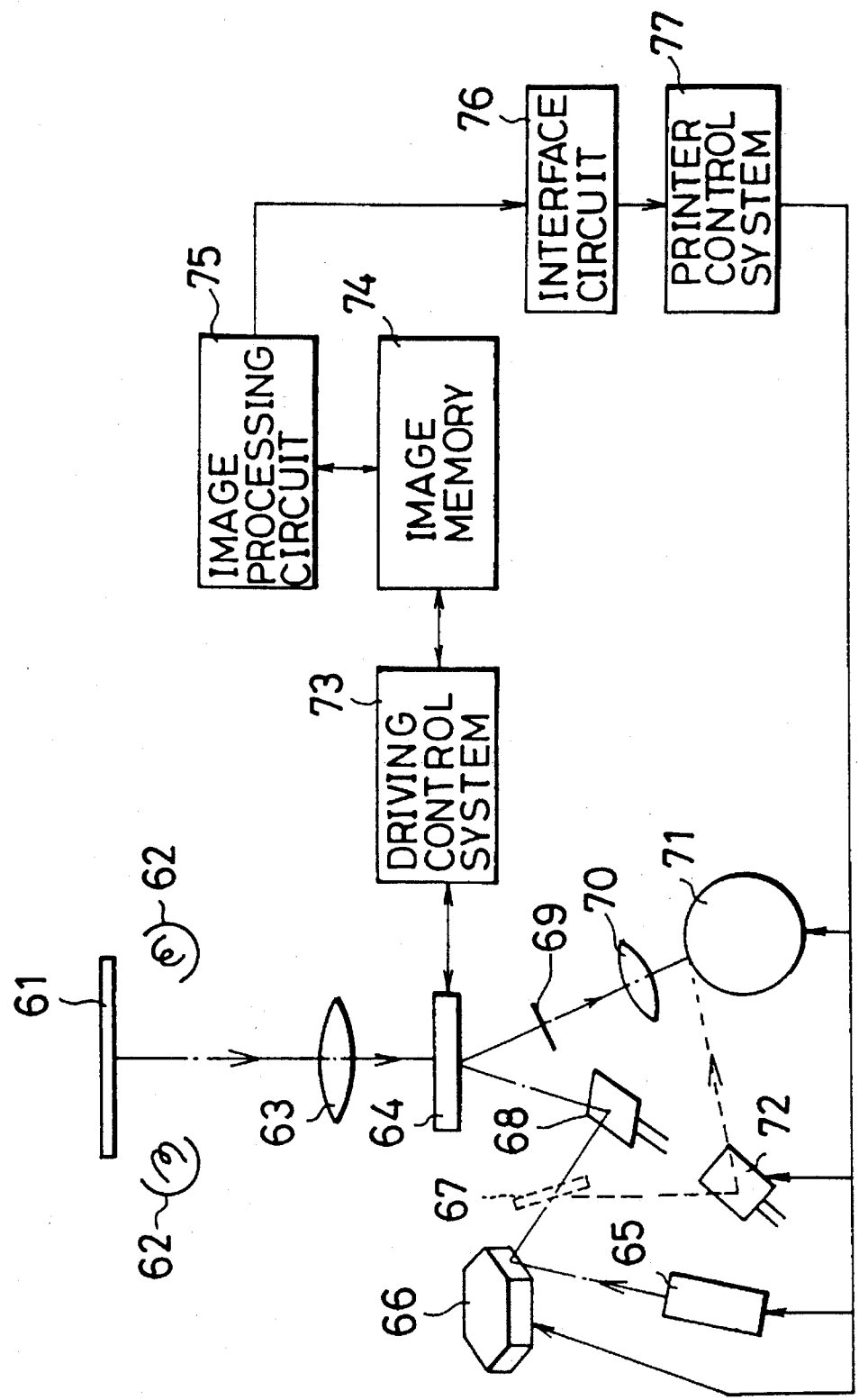
FIG. 18 is a view showing the systematic construction of a projecting type display device using the liquid crystal light valve shown in FIG. 12 as an optical modulating element.

FIG. 18 is a view showing the systematic construction of an image copying machine in accordance with one embodiment of the present invention.

As shown in FIG. 18, the image copying machine in this embodiment has a light source 62, a lens 63, a liquid crystal light valve 64, a laser light emitting device 65, a polygon mirror 66, a mirror 67, galvanomirrors 68, 72, a polarizing plate 69, an image forming lens 70, a photosensitive drum 71, a driving control system 78, an image memory 74, an image processing circuit 75, an interface circuit 76 and a printer control system 77.

The liquid crystal light valve 64 corresponds to the liquid crystal light valve 10 shown in FIG. 19 and the liquid crystal light valve 40 shown in FIG. 10 and is connected to the driving control system 73.

The driving control system 78 corresponds to a circuit composed of the reading circuit 46, the signal processing circuit 47, the driving circuit 48 and the control circuit 49 included in the converting mechanism for converting optical information to an electric signal and shown in FIG. 10.

The laser light emitting device 65, the polygon mirror 66, the galvanomirror 72 and the photosensitive drum 71 are connected to the printer control system 77.

The light source 62, the lens 68 and the liquid crystal light valve 64 are one embodiment of an image reading section in the present invention. The laser light emitting device 65, the polygon mirror 66, the mirror 67, the galvanomirror 72, the driving control system 73, the image memory 74, the image processing circuit 75, the interface circuit 78 and the printer control system 77 are one embodiment of an image forming section in the present invention.

In this image copying machine, an image is read as follows.

Light is irradiated from the light source 62 to an original 61. Light reflected on the original 61 is focused and formed as an image on the liquid crystal light valve 64 through the lens 63.

At this time, an electric signal corresponding to the image is obtained when a scanning electrode of the liquid crystal light valve 64 (as an electrode corresponding to the transparent electrode 14 in FIG. 19 and the scanning electrode 41 in FIG. 10) is sequentially operated by the driving control system 73. Image information data corresponding to this electric signal are stored to the image memory 74 and can be treated as a digital signal.

The original 61 is copied by using a laser scanning system. Namely, a voltage is applied between an opposite electrode and the scanning electrode of the liquid crystal light valve 64. This opposite electrode corresponds to the opposite electrode 15 in FIG. 19 and the opposite electrode 42 in FIG. 10. The scanning electrode corresponds to the transparent electrode 14 in FIG. 19 and the scanning electrode 41 in FIG. 10. Thus, the liquid crystal light valve 64 is operated to write the image. At this time, the orientational state of a liquid crystal in the liquid crystal light valve 64 is changed in accordance with the image.

An entire surface of the liquid crystal light valve 64 is scanned through the galvanomirror 68 and the polygon mirror 66 controlled by an operation of the printer control system 77 by using a polarized laser beam from the laser light emitting device 65.

The laser beam incident to the liquid crystal light valve 64 is reflected on a dielectric mirror (corresponding to the dielectric mirror 24 shown in FIG. 19). The reflected light is partially transmitted through a portion of a liquid crystal layer in which an orientational state of the liquid crystal layer is changed. A polarizing direction of this partial reflected light is modulated by electrooptic effects of the liquid crystal so that this light can be transmitted through the polarizing plate The reflected light transmitted through the polarizing plate 69 is written to the photosensitive drum 71 through the image forming lens 70. An image is copied by transmitting image data recorded onto the photosensitive drum 71 through a printing process.

The image of the original 61 is digitally processed and printed by the image processing circuit 75 and the laser scanning system composed of the laser light emitting device 65, the polygon mirror 66, the mirror 67 and the galvanomirror 72. Namely, the above image data stored to the image memory 74 are read therefrom and are processed by the image processing circuit 75 and are transferred to the printer control system 77 through the interface circuit 76.

The printer control system 77 operates the laser scanning system in accordance with the transferred image data. Namely, the laser light emitting device 65 scans the polygon mirror 66, the mirror 67 and the galvanomirror 72 while the laser light emitting device 65 emits the laser beam or stops the emission of the laser beam in accordance with the image data. Thus, the image data are written onto the photosensitive drum 71. The image data written to the photosensitive drum 71 are printed through a printing process.

The mirror 67 of the laser scanning system is inserted onto an optical path when the image data are printed. The mirror 67 of the laser scanning system is moved outside this optical path when a copy is made. Thus, the laser scanning system is constructed such that the optical path is switched in accordance with purposes.

In the image copying machine in this embodiment, the liquid crystal light valve 10 shown in FIG. 19 is used as the image reading section so that it is not necessary to dispose a scanning optical system for reading an original image. Accordingly, it is possible to realize a compact image copying machine having a high function in which an image reading function and an image display function are combined with each other in the image reading section.

In this liquid crystal light valve, information formed in the liquid crystal layer and corresponding to address light can be read as an optical signal and can be directly read as an electric signal. Accordingly, the photosensitive drum is exposed by an optical image signal and the image signal can be simultaneously stored to the image memory so that image signal processing such as a continuous copying operation can be performed at a high speed.

A liquid crystal light valve constituting the image reading section of an image copying machine in accordance with a second embodiment of the present invention will next be explained.

Figure 20:
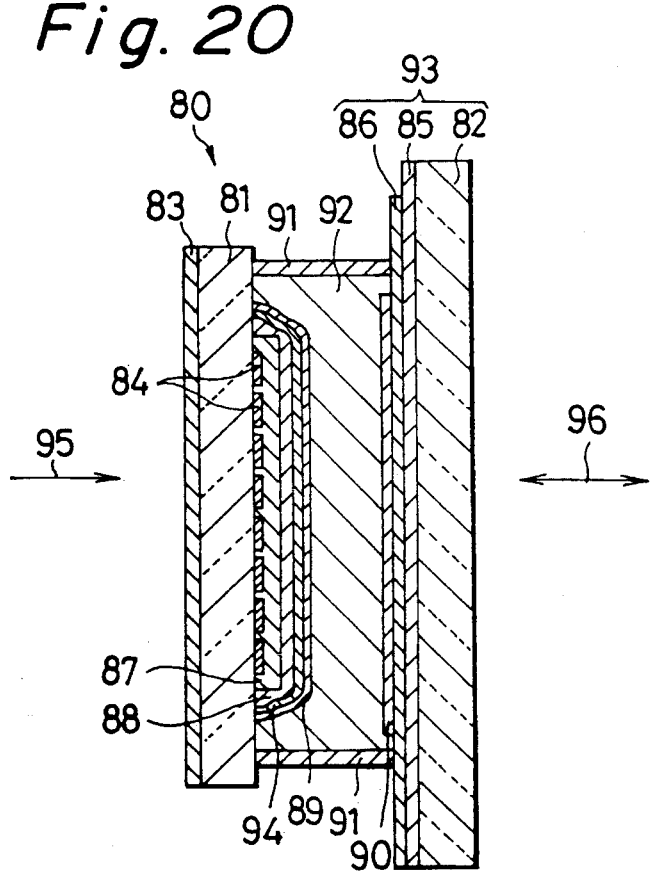
FIG. 20 is a cross-sectional view showing the construction of a liquid crystal light valve as a second embodiment constituting the image reading section of the image copying machine in the present invention.

FIG. 20 is a cross-sectional view showing the construction of a liquid crystal light valve constituting the image reading section of the image copying machine in the second embodiment of the present invention.

As shown in FIG. 20, the liquid crystal light valve 80 in this embodiment has a fiber plate 81, a glass substrate 82, an antireflection film 83, a transparent electrode 84, an opposite electrode 85, an optical waveguide 86, a photoconductive layer 87, a light interrupting layer 88, orientational films 89, 90, a spacer 91, a liquid crystal layer 92 and a dielectric mirror 94.

This liquid crystal light valve 80 is manufactured as follows.

First, a transparent conductive film composed of laminated layers of ITO and $SnO_2$ is evaporated on the fiber plate 81 as a light transmitting substrate by using a sputtering method. A transparent electrode 84 for scanning is formed by patterning the evaporated transparent conductive film in the shape of a stripe by reactive ion etching.

An amorphous silicon hydride (a-Si:H) film is next formed as a photoconductive layer 87 on the transparent electrode 84. The amorphous silicon hydride (a-Si:H) film constituting the photoconductive layer 87 is constructed by using silane ($SiH_4$) and argon (Ar) gases and is formed by using an ECR plasma CVD method. This amorphous silicon hydride (a-Si:H) film has a thickness about 7 μm.

Next, acrylic resin of a carbon dispersion type is formed on the photoconductive layer 87 by spin coating as a light interrupting layer 88 for interrupting light incident to the photoconductive layer 87 from the side of a liquid crystal layer described later. Thereafter, a multiple layer film composed of titanium and silicon oxides is formed on the light interrupting layer 88 by an electronic beam (EB) evaporation method as a dielectric mirror 94 for reflecting light incident to the photoconductive layer 87 from the liquid crystal layer side.

An antireflection film 83 is formed on an incident side of writing light 95 with respect to the fiber plate 81 and prevents this light from being reflected on a surface of this fiber plate.

A transparent conductive film composed of ITO is evaporated on a glass substrate 82 opposed to the fiber plate 81 by using a sputtering method, thereby forming an opposite electrode 85.

An optical waveguide 86 is next formed in the shape of a stripe on the opposite electrode 85 by selective photo polymerization using a thin high polymer film.

Next, a polyimide film is formed by spin coating as each of orientational films 89 and 90 on the dielectric mirror 93 and the optical waveguide 86, respectively. Thereafter, molecular orientational processing is performed by rubbing surfaces of the orientational films 89 and 90.

The fiber plate 81 and the glass substrate 82 having the above layers and films thereon are stuck to each other through a spacer 91. A nematic liquid crystal having a positive dielectric constant is injected and sealed in vacuum as a liquid crystal layer 92 between the fiber plate 81 and the glass substrate 82, thereby constructing a liquid crystal light valve 80.

The orientational direction of a liquid crystal molecule coming in contact with the optical waveguide 86 is set such that the refractive index of a liquid crystal is larger than that of the optical waveguide seen from a polarizing direction of light transmitted through the optical waveguide 86 when a voltage is applied to the liquid crystal. This orientational direction is also set such that the refractive index of the liquid crystal is smaller than that of the optical waveguide seen from the polarizing direction of the light transmitted through the optical waveguide 86 when no voltage is applied to the liquid crystal.

A hybrid electric field effect (HFE) mode is used as a liquid crystal display mode. An angle of torsion of the liquid crystal is set to 30° to 60°. A tilting angle of the liquid crystal is preferably set to 0.05° to 10°. The liquid crystal layer 92 preferably has a thickness about 5 μm.

No orientational film 90 may be disposed in accordance with necessity since liquid crystal molecules are also oriented on the optical waveguide 86 by the rubbing processing.

An opposite substrate 94 is composed of the glass substrate 82, the opposite electrode 85, the optical waveguide 86 and the orientational film 90 in the liquid crystal light valve 80 in this second embodiment. This opposite substrate 93 has unillustrated photodetector and light source respectively corresponding to the photodetector 29 and the light source 30 shown in FIGS. 1 and 3A. An operation of the liquid crystal light valve 80 is similar to the above-mentioned operation explained with reference to FIGS. 6A to 9B.

A SELFOC lens array may be used instead of the fiber plate 81.

The fiber plate 81 and the glass substrate 82 are one embodiment of two substrates in the present invention. The optical waveguide 86 is one embodiment of an optical waveguide in the present invention. The photoconductive layer 87 is one embodiment of a photoconductive layer in the present invention. The liquid crystal layer 92 is one embodiment of a liquid crystal layer in the present invention. The photodetector 29 shown in FIGS. 1 and 3A is one embodiment of a light receiving means in the present invention. The light source 30 shown in FIGS. 1 and 3A is one embodiment of a light source in the present invention.

Another embodiment of the image copying machine using the liquid crystal light valve 80 shown in FIG. 20 as an image reading section will next be explained.

Figure 21:
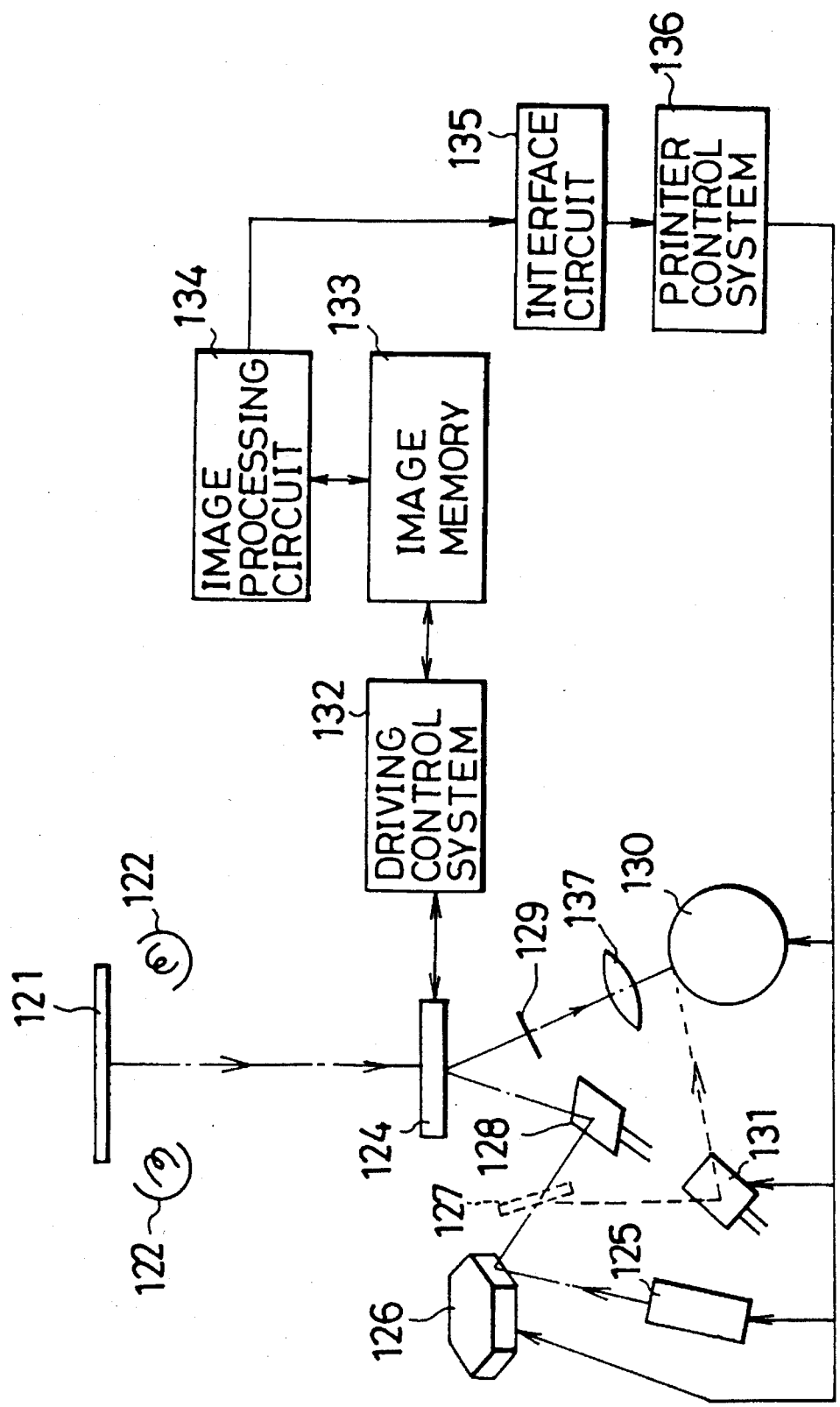
FIG. 21 is a view showing the systematic construction of an image copying machine in accordance with another embodiment of the present invention.

FIG. 21 is a view showing the systematic construction of an image copying machine in accordance with another embodiment of the present invention.

As shown in FIG. 21, the image copying machine in this embodiment has a light source 122, a liquid crystal light valve 124, a laser light emitting device 125, a polygon mirror 126, a mirror 127, galvanomirrors 128, 131, a polarizing plate 129, an image forming lens 137, a photosensitive drum 130, a driving control system 132, an image memory 133, an image processing circuit 134, an interface circuit 135 and a printer control system 136.

The liquid crystal light valve 124 corresponds to the liquid crystal light valve 40 shown in FIG. 10 and the liquid crystal light valve 80 shown in FIG. 20 and is connected to the driving control system 132.

The driving control system 132 corresponds to a circuit composed of the reading circuit 46, the signal processing circuit 47, the driving circuit 48 and the control circuit 49 included in the converting mechanism for converting optical information to an electric signal and shown in FIG. 10.

The laser light emitting device 125, the polygon mirror 126, the galvanomirror 131 and the photosensitive drum 130 are connected to the printer control system 136.

The light source 122 and the liquid crystal light valve 124 are one embodiment of an image reading section in the present invention. The laser light emitting device 125, the polygon mirror 126, the mirror 127, the galvanomirror 131, the driving control system 132, the image memory 133, the image processing circuit 134, the interface circuit 135 and the printer control system 136 are one embodiment of an image forming section in the present invention.

In this image copying machine, an image is read as follows.

Light is irradiated from the light source 122 to an original 121. Light reflected on the original 121 is formed as an image on the liquid crystal light valve 124.

At this time, an electric signal corresponding to the image is obtained when a scanning electrode of the liquid crystal light valve 124 (as an electrode corresponding to the scanning electrode 41 in FIG. 10 and the transparent electrode 84 in FIG. 20) is sequentially operated by the driving control system 132. Image information data corresponding to this electric signal are stored to the image memory 133 and can be treated as a digital signal.

The original 121 is copied by a laser scanning system. Namely, a voltage is applied between an opposite electrode and the scanning electrode of the liquid crystal light valve 124. This opposite electrode corresponds to the opposite electrode 42 in FIG. 10 and the opposite electrode 85 in FIG. 20. The scanning electrode corresponds to the scanning electrode 41 in FIG. 10 and the transparent electrode 84 in FIG. 20. Thus, the liquid crystal light valve 124 is operated to write the image. At this time, the orientational state of a liquid crystal in the liquid crystal light valve 124 is changed in accordance with the image.

An entire surface of the liquid crystal light valve 124 is scanned through the galvanomirror 128 and the polygon mirror 126 controlled by an operation of the printer control system 136 by using a polarized laser beam from the laser light emitting device 125.

The laser beam incident to the liquid crystal light valve 124 is reflected on a dielectric mirror (corresponding to the dielectric mirror 93 shown in FIG. 20). The reflected light is partially transmitted through a portion of a liquid crystal layer in which an orientational state of the liquid crystal layer is changed. A polarizing direction of this partial reflected light is modulated by electrooptic effects of the liquid crystal so that this light can be transmitted through the polarizing plate 129.

The reflected light transmitted through the polarizing plate 129 is written to the photosensitive drum 130 through the image forming lens 137. An image is copied by transmitting image data recorded onto the photosensitive drum 130 through a printing process.

The image of the original 121 is digitally processed and printed by the image processing circuit 134 and the laser scanning system composed of the laser light emitting device 125, the polygon mirror 126, the mirror 127 and the galvanomirror 131. Namely, the above image data stored to the image memory 133 are read therefrom and are processed by the image processing circuit 134 and are transferred to the printer control system 136 through the interface circuit 135.

The printer control system 136 operates the laser scanning system in accordance with the transferred image data. Namely, the laser light emitting device 125 scans the polygon mirror 126, the mirror 127 and the galvanomirror 131 while the laser light emitting device 125 emits the laser beam or stops the emission of the laser beam in accordance with the image data. Thus, the image data are written onto the photosensitive drum 130. The image data written to the photosensitive drum 130 are printed through a printing process.

The mirror 127 of the laser scanning system is inserted onto an optical path when the image data are printed. The mirror 127 of the laser scanning system is moved outside this optical path when a copy is made. Thus, the laser scanning system is constructed such that the optical path is switched in accordance with purposes.

In the image copying machine in the above embodiment, the liquid crystal light valve 80 shown in FIG. 20 is used as the image reading section so that it is not necessary to dispose a scanning optical system for reading an original image. Accordingly, it is possible to realize a compact image copying machine having a high function in which an image reading function and an image display function are combined with each other in the image reading section.

In this liquid crystal light valve, information formed in the liquid crystal layer and corresponding to address light can be read as an optical signal and can be directly read as an electric signal. Accordingly, the photosensitive drum is exposed by an optical image signal and the image signal can be simultaneously stored to the image memory so that image signal processing such as a continuous copying operation can be performed at a high speed.

The photoconductive layer of the liquid crystal light valve in each of the first and second embodiments shown in FIGS. 19 and 20 is constructed by a-Si:H, but can be also constructed by amorphous silicon carbide hydride (a-Si$_{1-x}$C$_x$:H), amorphous silicon nitride hydride (a-Si$_{1-x}$N$_x$:H), amorphous silicon oxide hydride (a-Si$_{1-x}$O$_x$:H), amorphous silicon germanium hydride (a-Si$_{1-x}$Ge$_x$:H), cadmium sulfide (CdS), Bi$_{12}$SiO$_{20}$, etc. Further, the photoconductive layer may have a Schottky structure, a diode structure, a back-to-back diode structure, etc.

The light interrupting layer of the liquid crystal light valve is constructed by acrylic resin of a carbon dispersion type, but can be also constructed by a thin organic film of a pigment dispersion type, a thin film formed by electroless plating of aluminum oxide (Al$_2$O$_3$) with a metal such as Ag, a thin cermet film, CdTe, etc.

The optical waveguide of the liquid crystal light valve is constructed by an optical waveguide using an organic material, but can be also constructed by an optical waveguide using an inorganic material formed by mixing a-SiO$_x$N$_y$:H, (SiO$_2$)$_x$—(Ta$_2$O$_5$)$_y$, etc.

When a nematic liquid crystal is used, a liquid crystal operating mode can be constructed by a guest host mode, etc. instead of the hybrid electric field effect mode shown in the above embodiments. When a smectic liquid crystal is used, the guest host mode, an electrochromic effect, etc. can be used.

FIG. 2 is a cross-sectional view showing the construction of a liquid crystal light valve disposed in a facsimile telegraph or an image scanner in accordance with a first embodiment of the present invention.

As shown in FIG. 2, a liquid crystal light valve 10 disposed in the facsimile telegraph in this embodiment has glass substrates 11, 12, an antireflection film 13, a transparent electrode 14, an opposite electrode 15, an optical waveguide 16, a photoconductive layer 17, a light interrupting layer 18, orientational films 19, 20, a spacer 21 and a liquid crystal layer 22.

Figure 23A:
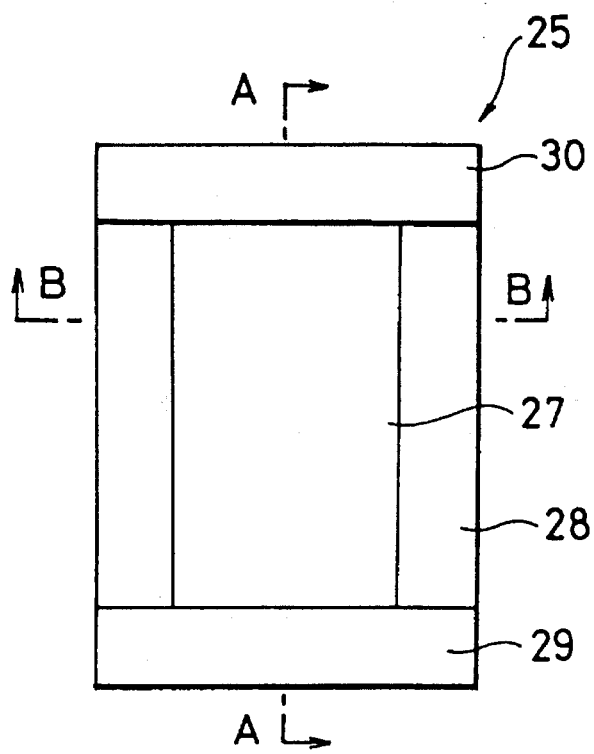
FIGS. 23A, 23B and 23C are respectively plan, cross-sectional and cross-sectional views showing the construction of an opposite substrate of the liquid crystal light valve shown in FIG. 2 and disposed in the facsimile telegraph in the present invention.
Figure 23B:
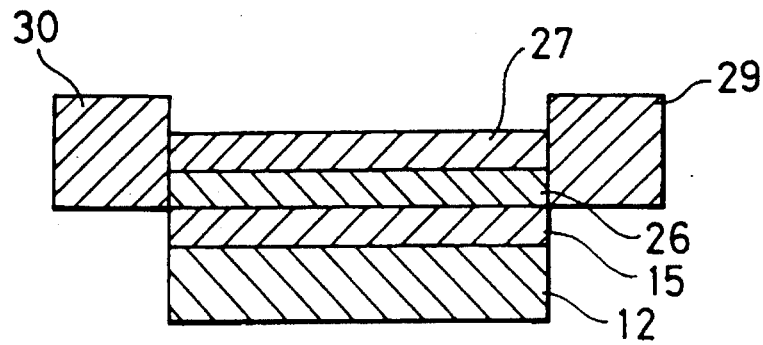
Figure 23C:
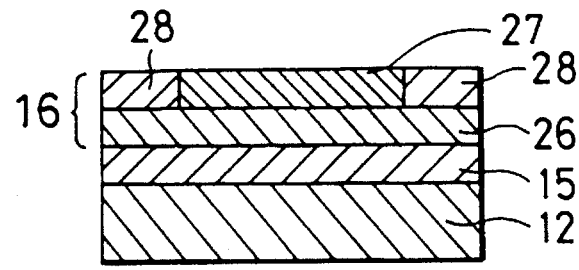

FIGS. 23A, 23B and 23C are respectively plan, cross-sectional and cross-section views showing the construction of the opposite substrate 25 of the liquid crystal light valve 10 shown in FIG. 2 and disposed in the facsimile telegraph in the present invention. Namely, FIG. 23A is a plan view of the opposite substrate 25. FIG. 23B is a cross-sectional view taken along line A—A of FIG. 23A. FIG. 23C is a cross-sectional view taken along line B—B of FIG. 3A. In these figures, the orientational film 20 shown in FIG. 2 is omitted.

As shown in these figures, the opposite substrate 25 has the glass substrate 12, the opposite electrode 15, the optical waveguide 16, a photodetector 29 and a light source 30. The optical waveguide 16 is composed of a lower clad layer 26, a core layer 27 and a clad layer 28.

The opposite substrate 25 is manufactured as follows.

First, a transparent conductive film composed of ITO is formed on an entire surface of the glass substrate 12, thereby constructing an opposite electrode 15.

Next, epoxy resin is formed as a lower clad layer 26 of the optical waveguide 16 by spin coating. A bisphenol-Z-polycarbonate (PCZ) film including photo polymerized monomer (acrylate such as methyl acrylate) is formed on the lower clad layer 26 by spin coating. An ultraviolet ray is irradiated onto this PCZ film through a photo mask, thereby selectively polymerizing this PCZ film. Thus, a PCZ layer is formed as a core layer 27. Further, a mixing material of PCZ and polyacrylate having a refractive index smaller than that of PCZ is formed as a clad layer 28. In this embodiment, refractive index n of the core layer 27 is set to 1.59 and refractive index n of the clad layer 28 is set to 1.56.

The optical waveguide 16 is composed of the lower clad layer 26, the core layer 27 and the clad layer 28 as mentioned above. The light source 30 and the photodetector 29 are respectively connected to both ends of this optical waveguide 16.

For example, the light source 30 is constructed by a laser, a light emitting diode (LED), etc. The light source 30 is connected to the optical waveguide 16 such that a polarized wave can be guided to the optical waveguide 16 (in TE or TM mode).

For example, the photodetector 29 is constructed by an a-Si:H diode and an amorphous silicon germanium hydride (a-SiGe:H) diode, etc. in accordance with a wavelength of the light source 30. The photodetector 29 is connected to the optical waveguide 16 so as to receive light from the optical waveguide 16.

The opposite substrate is constructed by a transparent substrate, but can be also constructed by a monocrystal silicon or a monocrystal gallium arsenide (GaAs) substrate. When each of these monocrystal substrates is used, the light source and the photodetector can be disposed on each of these monocrystal substrates.

The glass substrates 11 and 12 are one embodiment of two substrates in the present invention. The optical waveguide 16 is one embodiment of an optical waveguide in the present invention. The photoconductive layer 17 is one embodiment of a photoconductive layer in the present invention. The photodetector 29 is one embodiment of a light receiving means in the present invention. The light source 30 is one embodiment of a light source in the present invention.

As shown in these figures, the refractive index of a liquid crystal molecule 31$a$ is approximately equal to n$_o$ when no voltage is applied to the liquid crystal molecule with respect to light 36 in TM mode from the light source 30 shown in FIG. 23A to 23C. In contrast to this, when the voltage is applied to the liquid crystal molecule, the refractive index of a liquid crystal molecule 31$b$ can be considered to be approximately equal to n$_e$.

In FIGS. 7A and 7B, the same constructional elements as the liquid crystal light valve 10 shown in FIG. 2 are designated by the same reference numerals as FIG. 2. For example, the antireflection film 13, etc. shown in FIG. 2 are omitted and a shape of the transparent electrode 14 is simplified since no explanation of the liquid crystal light valve is influenced by these members.

As shown in FIGS. 7A and 7B, when no driving voltage is applied by an alternating current power source 35 between an opposite electrode 15 and the transparent electrode 14 of the liquid crystal light valve 10, the refractive index of a liquid crystal layer 22 is approximately equal to n$_o$ with respect to light 36 in TM mode irrespective of the incidence or non-incidence of address light 37, i.e., the light and dark states when the light 36 in TM mode is transmitted to an optical waveguide 16 from the light source 30 shown in FIG. 23. Accordingly, the transmitted light is transmitted through the optical waveguide 16 without attenuation.

The next explanation relates to a facsimile telegraph including a mechanism for applying a voltage to an electrode of the liquid crystal light valve to convert optical information to an electric signal.

Figure 22:
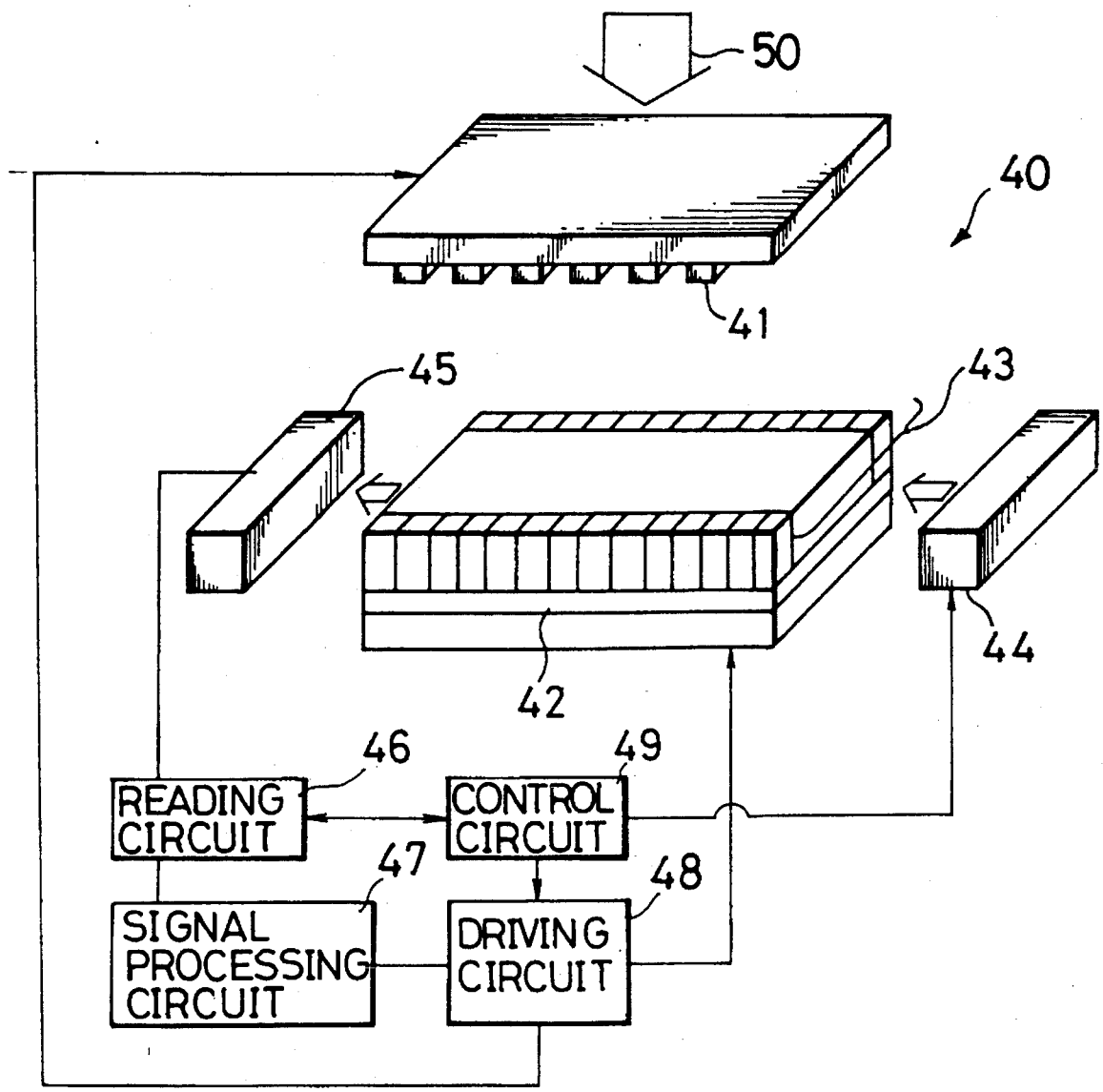
FIG. 22 is a view showing the construction of a facmile telegraph in accordance with one embodiment of the present invention.

FIG. 22 is a view showing the construction of a facsimile telegraph in accordance with one embodiment of the present invention.

As shown in FIG. 22, the facsimile telegraph in this embodiment has a liquid crystal light valve 40 and a mechanism for applying a voltage to electrodes of the liquid crystal light valve 40. The liquid crystal light valve 40 includes a scanning electrode 41, an opposite electrode 42, an optical waveguide 43, a light source 44 and a photodetector 45. The applying mechanism includes a reading circuit 46, a signal processing circuit 47, a driving circuit 48 and a control circuit 49.

The liquid crystal light valve 40 corresponds to the liquid crystal light valve 10 shown in FIG. 2. The scanning electrode 41, the opposite electrode 42 and the optical waveguide 43 respectively correspond to the transparent electrode 14, the opposite electrode 15 and the optical waveguide 16 shown in FIG. 2. Further, the light source 44 and the photodetector 45 respectively correspond to the light source 30 and the photodetector 29 shown in FIG. 23.

The control circuit 49 is connected to the light source 44, the reading circuit 46 and the driving circuit 48. The driving circuit 48 is connected to the scanning electrode 41 and the opposite electrode 42. The reading circuit 46 is connected to the photodetector 45 and the signal processing circuit 47.

The mechanism for applying a voltage to electrodes of the liquid crystal light valve 40 and including the reading circuit 46, the signal processing circuit 47, the driving circuit 48 and the control circuit 49 is one embodiment of a mechanism for applying a voltage to electrodes of the liquid crystal light valve in the present invention.

An operation of this facsimile telegraph will next be explained.

Polarized light is guided to the optical waveguide 43 from the light source 44 at any time. The facsimile telegraph is set in a state in which light transmitted through the optical waveguide 43 can be converted to an electric signal by using the photodetector 45. When light 50 including image information is incident to the liquid crystal light valve 40, a voltage is applied between the opposite electrode 42 and the scanning electrode 41 through the driving circuit 48.

The facsimile telegraph is operated as follows by the application of this voltage.

When the voltage is applied to the scanning electrode 41 on only one line, the orientational state of a liquid crystal molecule corresponding to a position of the scanning electrode 41 is changed in accordance with a light or dark state of light. Thus, the intensity of light transmitted through each of optical waveguides 43 is modulated. When an output of the photodetector 45 is read by the reading circuit 46 in synchronization with this modulation, an electric signal of optical image information corresponding to the scanning electrode 41 is obtained. When such an operation of the scanning electrode 41 is sequentially performed with respect to an entire picture, an electric signal corresponding to two-dimensional optical image information is obtained.

Figure 24:
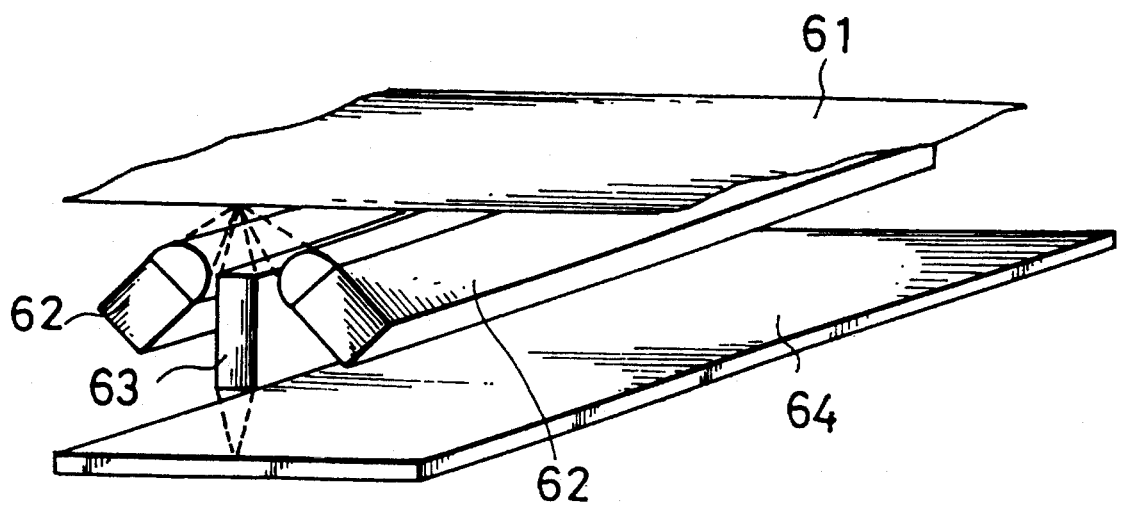
FIG. 24 is a constructional view showing one embodiment of an image reading section of the facsimile telegraph or the image scanner having the liquid crystal light valve.

FIG. 24 is a constructional view showing one embodiment of an image reading section of the facsimile telegraph or the image scanner having a liquid crystal light valve.

As shown in FIG. 24, the image reading section of the facsimile telegraph in this embodiment has a light source 62, a lens 63 and a liquid crystal light valve 64.

The liquid crystal light valve 64 corresponds to the liquid crystal light valve 10 shown in FIG. 2.

In such a construction, when light from the light source 62 is irradiated to an original 61 having image information to be read, light reflected on the original 61 is focused and formed as an image on the liquid crystal light valve 64 through the lens 63.

A scanning electrode of the liquid crystal light valve 64 is sequentially operated by an unillustrated control system (corresponding to the above mechanism for applying a voltage to the liquid crystal light valve and shown in FIG. 22). Thus, an electric signal corresponding to light of inputted image information is obtained. Such an obtained electric signal is stored to an unillustrated image memory and is read by an unillustrated central processing unit (CPU) through an unillustrated interface circuit in accordance with necessity.

Thus, it is possible to read the electric signal corresponding to the light of image information by the liquid crystal light valve. Accordingly, resolution is increased as the optical waveguide is finely divided so that resolution of the image reading section can be increased.

A liquid crystal light valve disposed in the facsimile telegraph or the image scanner in accordance with a second embodiment of the present invention will next be explained.

Figure 25:
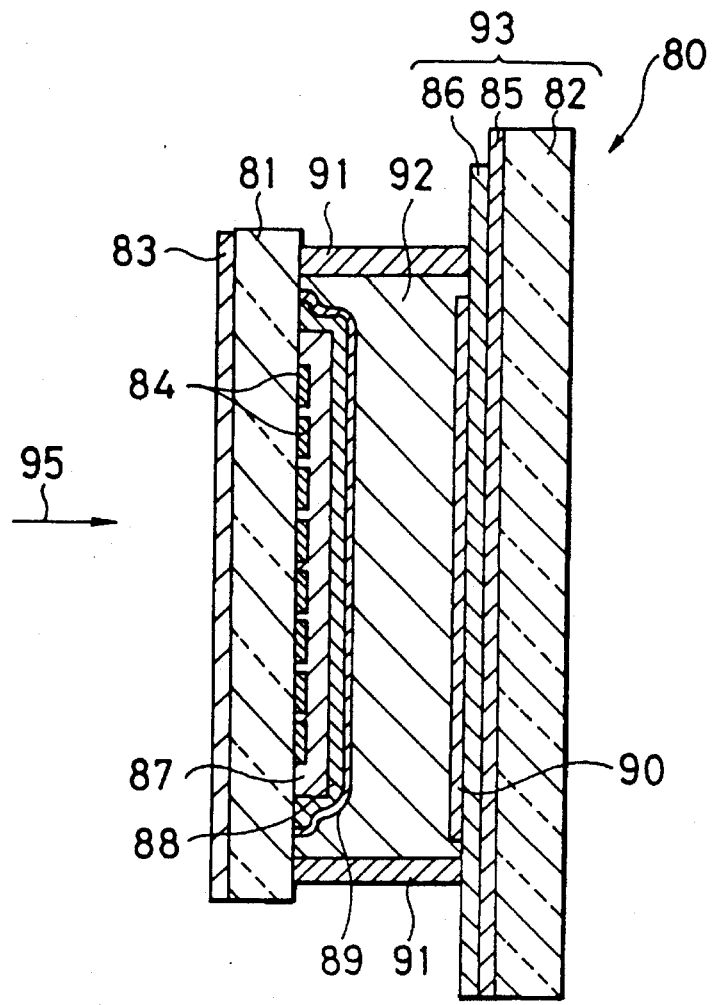
FIG. 25 is a cross-sectional view showing the construction of a liquid crystal light valve as a second embodiment disposed in the facsimile telegraph or the image scanner in the present invention.

FIG. 25 is a cross-sectional view showing the construction of a liquid crystal light valve disposed in the facsimile telegraph or the image scanner in the second embodiment of the present invention.

As shown in FIG. 10, the liquid crystal light valve 80 in this embodiment has a fiber plate 81, a glass substrate 82, an antireflection film 88, a transparent electrode 84, an opposite electrode 83, an optical waveguide 86, a photoconductive layer 87, a light interrupting layer 88, orientational films 89, 90, a spacer 91 and a liquid crystal layer 92.

This liquid crystal light valve 80 is manufactured as follows.

First, a transparent conductive film composed of $SnO_2$ is evaporated on the fiber plate 81 by using a sputtering method. A transparent electrode 84 for scanning is formed by patterning the evaporated transparent conductive film in the shape of a stripe though a photolitho process.

An amorphous silicon hydride (a-Si:H) film is next formed as a photoconductive layer 87 on the transparent electrode 84. The amorphous silicon hydride (a-Si:H) film constituting the photoconductive layer 87 is formed by using a plasma CVD method such that this amorphous silicon hydride (a-Si :H) film has a thickness about 7 m.

Next, acrylic resin of a carbon dispersion type is formed on the photoconductive layer 87 by spin coating as a light interrupting layer 88 for interrupting light incident to the photoconductive layer 87 from a side of the liquid crystal layer 92.

Next, a polyimide film is formed by spin coating as an orientational film 89 on the light interrupting layer 88. Thereafter, molecular orientational processing is performed by rubbing a surface of the orientational film 89.

An antireflection film 83 is formed on an incident side of writing light 95 with respect to the fiber plate 81 and prevents this light from being reflected on a surface of this fiber plate.

A transparent conductive film composed of ITO is evaporated on a glass substrate 82 opposed to the fiber plate 81 by using a sputtering method, thereby forming an opposite electrode 85.

An optical waveguide 86 is next formed in the shape of a stripe on the opposite electrode 85 by selective photo polymerization using a thin high polymer film.

Next, a polyimide film is formed by spin coating as an orientational film 90 on the optical waveguide 86. Thereafter, molecular orientational processing is performed by rubbing a surface of the orientational film 90.

The fiber plate 81 and the glass substrate 82 having the above layers and films thereon are stuck to each other through a spacer 91. A nematic liquid crystal having a positive dielectric constant is injected and sealed in vacuum as a liquid crystal layer 92 between the fiber plate 81 and the glass substrate 82, thereby constructing a liquid crystal light valve 80.

The orientational direction of a liquid crystal molecule coming in contact with the optical waveguide 86 is set such that the refractive index of a liquid crystal is larger than that of the optical waveguide seen from a polarizing direction of light transmitted through the optical waveguide 86 when a voltage is applied to the liquid crystal. This orientational direction is also set such that the refractive index of the liquid crystal is smaller than that of the optical waveguide seen from the polarizing direction of the light transmitted through the optical waveguide 86 when no voltage is applied to the liquid crystal.

A hybrid electric field effect (HFE) mode is used as a liquid crystal display mode. An angle of torsion of the liquid crystal is set to 30° to 60°. A tilting angle of the liquid crystal is preferably set to 0.05° to 10°. The liquid crystal layer 92 preferably has a thickness about 3 µm.

An opposite substrate 93 is composed of the glass substrate 82, the opposite electrode 85, the optical waveguide 86 and the orientational film 90 in the liquid crystal light valve 80 in this second embodiment. This opposite substrate 93 has unillustrated photodetector and light source. An operation of the liquid crystal light valve 80 is similar to the above-mentioned operation explained with reference to FIGS. 6A to 9B.

The fiber plate 81 and the glass substrate 82 are one embodiment of two substrates in the present invention. The optical waveguide 86 is one embodiment of an optical waveguide in the present invention. The photoconductive layer 87 is one embodiment of a photoconductive layer in the present invention. The photodetector 29 shown in FIG. 23 is one embodiment of a light receiving means in the present invention. The light source 30 shown in FIG. 23 is one embodiment of a light source in the present invention.

Figure 26:
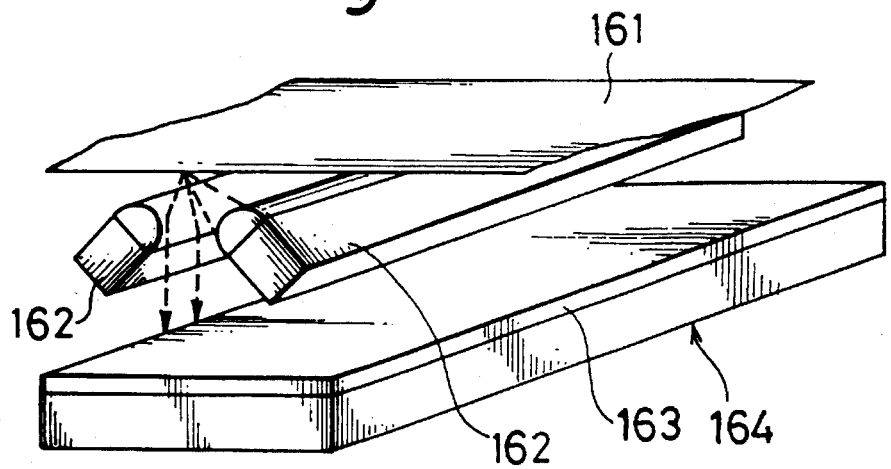
FIG. 26 is a constructional view showing another embodiment of the image reading section of the facsimile telegraph having the liquid crystal light valve.

FIG. 26 is a constructional view showing another embodiment of the image reading section of the facsimile telegraph having the liquid crystal light valve.

As shown in FIG. 26, the image reading section of the facsimile telegraph in this embodiment has a light source 162 and a liquid crystal light valve 163.

The liquid crystal light valve 103 corresponds to the liquid crystal light valve 80 shown in FIG. 25. A fiber plate 164 of the liquid crystal light valve 163 corresponds to the fiber plate 81 of the liquid crystal light valve 80 shown in FIG. 25. In FIG. 26, an antireflection film corresponding to the antireflection film 83 shown in FIG. 25 is omitted.

In such a construction, when light from the light source 162 is irradiated to an original 161 having image information to be read, light reflected on the original 161 is formed as an image on the liquid crystal light valve 163 through the fiber plate 164.

A scanning electrode of the liquid crystal light valve 163 is sequentially operated by an unillustrated control system (corresponding to the above mechanism for applying a voltage to the liquid crystal light valve and shown in FIG. 22). Thus, an electric signal corresponding to light of inputted image information is obtained. Such an obtained electric signal is stored to an unillustrated image memory and is read by an unillustrated central processing unit (CPU) through an unillustrated interface circuit in accordance with necessity.

Thus, it is not necessary to dispose a lens system in the facsimile telegraph having the liquid crystal light valve in this embodiment so that the facsimile telegraph can be made compact.

In this embodiment, the fiber plate is used, but a SELFOC lens array, etc. can be used instead of the fiber plate.

The photoconductive layer of the liquid crystal light valve in each of the first and second embodiments shown in FIGS. 2 and 25 is constructed by a-Si:H, but can be also constructed by amorphous silicon carbide hydride (a-Si$_{1-x}$C$_x$:H), amorphous silicon nitride hydride (a-Si$_{1-x}$N$_x$:H), amorphous silicon oxide hydride (a-Si$_{1-x}$O$_x$:H), amorphous silicon germanium hydride (a-Si$_{1-x}$Ge$_x$:H), cadmium sulfide (CdS), bismuth silicate (Bi$_{12}$SiO$_{20}$), etc. Further, the photoconductive layer may have a Schottky structure, a diode structure, a back-to-back diode structure, etc.

The light interrupting layer is constructed by acrylic resin of a carbon dispersion type, but can be also constructed by a thin organic film of a pigment dispersion type, a thin film formed by electroless plating of aluminum oxide (Al$_2$O$_3$) with a metal such as Ag, a thin cermet film, CdTe, etc.

The optical waveguide is constructed by an optical waveguide using an organic material, but can be also constructed by an optical waveguide using an inorganic material formed by mixing a-SiO$_x$N$_y$:H, (SiO$_2$)$_x$—(Ta$_2$O$_5$)$_y$, etc.

When a nematic liquid crystal is used, a liquid crystal operating mode can be constructed by a guest host mode, etc. instead of the hybrid electric field effect mode shown in the above embodiments. When a smectic liquid crystal is used, the guest host mode, an electroclinic effect, etc. can be used.

In the above embodiments, the optical waveguide is disposed on only one one. However, when optical waveguides are disposed on plural lines, image information on many lines can be simultaneously converted to electric signals at one time so that a reading speed can be increased. Accordingly, the facsimile telegraph in the present invention is effectively used even when the optical waveguides are disposed on plural lines.

In the above-mentioned embodiments, a liquid crystal light valve is used in the facsimile telegraph. A manufacturing process of this liquid crystal light valve is simple in comparison with a CCD array, etc. conventionally used and cost of the liquid crystal light valve is low so that the facsimile telegraph can be cheaply manufactured. Further, light reflected on an original can be directly detected by the liquid crystal light valve when a fiber plate is used as a substrate located on a side of the liquid crystal light valve on which a photoconductive layer is disposed. Accordingly, it is not necessary to dispose a lens system so that the facsimile telegraph can be cheaply manufactured and made compact.

FIG. 2 is a cross-sectional view showing the construction of a liquid crystal light valve disposed in an image scanner in accordance with a first embodiment of the present invention.

As shown in FIG. 2, a liquid crystal light valve 10 disposed in the image scanner in this embodiment has glass substrates 11, 12, an antireflection film 13, a transparent electrode 14, an opposite electrode 15, an optical waveguide 16, a photoconductive layer 17, a light interrupting layer 18, orientational films 9, 20, a spacer 21 and a liquid crystal layer 22.

FIG. 1 is a plan view showing the construction of the opposite substrate 25 of the liquid crystal light valve 10 shown in FIG. 2 and disposed in the image scanner in the present invention. FIGS. 3A and 3B are cross-sectional views showing the construction of the opposite substrate 25 of the liquid crystal light valve 10 shown in FIG. 2 and disposed in the image scanner in the present invention. FIGS. 3A and 3B are respectively taken along lines A—A and B—B of FIG. 1. In these FIGS. 3A and 3B, the orientational film 20 shown in FIG. 2 is omitted.

A mechanism for converting optical information to an electric signal will next be explained.

Figure 27:
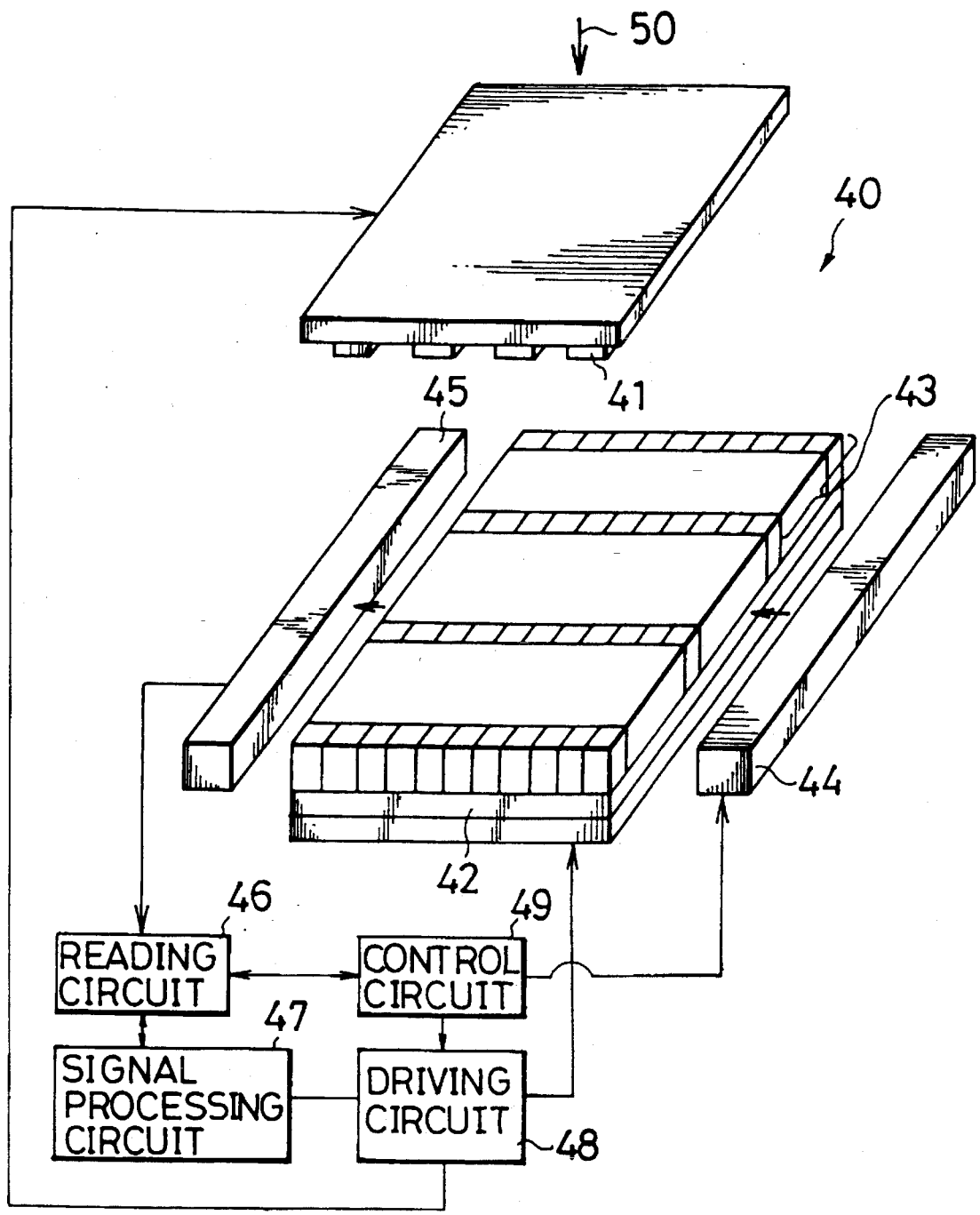
FIG. 27 is a constructional view showing one embodiment of a converting mechanism for converting light including information to an electric signal and included in the image scanner in the present invention.

FIG. 27 is a view showing the construction of a mechanism for converting light including information to an electric signal as one embodiment and included in the image scanner in the present invention, As shown in FIG. 27, the converting mechanism in this embodiment has a liquid crystal light valve 40 and a mechanism for applying a voltage to electrodes of the liquid crystal light valve 40. The liquid crystal light valve 40 includes a scanning electrode 41, an opposite electrode 42, an optical waveguide 43, a light source 44 and a photodetector 45. The applying mechanism includes a reading circuit 48, a signal processing circuit 47, a driving circuit 46 and a control circuit 49

The liquid crystal light valve 40 corresponds to the liquid crystal light valve 10 shown in FIG. 2. The scanning electrode 41, the opposite electrode 42 and the optical waveguide 43 respectively correspond to the transparent electrode 14, the opposite electrode 15 and the optical waveguide 16 shown in FIG. 2. Further, the light source 44 and the photodetector 45 respectively correspond to the light source 30 and the photodetector 29 shown in FIGS. 1 and 3A to 3B.

The control circuit 49 is connected to the light source 44, the reading circuit 48 and the driving circuit 48. The driving circuit 48 is connected to the scanning electrode 41 and the opposite electrode 42. The reading circuit 46 is connected to the photodetector 45 and the signal processing circuit 47.

An operation of this converting mechanism will next be explained.

Polarized light is guided to the optical waveguide 43 from the light source 44 at any time. The converting mechanism is set in a state in which light transmitted through the optical waveguide 43 can be converted to an electric signal by using the photodetector 45. When light 50 including image information is incident to the liquid crystal light valve 40, a voltage is applied between the opposite electrode 42 and the scanning electrode 41 through the driving circuit 48.

The converting mechanism is operated as follows by the application of this voltage.

When the voltage is applied to the scanning electrode 41 on only one line, the orientational state of a liquid crystal molecule corresponding to a position of the scanning electrode 41 is changed in accordance with a light or dark state of light. Thus, the intensity of light transmitted through each of optical waveguides 43 is modulated. When an output of the photodetector 45 is read by the reading circuit 46 in synchronization with this modulation, an electric signal of optical image information corresponding to the scanning electrode 41 is obtained. When such an operation of the scanning electrode 41 is sequentially performed with respect to an entire picture, an electric signal corresponding to two-dimensional optical image information is obtained.

One embodiment of an image scanner having the liquid crystal light valve shown in FIG. 2 will next be explained.

FIG. 24 is a perspective view showing the construction of an image reading section as one embodiment in the image scanner in the present invention.

The converting mechanism for converting optical information to an electric signal and shown in FIG. 27 is included in this image scanner, but is omitted in FIG. 24. This scanning electrode corresponds to the transparent electrode 14 shown in FIG. 2 and the scanning electrode 41 shown in FIG. 27. The control system corresponds to the driving circuit 48 and the control circuit 49 included in the converting mechanism shown in FIG. 27.

In the above embodiment, the liquid crystal light valve is used in the image reading section of the image scanner. Accordingly, information formed in the liquid crystal layer and corresponding to light including information can be read as an optical signal and directly read as an electric signal, thereby easily performing an information reading operation.

Thus, it is possible to read the electric signal corresponding to the light of image information by the liquid crystal light valve. Accordingly, resolution is increased as the optical waveguide is finely divided by increasing a panel side of the liquid crystal light valve so that resolution of the image reading section can be increased.

A liquid crystal light valve disposed in an image scanner in accordance with a second embodiment of the present invention will next be explained.

Figure 28:
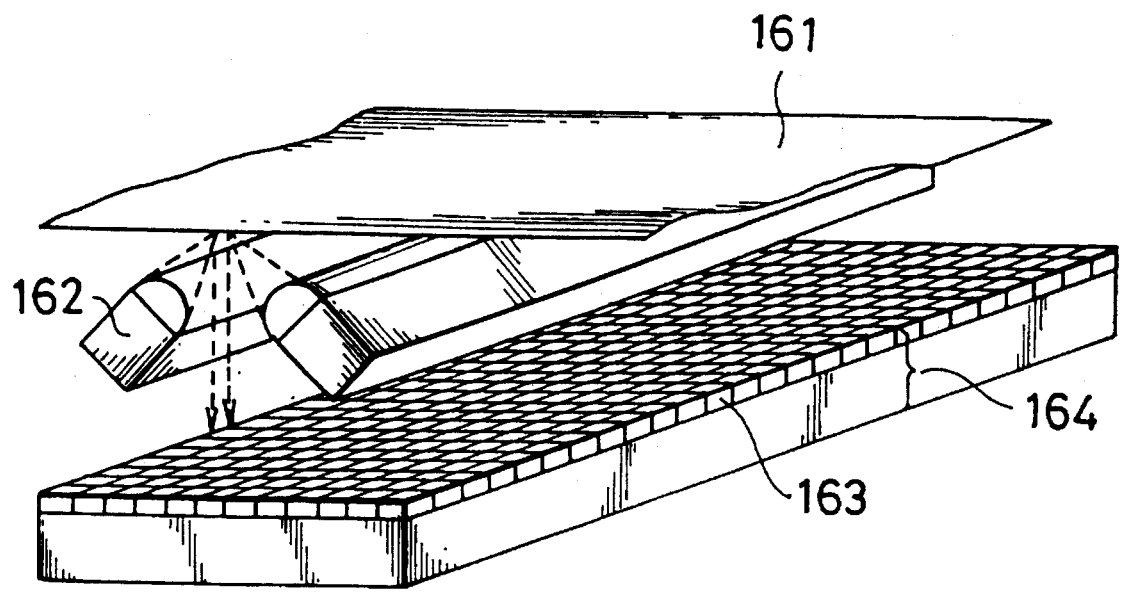
FIG. 28 is a constructional view showing another embodiment of the image reading section in the image scanner having the liquid crystal light valve.

FIG. 28 is a constructional view showing another embodiment of the image reading section of the image scanner having the liquid crystal light valve.

As shown in FIG. 28, the image reading section of the image scanner in this embodiment has a light source 162 and a liquid crystal light valve 163.

The liquid crystal light valve 163 corresponds to the liquid crystal light valve 80 shown in FIG. 25. A fiber plate 164 of the liquid crystal light valve 163 corresponds to the fiber plate 81 of the liquid crystal light valve 80 shown in FIG. 25. FIG. 28 omits an antireflection film corresponding to the antireflection film 83 shown in FIG. 25 and the converting mechanism for converting optical information to an electric signal and shown in FIG. 27.

In such a construction, when light from the light source 162 is irradiated to an original 181 having image information to be read, light reflected on the original 161 is formed as an image on the liquid crystal light valve 163 through the fiber plate 164.

A scanning electrode of the liquid crystal light valve 163 is sequentially operated by an unillustrated control system. This scanning electrode corresponds to the transparent electrode 84 shown in FIG. 25 and the scanning electrode 41 shown in FIG. 27. The control system corresponds to the driving circuit 48 and the control circuit 49 included in the converting mechanism shown in FIG. 27. Thus, an electric signal corresponding to light of inputted image information is obtained. Such an obtained electric signal is stored to an unillustrated image memory and is read by an unillustrated central processing unit (CPU) through an unillustrated interface circuit in accordance with necessity.

In this embodiment, information formed in a liquid crystal layer and corresponding to light including information is read as an optical signal and can be directly read as an electric signal by using the liquid crystal light valve in the image reading section of the image scanner. Accordingly, it is possible to easily perform a reading operation of the image scanner. Further, since the image scanner in this embodiment has a fiber plate, it is not necessary to dispose a lens system so that the image scanner can be made compact.

In this embodiment, the fiber plate is used, but a SELFOC lens array, etc. can be used instead of the fiber plate.

In the above embodiment, information formed in a liquid crystal layer and corresponding to light including information is read as an optical signal and can be directly read as an electric signal by using the liquid crystal light valve in the image reading section of the image scanner. Accordingly, it is possible to easily perform a reading operation of the image scanner.

Further, light reflected on an original can be directly detected by the liquid crystal light valve when a fiber plate is used as a substrate located on a side of the liquid crystal light valve on which a photoconductive layer is disposed. Accordingly, it is not necessary to dispose a lens system so that a reading operation of the image scanner can be easily performed. Further, the construction of the image scanner can be simplified and the image scanner can be made compact.

The construction of a liquid crystal light valve used in a bar code reader in the present invention and a manufacturing method of the liquid crystal light valve will first be explained.

FIG. 2 is a cross-sectional view of this liquid crystal light valve. A transparent conductive film of $SnO_2$ is evaporated on a transparent substrate 11 by using a sputtering method. This transparent conductive film is then patterned in the shape of a stripe through a photolitho process, thereby forming an electrode 14 for scanning. Next, an amorphous silicon hydride (a-Si:H) film is formed on the scanning electrode 14 as an impedance changing layer 17 having an impedance changed in accordance with incident light. The amorphous silicon hydride (a-Si:H) film is formed by silane ($SiH_4$) and hydrogen ($H_2$) gases as raw materials by using a plasma CVD method. This amorphous silicon hydride film has a thickness about 6 µm. Acrylic resin of a carbon dispersion type is formed as a light interrupting layer 18 on the impedance changing layer 17 by spin coating. An antireflection film 13 is formed on a side of the transparent substrate 11 on which no electrode is formed. The antireflection film 13 prevents light from being reflected on a surface of the transparent substrate 11 on this side. A glass substrate, a plastic substrate, a fiber plate, etc. can be used as the transparent substrate 11.

An opposite electrode 15 is formed on a transparent substrate 12 opposed to the transparent substrate 11. An optical waveguide 16 is formed on this opposite electrode 15. FIGS. 1, FIGS. 3(A) to 3(B) show the detailed construction of an opposite substrate 25 and a manufacturing method thereof. FIG. 1 is a front view of the opposite substrate 25. FIGS. 3(A) and 3(B) are cross-sectional views respectively taken along lines A—A' and B—B' of FIG. 1.

The opposite electrode 15 is formed on the entire surface of the transparent substrate 12. However, as shown in FIG. 4, the opposite electrode 15 may be formed in the shape of a stripe and the optical waveguide 16 may be formed in the shape of a stripe on this opposite electrode 15. In this case, the opposite electrode 15 and the scanning electrode 14 are arranged such that these electrodes are perpendicular to each other.

A polyimide film is formed by spin coating as each of orientational films 19 and 29 on the transparent substrate 11 and the opposite substrate 25, respectively. Thereafter, molecular orientational processing is performed by rubbing this polyimide film. These substrates 11 and 25 are stuck to each other through a spacer 21 such that the thickness of a cell is equal to 4 µm. Since liquid crystal molecules are oriented on the optical waveguide 16 by the rubbing processing, no orientational film 20 may be arranged in accordance with necessity.

With respect to a rubbing direction, the orientational direction of a liquid crystal molecule coming in contact with the optical waveguide 16 is set such that a refractive index of the liquid crystal molecule is larger or smaller than that of the optical waveguide 16 seen from a polarizing direction of light transmitted through the optical waveguide 16 in accordance with voltage application or unapplication. An angle of torsion of a liquid crystal layer 22 is set to 0° to 60° and is preferably set to 45°. A tilting angle of the liquid crystal layer is preferably set to 0.05° to 30°.

For example, a material of ZLI-4389 manufactured by MERK CORP. as a nematic liquid crystal having a positive dielectric constant is sealed into such a liquid crystal structure by a vacuum injecting method, thereby constructing a liquid crystal light valve. A cholesteric liquid crystal may be slightly added to this liquid crystal in accordance with necessity.

As shown in FIG. 3A, a light source 30 and a photodetector 29 are further connected to the optical waveguide 16 in this liquid crystal light valve. The light source 30 is constructed by a laser, an LED, etc. and emits a polarized wave (in TE or TM mode). The photodetector 29 can be constructed by an a-Si:H diode, an a-SiGe:H diode, etc. in accordance with a wavelength of the light source 13.

An operational principle of the above liquid crystal light valve will next be explained with reference to FIG. 5 and FIG. 6A to 6B.

As shown in FIG. 5, a liquid crystal molecule 31 is anisotropic with respect to a refractive index $n_e$ of the liquid crystal molecule 31 in an axial direction thereof and a refractive index $n_o$ in a direction perpendicular to this molecular axial direction. The relation $n_e > n_o$ is formed. A refractive index $n_w$ of the core layer 6b in the optical waveguide 16 and the refractive indices $n_e$ and $n_o$ of the liquid crystal molecule 31 are set to satisfy the relation $n_e > n_w > n_o$. In this embodiment, $n_w$, $n_e$ and $n_o$ are respectively set to 1.59, 1.66 and 1.55. In such a set relation, when light is guided to the optical waveguide 16, the intensity of light transmitted through the optical waveguide is changed in accordance with an orientational state of the liquid crystal molecule. Namely, when a polarizing direction of the transmitted light is approximately perpendicular to the axial direction of the liquid crystal molecule, the relation $n_w > n_o$ is formed and no light transmitted through the optical waveguide is leaked to the liquid crystal layer so that this light can be transmitted without attenuation. In contrast to this, when the polarizing direction of the transmitted light is approximately parallel to the axial direction of the liquid crystal molecule, the relation $n_e > n_w$ is formed and the light transmitted through the optical waveguide is leaked to the liquid crystal layer so that this light is attenuated. These optical characteristics are applied to the present invention.

Light is transmitted through the optical waveguide in TM and TE modes in which polarizing directions are different from each other. In the following explanation, light is concretely transmitted through the optical waveguide in the TM mode. FIG. 6A is a schematic cross-sectional view of the liquid crystal light valve shown in FIG. 1 on a side of the transparent substrate 12. FIG. 6B is a view of this liquid crystal light valve seen from above. Reference numerals 31a and 31b designate orientational states of liquid crystal molecules. A liquid crystal molecule having the orientational state 31a is rubbed such that the liquid crystal molecule is oriented in a longitudinal direction of the core layer 6b of the optical waveguide. FIGS. 7A to 8B are views showing operating states of the liquid crystal light valve in this embodiment. In these figures, for example, the antireflection film 13 shown in FIG. 2 is omitted and a shape of the scanning electrode 14 is simplified since the following explanation is not influenced by the antireflection film 13, the scanning electrode 14, etc.

FIG. 7A shows an operating state of the liquid crystal light valve when no driving voltage is applied to the scanning electrode 14 and the opposite electrode 15 and no light having information is incident to the liquid crystal light valve from the direction of an arrow 36. FIG. 7B shows an operating state of the liquid crystal light valve when no driving voltage is applied to the scanning electrode 14 and the opposite electrode 15 and the light having information is incident to the liquid crystal light valve from the direction of the arrow 36. In these cases, the orientational state of a liquid crystal molecule is set to the orientational state 31a shown in FIG. 6A irrespective of the incidence of optical information. Accordingly, the refractive index of a liquid crystal layer 22 is approximately equal to $n_o$ with respect to light transmitted in the TM mode through the optical waveguide 16. Since the relation $n_w > n_o$ is formed, the light is transmitted through the optical waveguide 16 without leaking this light to the liquid crystal layer 22.

FIG. 8A shows an operating state of the liquid crystal light valve when the driving voltage is applied to the scanning electrode 14 and the opposite electrode 15 and no light having information is incident to the liquid crystal light valve from the direction of the arrow 36. FIG. 8B shows an operating state of the liquid crystal light valve when the driving voltage is applied to the scanning electrode 14 and the opposite electrode 15 and the light having information is incident to the liquid crystal light valve from the direction of the arrow 36. In the case of FIG. 8A, the impedance of an impedance changing layer 17 is high even when the driving voltage is applied to the above electrodes. Therefore, no voltage is almost applied to the liquid crystal layer 22 so that no orientational state 32a of the liquid crystal molecule is almost changed as it is. Accordingly, light is transmitted through the optical waveguide 16 without leaking this light to the liquid crystal layer 22.

In contrast to this, in the case of FIG. 8B, the impedance of the impedance changing layer 17 is reduced so that the voltage is applied to the liquid crystal layer 22 and the orientational state of the liquid crystal molecule is changed to the orientational state 31b shown in FIG. 6A. In this case, when light in the TM mode is transmitted through the optical waveguide 16, the refractive index of the liquid crystal layer 22 is approximately equal to $n_e$ with respect to the light in the TM mode. Accordingly, the transmitted light is attenuated from the relation $n_e > n_w$ in a voltage applying region. Thus, the orientational state of a liquid crystal is changed in accordance with existence or nonexistence of the driving voltage and the external optical information so that intensity of the light transmitted through the optical waveguide 16 is changed. An electric signal corresponding to the external optical information is obtained when this light intensity is detected by a photodetector at a terminal end of the optical waveguide 16.

In contrast to this, when light is transmitted in the TE mode through the optical waveguide 16, the refractive index of the liquid crystal layer 22 is equal to $n_o$ irrespective of existence or nonexistence of the driving voltage in the orientational state 31a shown in FIG. 6A and provided by rubbing. Accordingly, this light is transmitted through the optical waveguide 16. In this case, the orientational state of a liquid crystal molecule is changed. FIG. 9A is a schematic cross-sectional view of the liquid crystal light valve shown in FIG. 2 on a side of the transparent substrate 12 when light is transmitted in the TE mode. FIG. 9B is a schematic view of this liquid crystal light valve in FIG. 9A seen from above. A liquid crystal molecule 31a is rubbed such that an orientational direction of the liquid crystal molecule 33a is perpendicular to a longitudinal direction of the core layer 27 of the optical waveguide. A refractive index of the liquid crystal molecule 33a is approximately equal to $n_e$ with respect to the light in the TE mode. In contrast this, the refractive index of a liquid crystal molecule 33b can be considered to be approximately equal to $n_o$. Accordingly, it is necessary to set the orientational direction of the liquid crystal molecule in accordance with the light transmitted through the optical waveguide 16.

A system for operating this liquid crystal light valve will next be explained with reference to FIG. 10.

Polarized light from a light source 44 is guided to an optical waveguide 43 at any time. The system is set in a state in which the light transmitted through the optical waveguide 43 can be converted to an electric signal by using a photodetector 45. When light 50 having information is incident to the liquid crystal light valve, a voltage is applied between an opposite electrode 42 and an electrode 41 for scanning through a driving circuit. The liquid crystal light valve is operated as follows. When the voltage is applied to the scanning electrode 41 on only one line, the orientational state of a liquid crystal molecule is changed in accordance with a light or dark state of light corresponding to a position of the scanning electrode 41. Thus, intensity of the light transmitted through each of optical waveguides 43 is modulated. An electric signal of optical information corresponding to the scanning electrode 41 is obtained when an output of the photodetector 45 is read through a reading circuit in synchronization with this modulation. When the scanning electrode 41 is sequentially operated with respect to an entire picture, an electric signal corresponding to two-dimensional optical information is obtained.

Figure 29:
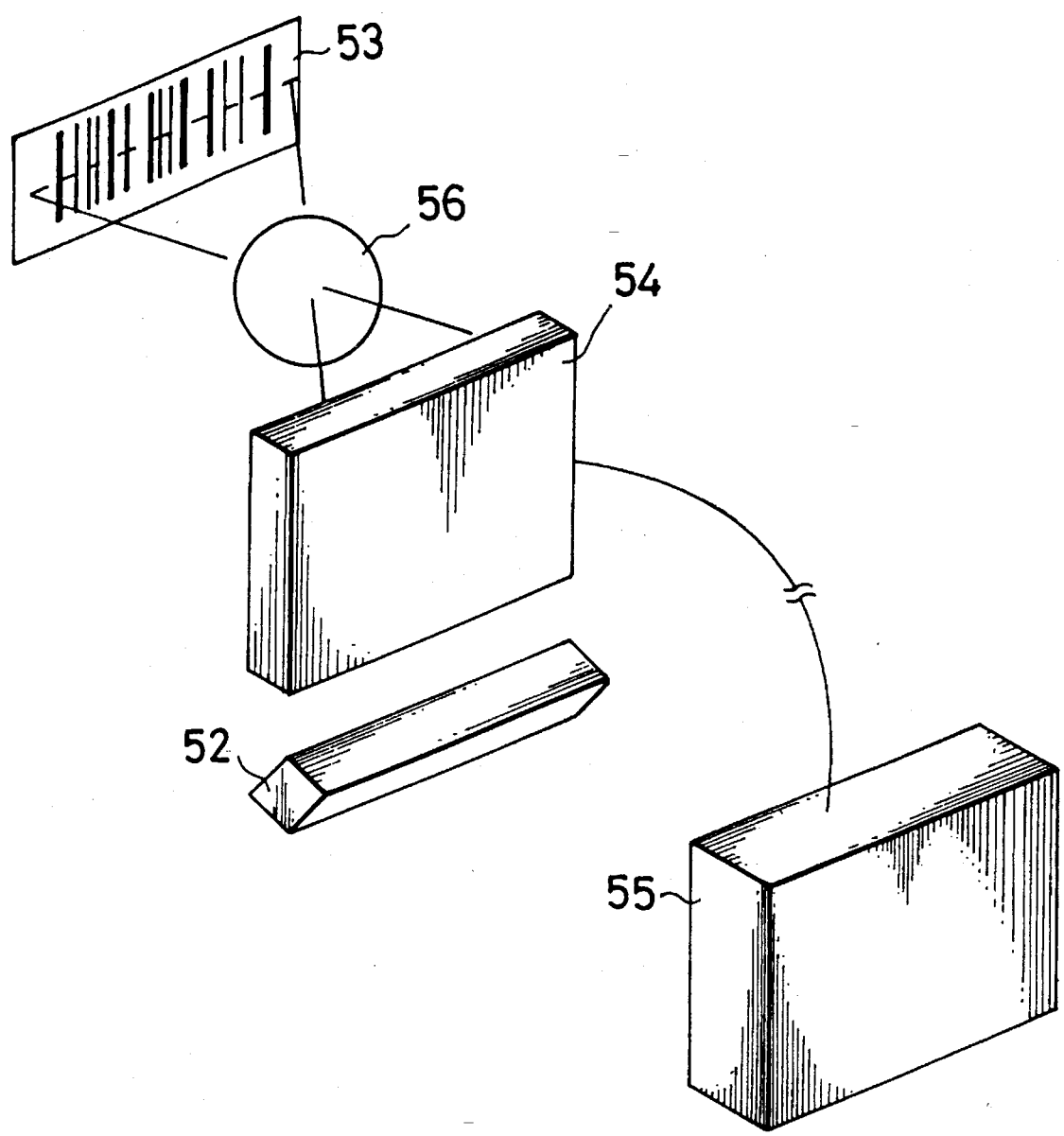
FIG. 29 is a view showing the construction of a bar code reader in accordance with one embodiment of the present invention.

FIG. 29 is a systematic view of a bar code reader using the above liquid crystal light valve. Light from a light source 52 is irradiated onto the entire surface of a bar code portion 53. The light source 52 may be constructed by a white light source such as a halogen lamp. In this embodiment, the light source 52 uses an LED as a monochromatic light source to discriminate light as optical information reflected on the bar code portion 53 from external light. A liquid crystal light valve 18 in a reading section has a structure shown in FIG. 2. A substrate 11 has an electrode 14 for scanning formed in the shape of plural stripes parallel to bars of a bar code. A transparent substrate 12 has an optical waveguide 16 formed in the shape of a stripe in a direction perpendicular to the scanning electrode 14. The above scanning electrode 14 desirably has a line width equal to or smaller than a distance of the bar code with respect to one information. Further, the number of stripes of the scanning electrode 14 is desirably equal to or greater than the total number of all information of the bar code. Light reflected on the bar code portion 54 is focused and formed as an image on the liquid crystal light valve 54 through a lens 56. At this time, when the scanning electrode 14 is sequentially operated through a control circuit, an electric signal corresponding to an image on a selected optical waveguide 16 is obtained. This electric signal is decoded by a bar code decoder 55 to numeric values and these numeric values are processed as information by a computer.

As mentioned above, in this embodiment, the bar code reader has no mechanical driving portion so that the bar code reader can be made compact and durability of the bar code reader can be improved. Further, it is not necessary to dispose a correction lens for optically correcting scanning irregularities as in the conventional bar code reader so that a systematic structure of the bar code reader is simplified.

When plural optical waveguides 16 are disposed in the above reading section, correct information can be obtained by collating information of each of the optical waveguides 16 with data stored to a memory even when the bar code portion 53 partially becomes dirty.

The above description relates to the plural optical waveguides 16, but the bar code of the bar code portion 53 can be read even when a single optical waveguide 16 is disposed. In this case, the bar code reader can be made further compact.

[Embodiment 2]

Another embodiment of the present invention will next be explained with reference to FIGS. 30 and 31.

This embodiment is characterized in that a fiber plate is used instead of the transparent substrate 11 in the Embodiment 1.

Figure 30:
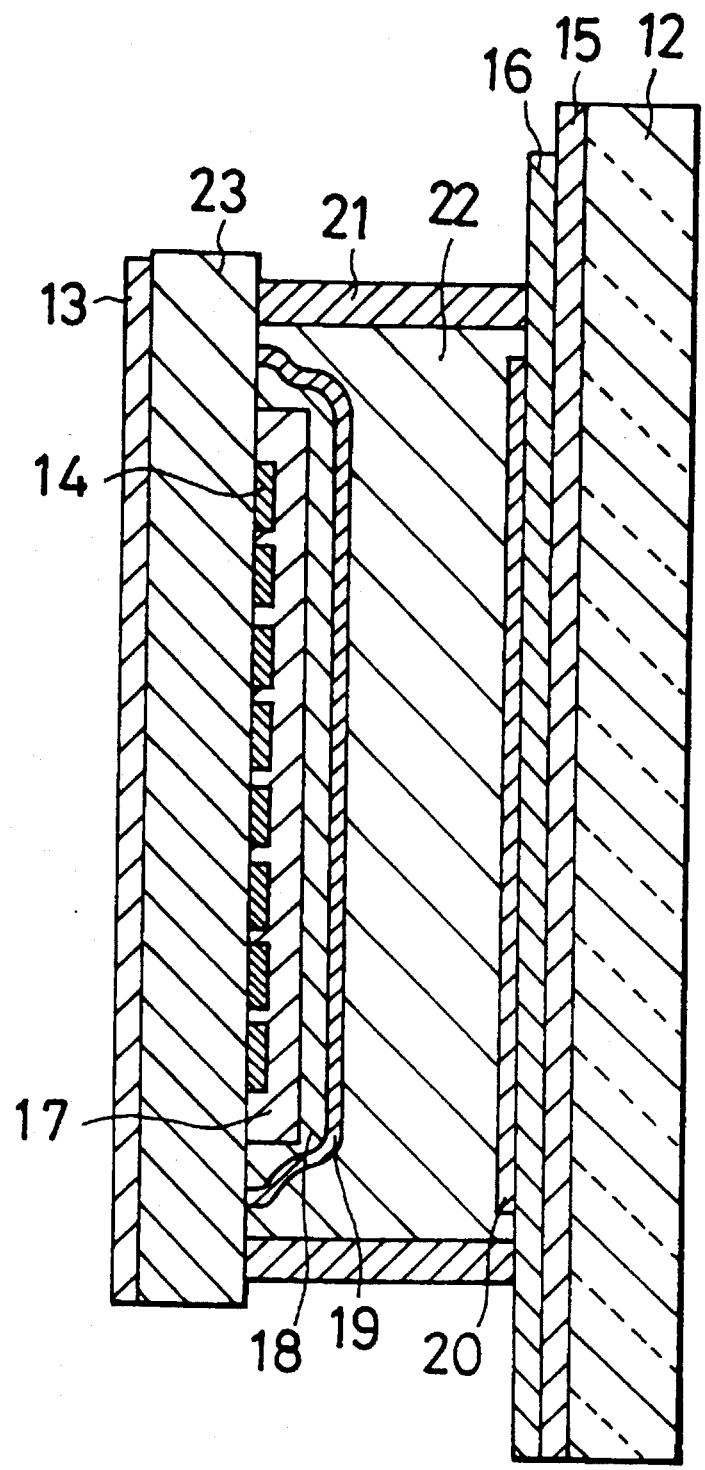
FIG. 30 is a cross-sectional view showing a liquid crystal light valve used in a bar code reader in accordance with another embodiment of the present invention.

FIG. 30 is a cross-sectional view of a liquid crystal light valve used in a bar code reading section. First, a transparent conductive film composed of laminated layers of ITO and $SnO_2$ is evaporated on a fiber substrate 23 by using a sputtering method. An electrode 14 for scanning is formed by patterning the evaporated transparent conductive film in the shape of a stripe by reactive ion etching. An amorphous silicon hydride (a,Si:H) film is next formed as an impedance changing layer 17 on the scanning electrode 14. The amorphous silicon hydride (a-Si:H) film is constructed by using silane ($SiH_4$) and argon (Ar) gases and is formed by using an ECR plasma CVD method. This amorphous silicon hydride (a-Si:H) film has a thickness about 7 μm. Acrylic resin of a carbon dispersion type is formed on the amorphous silicon hydride (a-Si:H) film by spin coating as a light interrupting layer 18. An antireflection film 13 is formed on a side of the fiber plate 23 on which no scanning electrode is formed. This antireflection film 13 prevents light from being reflected on a surface of the fiber plate 23.

A transparent conductive film composed of ITO is evaporated on an opposite transparent substrate 12 by using a sputtering method, thereby forming an opposite electrode 5. Similar to the Embodiment 1, an optical waveguide 16 is next formed in the shape of a stripe. A polyimide film is formed spin coating as each of orientational films 9a and 9b on the fiber plate 23 and the transparent substrate 12. Thereafter, molecular orientational processing is performed by rubbing the orientational films 19 and 20. The fiber plate 23 and the transparent substrate 12 are then stuck to each other through a spacer 21 such that the thickness of a cell is equal to 5 μm. No orientational film 20 may be disposed in accordance with necessity since liquid crystal molecules are also oriented on the optical waveguide 16 by the rubbing processing.

With respect to a rubbing direction, an orientational direction of the liquid crystal molecule coming in contact with the optical waveguide 16 is set such that a refractive index of this liquid crystal layer 22 is larger or smaller than that of the optical waveguide 16 seen from a polarizing direction of light transmitted through the optical waveguide 16 in accordance with voltage application or unapplication. A hybrid electric field effect (HFE) mode is used as a liquid crystal display mode. Accordingly, an angle of torsion of the liquid crystal layer 22 is set to 30° to 60°. A tilting angle of the liquid crystal layer is preferably set to 0.05° to 10°. The liquid crystal light valve is constructed by injecting and sealing a nematic liquid crystal having a positive dielectric constant into the liquid crystal layer 22 in vacuum.

Unillustrated light source and photodetector are connected to the optical waveguide 16 of this liquid crystal light valve. The intensity of light guided from this light source to the optical waveguide 16 is changed in accordance with an orientational state of the liquid crystal layer 22 and this change in light intensity is detected by the photodetector.

Figure 31:
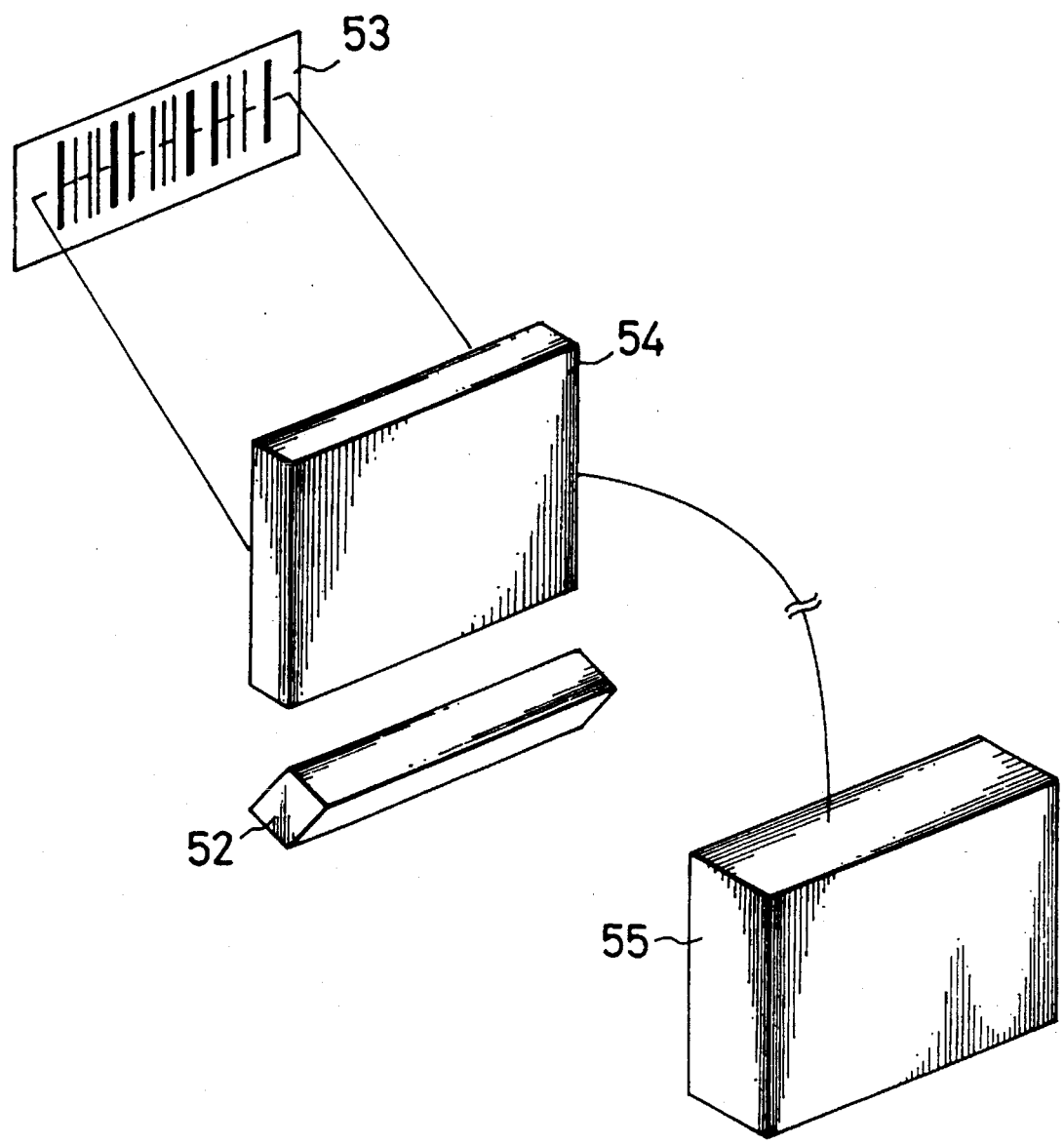
FIG. 31 is a view showing the construction of a bar code reader in accordance with another embodiment of the present invention.
Figure 32:
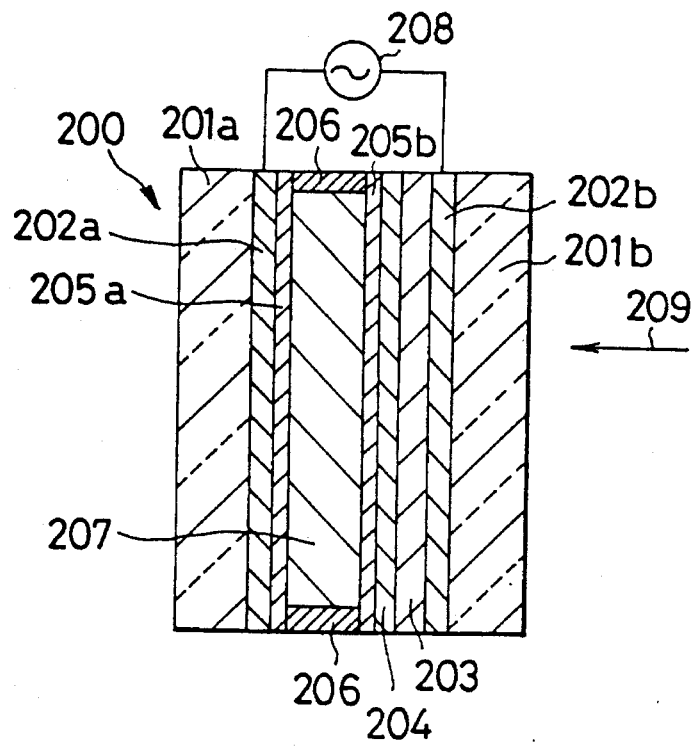
Figure 33:
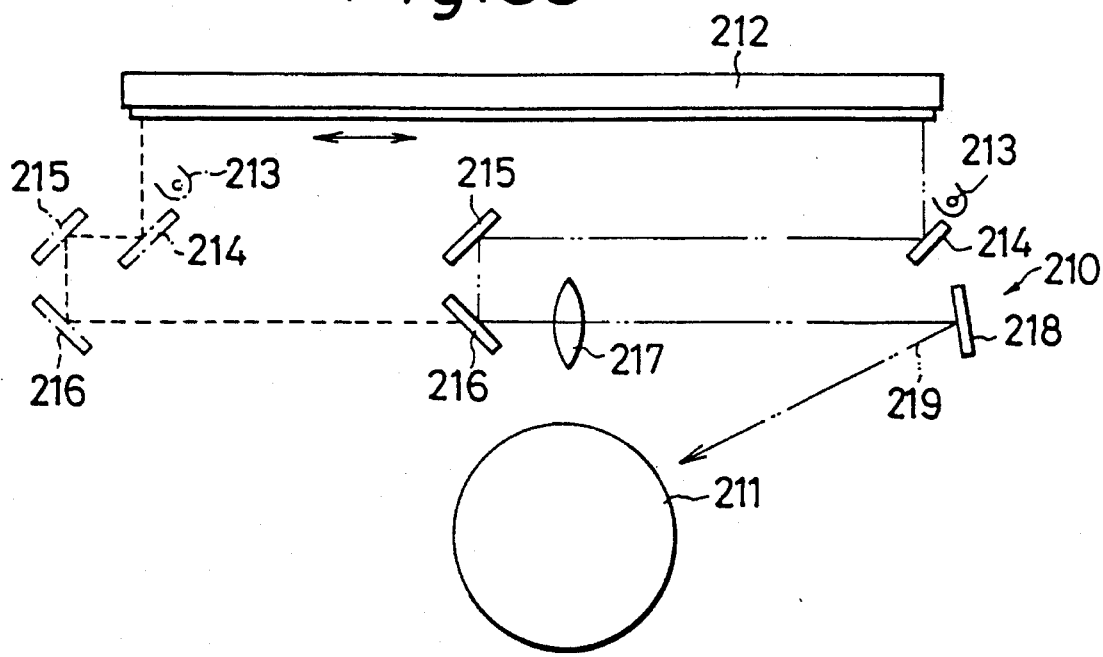
Figure 34:
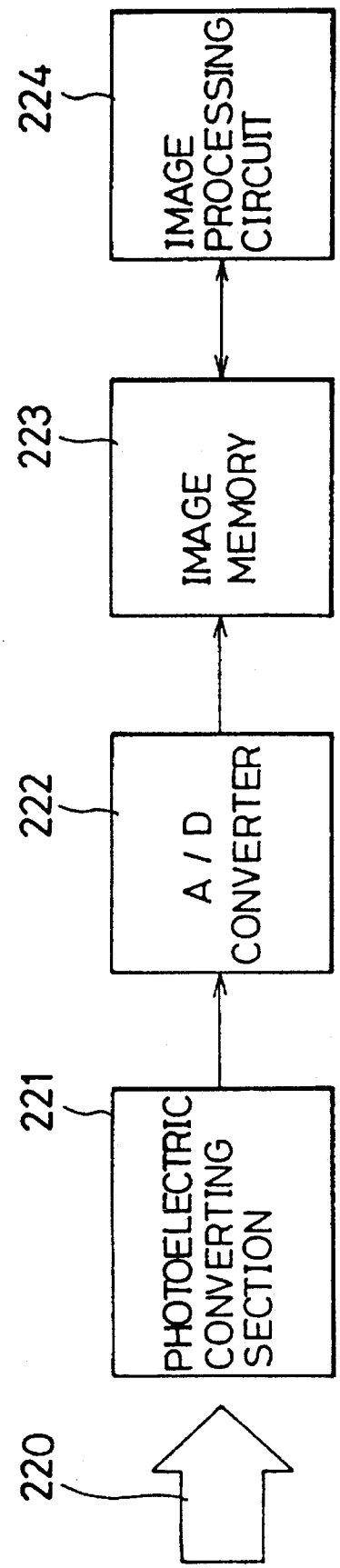
Figure 35:
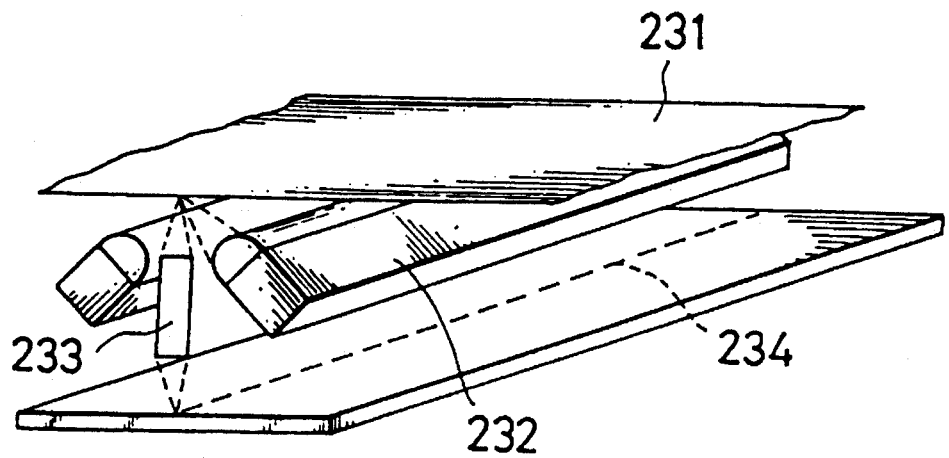
FIG. 35 is a view showing the construction of an image reading section in a conventional facsimile telegraph or an image scanner.
Figure 36:
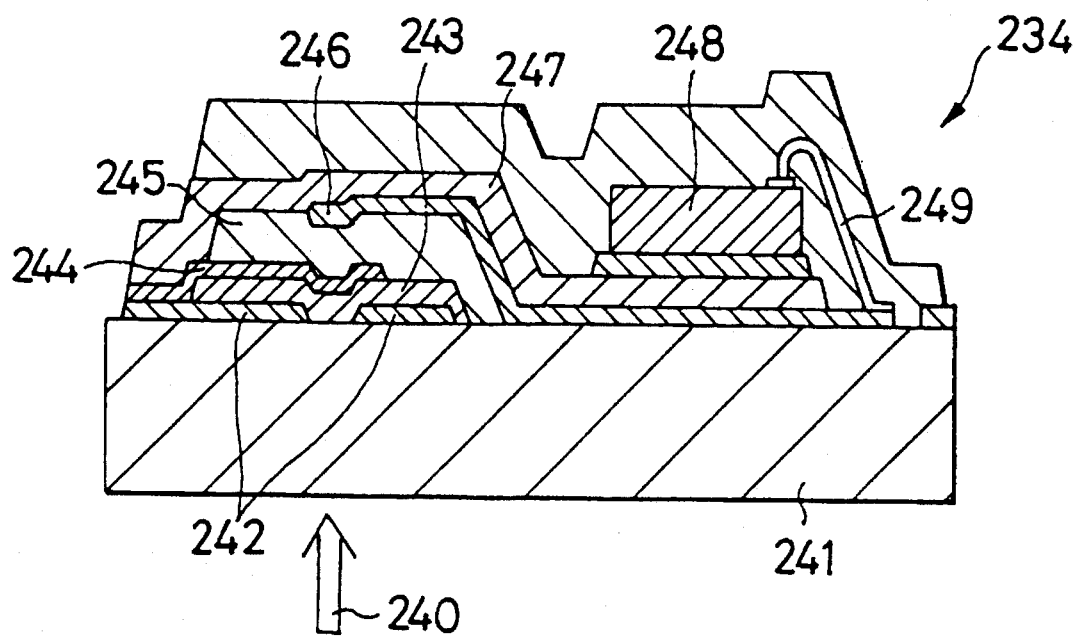
FIG. 36 is a cross-sectional view showing the construction of a CCD array included in the facsimile telegraph shown in FIG. 35.
Figure 37:
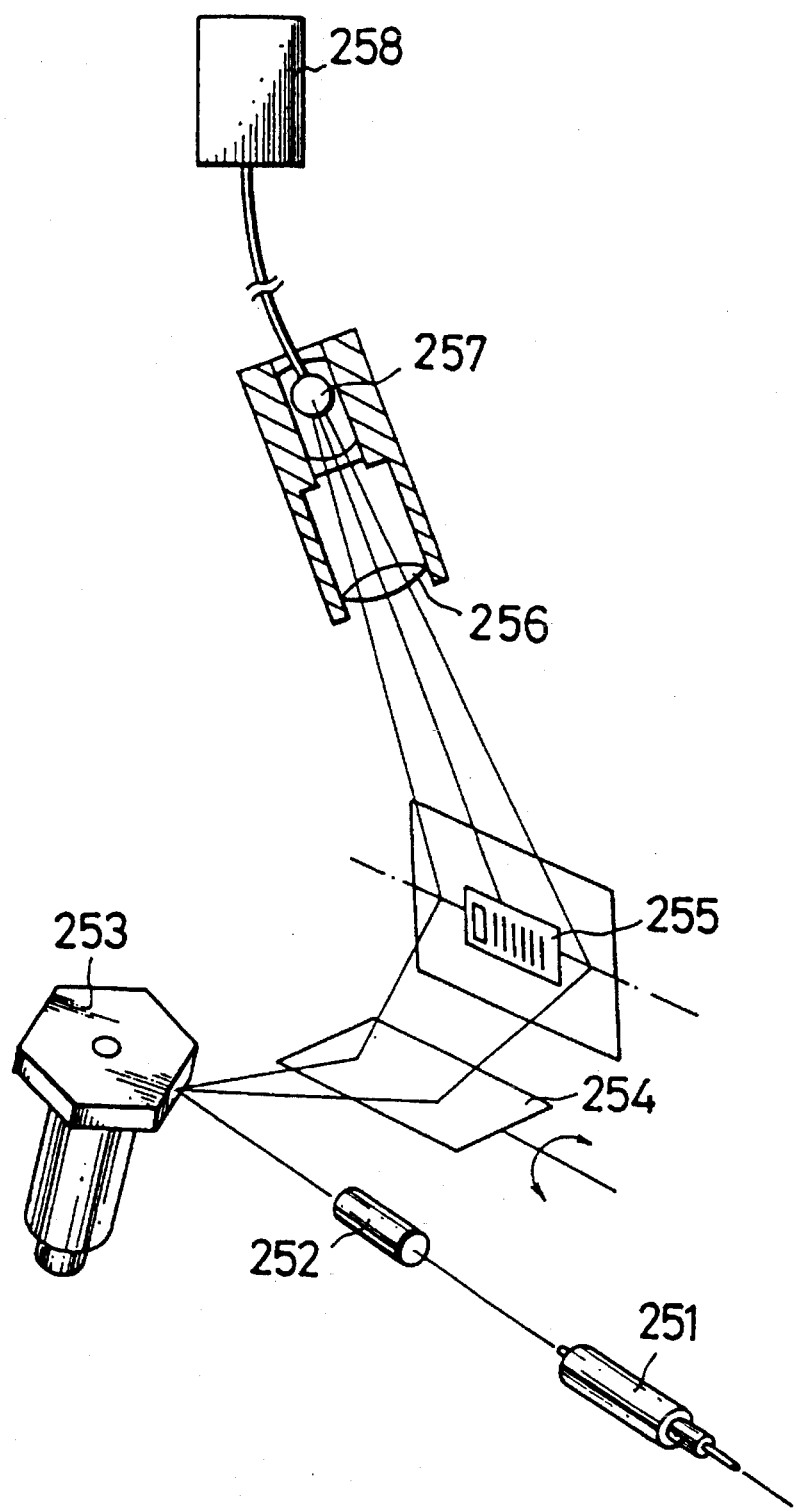
FIG. 37 is a view showing the construction of a conventional bar code reader.

FIG. 31 is a systematic view of a bar code reader using the liquid crystal light valve shown in FIG. 30. Light from a light source 52 is irradiated onto the entire surface of a bar code portion 53. The light source 52 may be constructed by a white light source such as a halogen lamp. In this embodiment, the light source 52 uses an LED as a monochromatic light source to discriminate light as optical information reflected on the bar code portion 53 from external light. A liquid crystal light valve 54 in a reading section has a structure shown in FIG. 30. A fiber plate 23 as a substrate has an electrode 14 for scanning formed in the shape of plural stripes parallel to bars of the bar code portion 53. A transparent substrate 12 has an optical waveguide 16 formed in the shape of a stripe in a direction perpendicular to the scanning electrode 14. The above scanning electrode 14 desirably has a line width equal to or smaller than the distance of a bar code with respect to one information. Further, the number of stripes of the scanning electrode 14 is desirably equal to or greater than the total number of all information of the bar code. Light reflected on the bar code portion 53 is formed as an image on the liquid crystal light valve 54. Since the image is formed without using any lens, a distance between the bar code portion 53 and the fiber plate 23 is set to be sufficiently small such that light reflected on the bar code portion 53 is incident to the fiber plate 23 without divergence. When the scanning electrode 14 is sequentially operated through a control circuit, an electric signal corresponding to an image on a selected optical waveguide 16 is obtained. This electric signal is decoded by a bar code decoder 55 to numeric values and these numeric values are processed as information by a computer.

As mentioned above, in this embodiment, the bar code reader has no mechanical driving portion so that the bar code reader can be made compact and durability of the bar code reader can be improved. Further, it is not necessary to dispose a correction lens for optically correcting scanning irregularities as in the conventional bar code reader so that a systematic structure of the bar code reader is simplified. Further, since the fiber plate 23 is used, it is not necessary to dispose a lens system for forming an image on the liquid crystal light valve. Accordingly, the bar code reader can be made further compact in comparison with the case of the Embodiment 1. In this embodiment, the fiber plate 23 is used, but a SELFOC lens array can be used instead of the fiber plate.

When plural optical waveguides 16 are disposed in the above reading section, correct information can be obtained by collating information of each of the optical waveguides 16 with data stored to a memory even when the bar code portion 53 partially becomes dirty.

The above description relates to the plural optical waveguides 16, but the bar code of the bar code portion 53 can be read even when a single optical waveguide 16 is disposed. In this case, the bar code reader can be made further compact.

In the first and second embodiments, the impedance changing layer 17 of the liquid crystal light valve shown in FIGS. 2 and 30 is constructed by a-Si:H, but can be also constructed by using amorphous silicon carbide hydride (a-Si$_{1-x}$C$_x$:H), amorphous silicon nitride hydride (a-Si$_{1-x}$N$_x$:H), amorphous silicon oxide hydride (a-Si$_{1-x}$O$_x$:H), amorphous silicon germanium hydride (a-Si$_{1-x}$Ge$_x$:H), cadmium sulfide (CdS), Bi$_{12}$SiO$_{20}$, etc. Further, the impedance changing layer 17 may have a Schottky structure, a diode structure, a back-to-back diode structure, etc.

The light interrupting layer 18 is constructed by acrylic resin of a carbon dispersion type, but can be also constructed by using a thin organic film of a pigment dispersion type, a thin film formed by electroless plating of aluminum oxide (Al$_2$O$_3$) with a metal such as Ag, a thin cermet film, CdTe, etc.

The optical waveguide 16 is constructed by an optical waveguide using an organic material, but can be also constructed by an optical waveguide using an inorganic material formed by mixing a-SiO$_x$N$_y$:H, (SiO$_2$)$_x$—(Ta$_2$O$_5$)$_y$, etc.

The transparent substrate 12 can be constructed by a monocrystal silicon substrate or a monocrystal GaAs substrate instead of a glass or plastic substrate. In this case, the light source and the photodetector can be formed on this substrate.

When a nematic liquid crystal is used, a liquid crystal operating mode can be constructed by a guest host mode, etc. instead of a mode using a nematic liquid crystal having a positive dielectric constant, the hybrid electric field effect mode shown in the above embodiments.

A nematic liquid crystal having a negative dielectric constant can be used and a tilting angle of this liquid crystal can be set to 60° to 90°. In this case, in contrast to the above embodiments, when no voltage is applied to the liquid crystal layer 22, the refractive index of a liquid crystal molecule coming in contact with the optical waveguide 16 can be set to be greater than that of the optical waveguide 16 seen from a polarizing direction of light transmitted through the optical waveguide 16. When the voltage is applied to the liquid crystal layer 22, the refractive index of the above liquid crystal molecule can be set to be smaller than that of the optical waveguide 16 seen from the polarizing direction of light transmitted through the optical waveguide 16. When a smectic liquid crystal is used, the guest host mode, an electroclinic effect, etc. can be used.

As mentioned above, in accordance with the present invention, it is possible to provide a compact bar code reader in which a liquid crystal light valve is used as a reading element of the bar code reader and durability of the bar code reader is improved. At least one of substrates of the liquid crystal light valve is constructed by a fiber plate so that light reflected on a bar code portion can be read by the liquid crystal light valve without any lens. Accordingly, the bar code reader can be made further compact.

Many widely different embodiments of the present invention may be constructed without departing from the spirit and scope of the present invention. It should be understood that the present invention is not limited to the specific embodiments described in the specification, except as defined in the appended claims.

What is claimed is:

1. A liquid crystal light valve comprising:

a liquid crystal layer disposed between two substrates having respective electrodes;

a photoconductive layer disposed between the liquid crystal layer and one of said two substrates and having an impedance changed by incident light including information; and reading means for reading said information included in said incident light from said liquid crystal layer as electrical signals, including optical waveguides disposed on a side of one of said two substrates a light source for guiding light to each of the optical waveguides, and light receiving means for receiving light from said light source transmitted through respective ones of said optical waveguides and converting the transmitted light to an electrical signal.

2. A liquid crystal light valve as claimed in claim 1, wherein a light interrupting layer is disposed to interrupt light incident to said photoconductive layer from a side of said liquid crystal layer and a light reflecting layer is disposed to reflect the incident light thereon, and at least one of the light interrupting layer and the light reflecting layer is disposed on said photoconductive layer.

3. A liquid crystal light valve as claimed in claim 1, wherein said liquid crystal layer is formed by a nematic liquid crystal.

4. A liquid crystal light valve as claimed in claim 1, wherein said liquid crystal layer is formed by a smectic liquid crystal.

5. A liquid crystal light valve as claimed in claim 1, wherein one of said substrates has a plurality of scanning electrodes formed thereon in a striped manner and said photoconductive layer covers said scanning electrodes, and the other substrate has an opposite electrode formed on substantially the entire surface thereof and said waveguide are arranged in a striped manner on said opposite electrode so as to cross perpendicularly to said scanning electrodes.

6. A liquid crystal light valve as claimed in claim 5, wherein said reading means includes means for scanning said scanning electrodes by sequentially applying a voltage to respective ones of said scanning electrodes, and means for reading an electrical signal converted by said light receiving means, said reading being synchronized with scanning of said scanning electrodes.

7. A liquid crystal light valve as claimed in claim 1, wherein each of said optical waveguides has a cladding, and said liquid crystal layer forms part of said cladding.

8. An information processor having a liquid crystal light valve comprising:
   a liquid crystal layer disposed between two substrates having respective electrodes;
   a photoconductive layer disposed between the liquid crystal layer and one of said two substrates and having an impedance changed by incident light including information; and
   reading means for reading said information included in said incident light from said liquid crystal layer as electrical signals, including optical waveguides disposed on a side of one of said two substrates,
   a light source for guiding light to each of the optical waveguides, and
   a device, connected to the liquid crystal light valve, for converting light including information to an electric signal.

9. An information processor as claimed in claim 8, wherein the processor is an image copying machine having
   an image reading section for reading the image of an original and
   an image forming section for forming a copied image, based on image data of the original read by the image reading section, and wherein
   said image reading section comprises said liquid crystal light valve.

10. An information processor as claimed in claim 9, wherein one of said two substrates in said liquid crystal light valve is formed by a fiber plate.

11. An information processor as claimed in claim 8, wherein
   the processor is a facsimile machine for recording and transmitting an image.

12. An information processor as claimed in claim 11, wherein the facsimile machine comprises
   a liquid crystal light valve and
   a device connected to the liquid crystal light valve for applying a voltage to said electrodes disposed in said two substrates in said liquid crystal light valve so as to obtain an electric signal corresponding to said incident light.

13. A processor as claimed in claim 12, wherein one of said two substrates having said photoconductive layer in said liquid crystal light valve is formed by a fiber plate.

14. An information processor as claimed in claim 8, wherein
   the processor is an image scanner, having an image reading section for reading the image of an original, and said image reading section comprises said liquid crystal light valve.

15. An information processor as claimed in claim 14, wherein one of said two substrates in said liquid crystal light valve is formed by a fiber plate.

* * * * *